(12) United States Patent
Khouri

(10) Patent No.: US 11,298,210 B2
(45) Date of Patent: Apr. 12, 2022

(54) ORTHODONTIC ASSEMBLY

(71) Applicant: John H. Khouri, Gainesville, VA (US)

(72) Inventor: John H. Khouri, Gainesville, VA (US)

( * ) Notice: Subject to any disclaimer, the term of this patent is extended or adjusted under 35 U.S.C. 154(b) by 473 days.

(21) Appl. No.: 15/948,347

(22) Filed: Apr. 9, 2018

(65) Prior Publication Data

US 2018/0221111 A1    Aug. 9, 2018

Related U.S. Application Data

(63) Continuation-in-part of application No. PCT/US2016/055773, filed on Oct. 6, 2016, which is
(Continued)

(51) Int. Cl.
| | |
|---|---|
| *A61C 7/00* | (2006.01) |
| *A61C 7/08* | (2006.01) |
| *A61C 7/30* | (2006.01) |
| *A61C 7/10* | (2006.01) |
| A61C 8/00 | (2006.01) |
| A61C 7/36 | (2006.01) |
| A61C 7/14 | (2006.01) |
| A61C 7/28 | (2006.01) |

(52) U.S. Cl.
CPC .................. *A61C 7/08* (2013.01); *A61C 7/10* (2013.01); *A61C 7/30* (2013.01); *A61C 7/008* (2013.01); *A61C 7/14* (2013.01); *A61C 7/282* (2013.01); *A61C 7/36* (2013.01); *A61C 8/0096* (2013.01)

(58) Field of Classification Search
CPC .... A61C 7/08; A61C 7/10; A61C 7/30; A61C 7/008; A61C 7/14; A61C 7/272; A61C 7/36; A61C 8/0096; A61C 5/007; A61C 7/287; A61C 7/22; A61C 7/00
See application file for complete search history.

(56) References Cited

U.S. PATENT DOCUMENTS 1,429,749 A    9/1922    Maeulen et al.
2,141,190 A    12/1938    Linde
(Continued)

FOREIGN PATENT DOCUMENTS

WO    2009/068559    6/2009
WO    2014/008583    1/2014

OTHER PUBLICATIONS

"3D-Printing Dental Market", http://3dprintingchannel.com/3d-printing-dental-market/Accessed (Nov. 3, 2014).
(Continued)

*Primary Examiner* — Heidi M Eide
(74) *Attorney, Agent, or Firm* — Jeff B. Vockrodt; Culhane Meadows, PLLC

(57) ABSTRACT

A removable orthodontic assembly to be used in a user's mouth, including: a frame member configured to be removably positioned proximate a lingual portion of the user's teeth; a first connector member, wherein the first connector member comprises a first end extending proximate to a labial portion of the user's teeth and a second end engaging the frame member; and a labial bow configured to be removably positioned proximate to the labial portion of the user's teeth having a first end and a second end, wherein the labial bow is configured to removably engage the first connector member.

6 Claims, 47 Drawing Sheets

Related U.S. Application Data a continuation-in-part of application No. 14/879,555, filed on Oct. 9, 2015, now abandoned.

(60) Provisional application No. 62/548,246, filed on Aug. 21, 2017.

(56) References Cited

U.S. PATENT DOCUMENTS

| | | | |
|---|---|---|---|
| 2,259,160 A | 10/1941 | Glaser | |
| 3,127,677 A | 4/1964 | Schachter | |
| 3,464,112 A | 9/1969 | Silverman et al. | |
| 3,975,823 A | 8/1976 | Sosnay | |
| 4,130,921 A | 12/1978 | Wallshein | |
| 4,224,021 A * | 9/1980 | Foxman | A61C 7/00 |
| | | | 433/18 |
| 4,253,828 A * | 3/1981 | Coles | A61C 7/00 |
| | | | 433/6 |
| 5,022,855 A | 6/1991 | Jeckel | |
| 5,167,499 A | 12/1992 | Arndt et al. | |
| 5,490,962 A | 2/1996 | Cima | |
| 5,775,907 A | 7/1998 | Razdolsky | |
| 5,785,520 A | 7/1998 | Carano et al. | |
| 5,816,800 A | 10/1998 | Brehm et al. | |
| 6,183,250 B1 * | 2/2001 | Kanno | A61C 7/28 |
| | | | 433/17 |
| 6,435,871 B1 | 8/2002 | Inman | |
| 6,604,943 B2 | 8/2003 | White | |
| 6,699,037 B2 | 3/2004 | Chishti et al. | |
| 6,702,575 B2 | 3/2004 | Hilliard | |
| 6,908,306 B2 | 6/2005 | Bowman et al. | |
| 7,037,107 B2 * | 5/2006 | Yamamoto | A61C 7/04 |
| | | | 433/20 |
| 7,048,542 B2 | 5/2006 | Von Arx et al. | |
| 7,077,646 B2 | 7/2006 | Hilliard | |
| 7,104,790 B2 | 9/2006 | Cronauer | |
| 7,125,248 B2 | 10/2006 | Phan et al. | |
| 7,204,691 B2 | 4/2007 | Darling | |
| 7,416,407 B2 | 8/2008 | Cronauer | |
| 7,625,442 B2 | 12/2009 | Engelbrecht et al. | |
| 7,802,987 B1 | 9/2010 | Phan | |
| 7,887,324 B2 | 2/2011 | Singh | |
| 7,987,854 B2 | 8/2011 | Arni | |
| 8,192,196 B2 | 6/2012 | Singh | |
| 8,195,320 B2 | 6/2012 | Garcia-Aparicio | |
| 8,342,840 B2 | 1/2013 | Griffiths | |
| 8,435,030 B2 | 5/2013 | Borri | |
| 8,641,414 B2 | 2/2014 | Borovinskih | |
| 8,727,769 B2 | 5/2014 | Griffiths | |
| 8,738,165 B2 | 5/2014 | Cinader, Jr. et al. | |
| 2002/0127510 A1 | 9/2002 | Kyung et al. | |
| 2002/0192617 A1 | 12/2002 | Phan et al. | |
| 2003/0124480 A1 | 7/2003 | Peacock, III | |
| 2003/0190576 A1 | 10/2003 | Phan et al. | |
| 2003/0198912 A1 | 10/2003 | Mah | |
| 2003/0207224 A1 | 11/2003 | Lotte | |
| 2004/0009449 A1 | 1/2004 | Mah et al. | |
| 2004/0170941 A1 | 9/2004 | Phan et al. | |
| 2005/0023710 A1 | 2/2005 | Brodkin et al. | |
| 2005/0048433 A1 | 3/2005 | Hilliard | |
| 2005/0186524 A1 | 8/2005 | Abolfathi et al. | |
| 2006/0019213 A1 | 1/2006 | Graham | |
| 2006/0099545 A1 | 5/2006 | Lai | |
| 2006/0099546 A1 | 5/2006 | Bergersen | |
| 2006/0234179 A1 | 10/2006 | Wen et al. | |
| 2006/0257811 A1 | 11/2006 | Ohki et al. | |
| 2007/0065768 A1 | 3/2007 | Nadav | |
| 2008/0020337 A1 | 1/2008 | Phan et al. | |
| 2008/0044786 A1 | 2/2008 | Kalili | |
| 2008/0099029 A1 | 5/2008 | Lamberg | |
| 2008/0268400 A1 | 10/2008 | Moss et al. | |
| 2008/0299508 A1 | 12/2008 | White | |
| 2009/0047614 A1 * | 2/2009 | Fathianathan | A61C 7/22 |
| | | | 433/6 |
| 2009/0105523 A1 | 4/2009 | Kassayan et al. | |
| 2009/0186314 A1 | 7/2009 | Pober | |
| 2010/0015565 A1 | 1/2010 | Carrillo Gonzalez et al. | |
| 2010/0227289 A1 | 9/2010 | Farrell | |
| 2010/0239992 A1 | 9/2010 | Brandt | |
| 2010/0239993 A1 | 9/2010 | Baughman et al. | |
| 2011/0020761 A1 | 1/2011 | Kallili | |
| 2011/0027743 A1 | 2/2011 | Cinader et al. | |
| 2011/0129785 A1 | 6/2011 | Cohen et al. | |
| 2011/0269092 A1 | 11/2011 | Kuo et al. | |
| 2012/0025398 A1 | 2/2012 | Jang et al. | |
| 2012/0225398 A1 | 9/2012 | Fallah | |
| 2012/0282565 A1 | 11/2012 | Adell | |
| 2013/0095446 A1 | 4/2013 | Andreiko et al. | |
| 2013/0108976 A1 | 5/2013 | Brandt et al. | |
| 2013/0122444 A1 | 5/2013 | Gtiffiths | |
| 2013/0122448 A1 | 6/2013 | Kitching | |
| 2013/0230819 A1 | 9/2013 | Arruda | |
| 2013/0230820 A1 | 9/2013 | Carrillo Gonzalez et al. | |
| 2013/0323665 A1 | 12/2013 | Dinh et al. | |
| 2014/0272754 A1 | 9/2014 | Curley | |
| 2014/0363779 A1 | 12/2014 | Kopelman | |
| 2015/0125801 A1 * | 5/2015 | Bowman | A61C 7/008 |
| | | | 433/2 |
| 2015/0157421 A1 | 6/2015 | Martz et al. | |
| 2015/0182305 A1 | 7/2015 | Lowe et al. | |
| 2015/0335398 A1 | 11/2015 | Rosenthall | |
| 2016/0120624 A1 | 5/2016 | Yousefian | |
| 2016/0206405 A1 * | 7/2016 | Reybrouck | A61C 7/22 |
| 2016/0228286 A1 | 8/2016 | Rayek | |
| 2017/0007368 A1 | 1/2017 | Boronkay | |
| 2017/0035531 A1 | 2/2017 | Haralambidis | |
| 2018/0021108 A1 | 1/2018 | Cinader, Jr. | |

OTHER PUBLICATIONS

"International Search Report and Written Opinion dated Feb. 8, 2017", Feb. 8, 2017.

"The Full Digitisation of Removable Partial Dentures (RPDs)", http://www.renishaw.com/en/the-full-digitisation-of-removable-partial-dentures-rpds-29295 (Accessed Feb. 11, 2015).

Gao, et al., "Fabricating titanium denture base plate by laser rapid forming", Rapid Prototyping Journal 15.2 (2009) 133-136.

Hurt, "Post-Treatment Fixed Lingual Retainers (2013) 1-3".

Kim, et al., "An evaluation of marginal fit of three-unit fixed dental prostheses fabricated by direct metal laser sintering system", Dental Materials 29.7 (2013) e91-e96.

Retrouvey, et al., "Printing Orthodontic Rtainers Using CAD/CAM Technology".

Wu, et al., "A feasibility study on laser rapid forming of complete titanium denture base plate", Lasers in medical science 25.3 (2010):309-315.

* cited by examiner

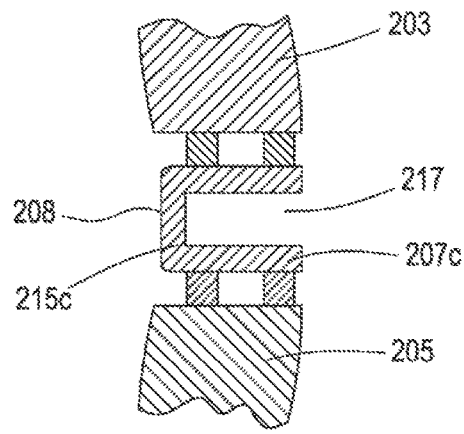
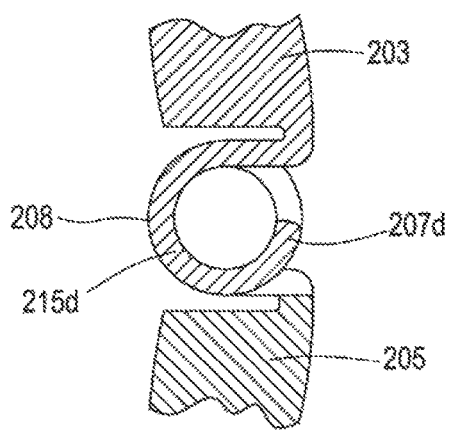
FIG. 1C  FIG. 1D
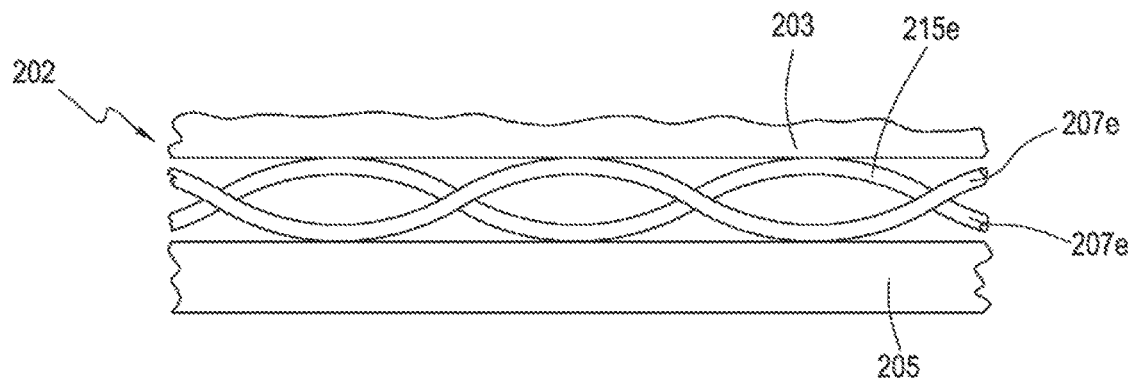
FIG. 1E
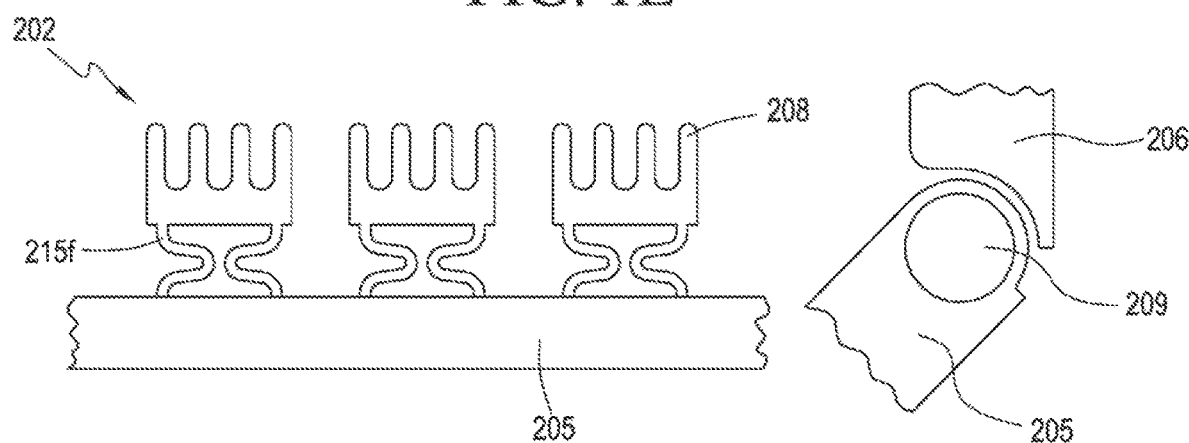
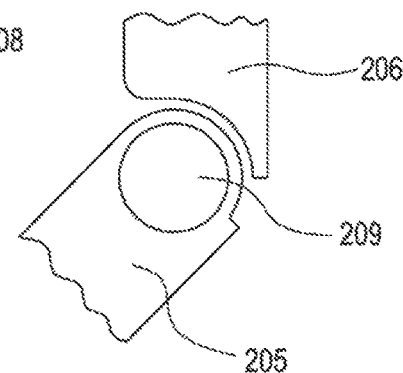
FIG. 1F  FIG. 1G

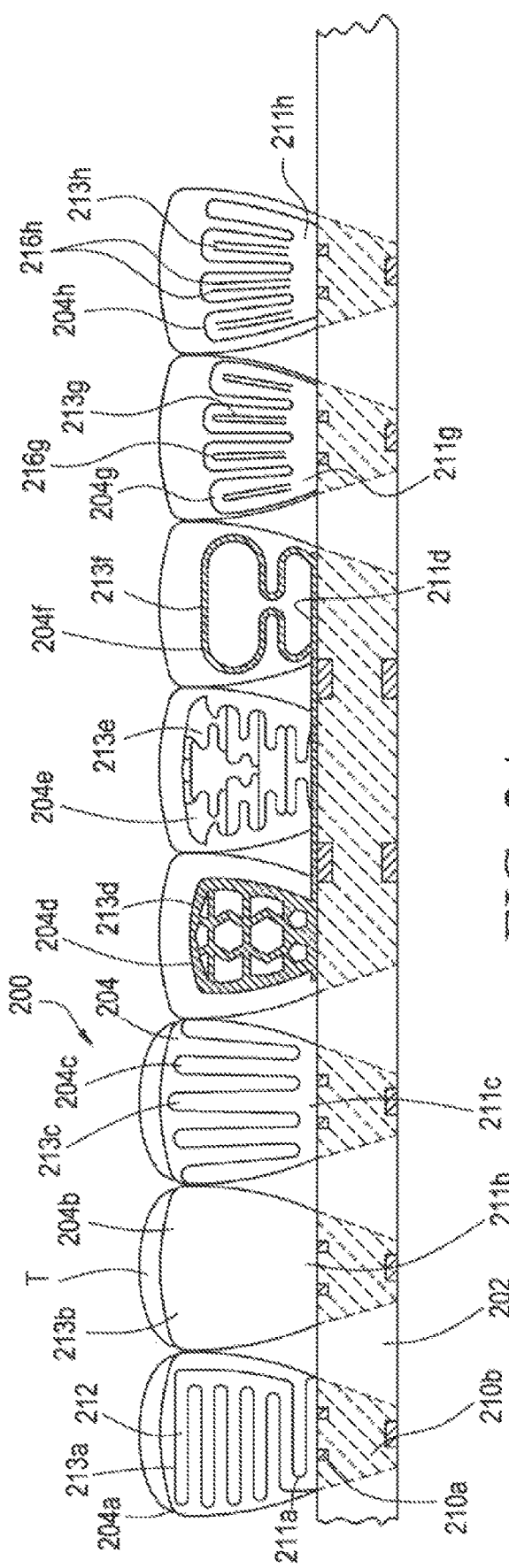
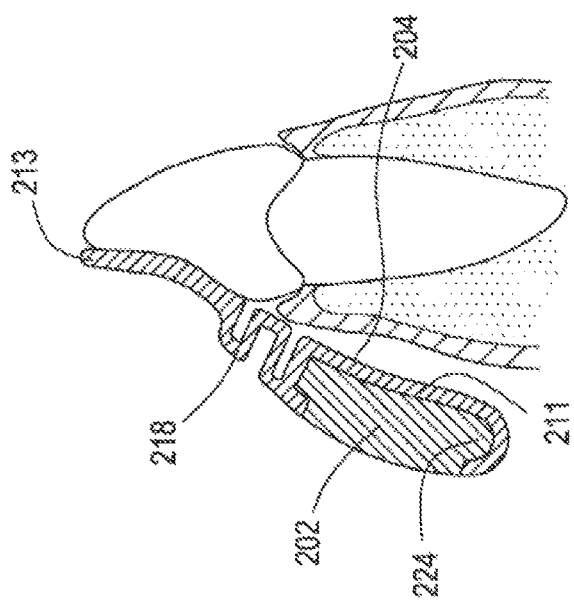
FIG. 2A
FIG. 2B

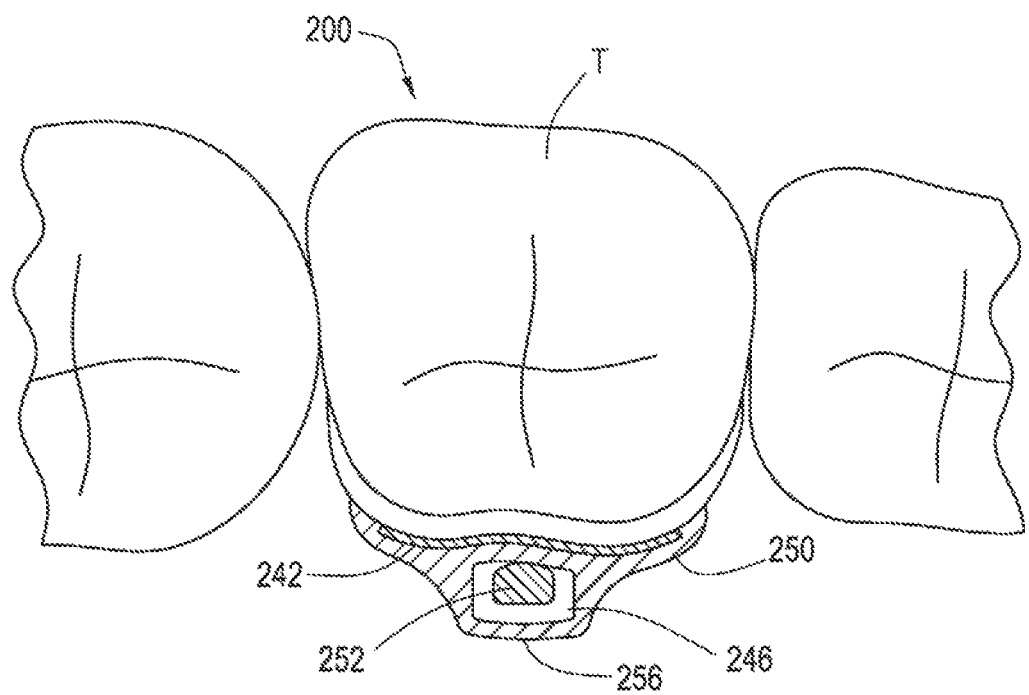
FIG. 6A
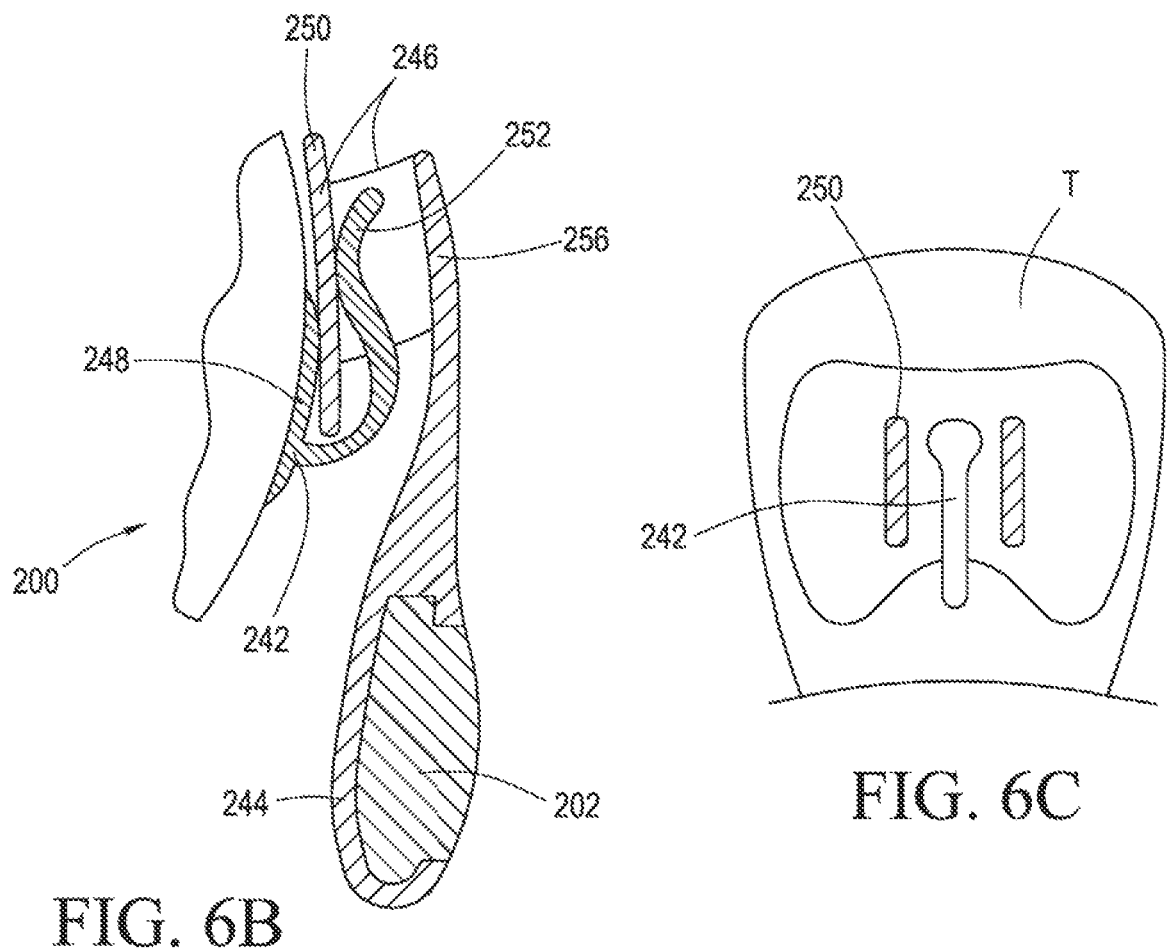
FIG. 6B
FIG. 6C

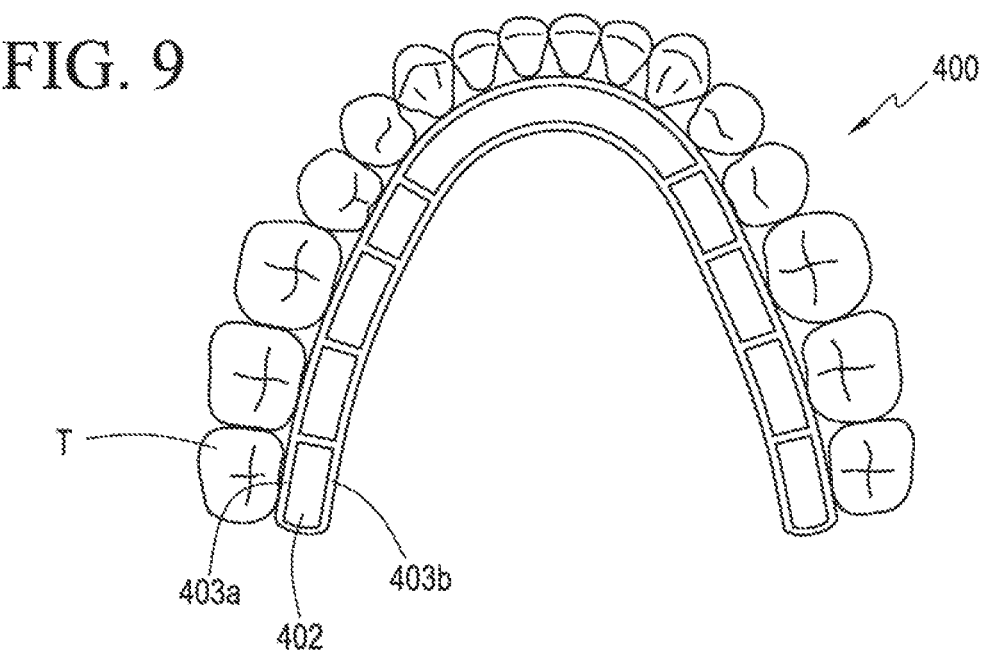
FIG. 9
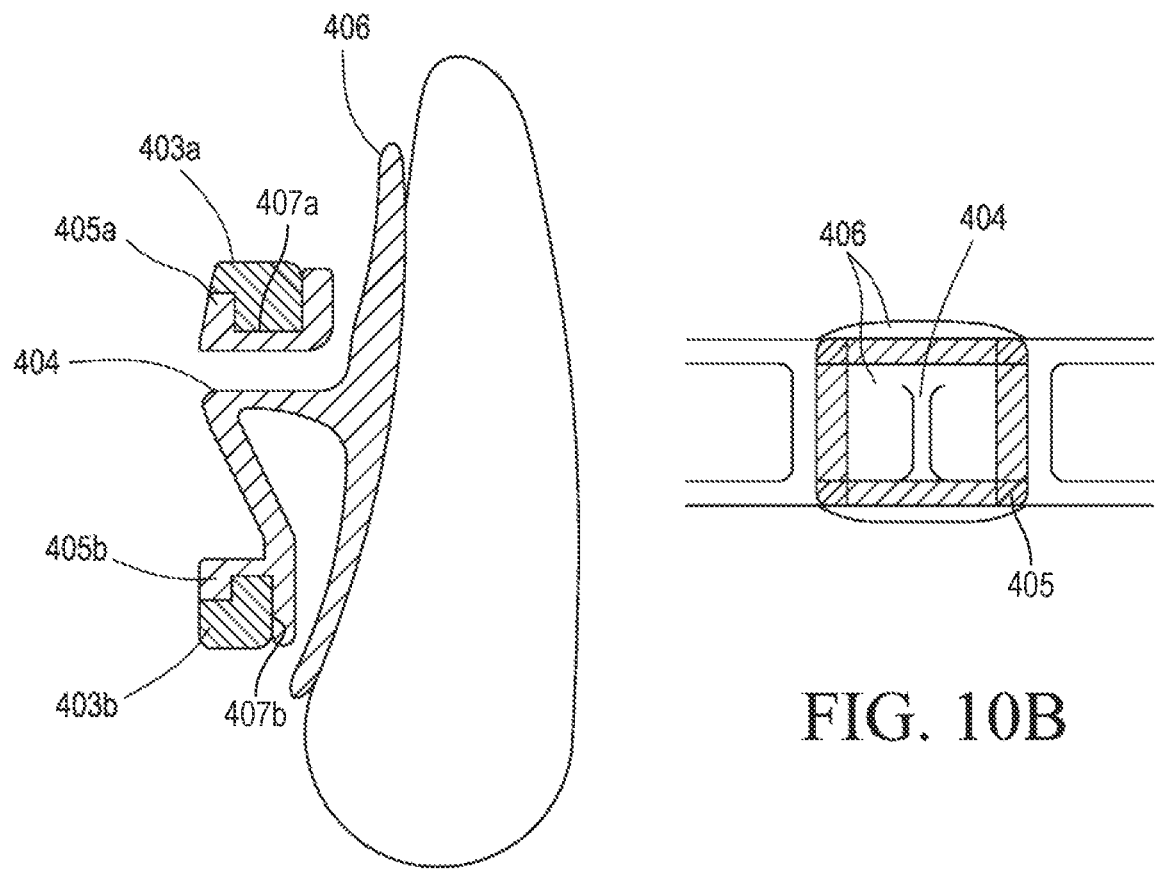
FIG. 10A
FIG. 10B

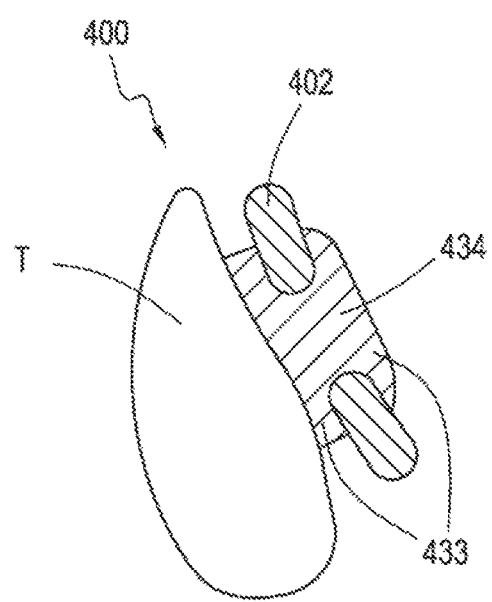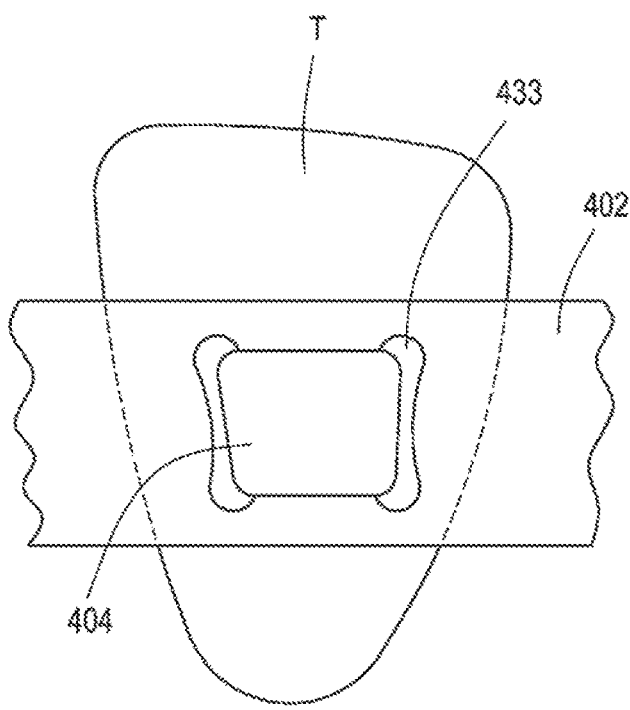
FIG. 12A
FIG. 12B

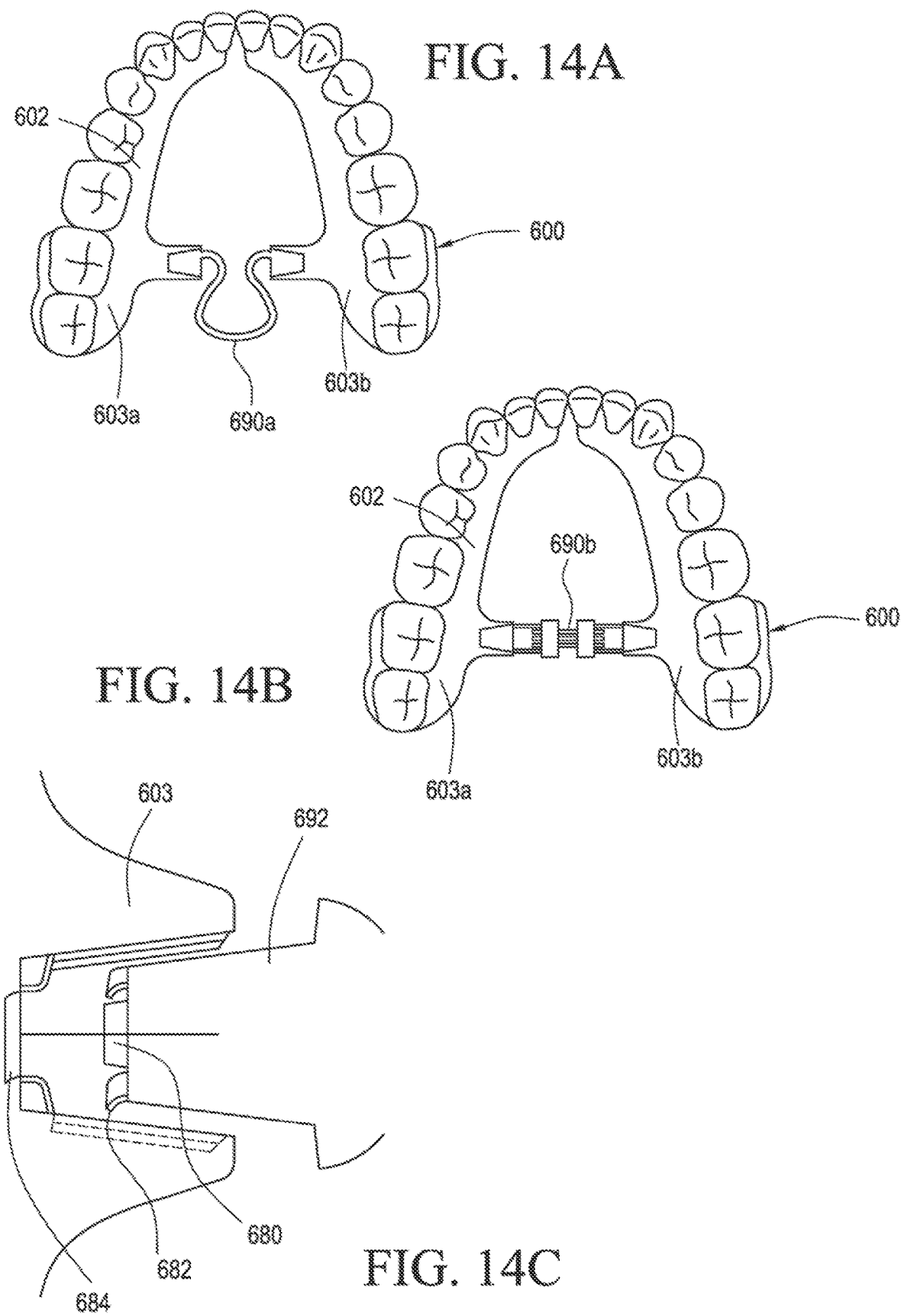

FIG. 15Zc
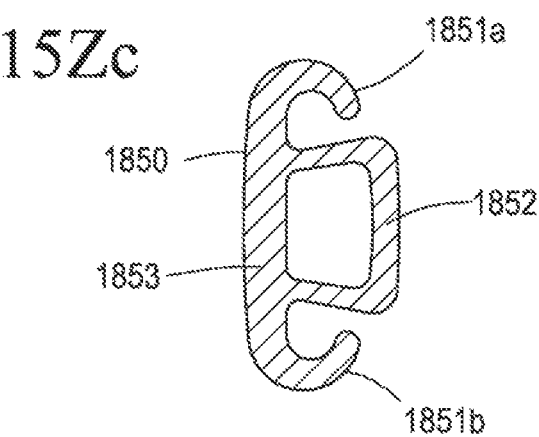
FIG. 15Zd
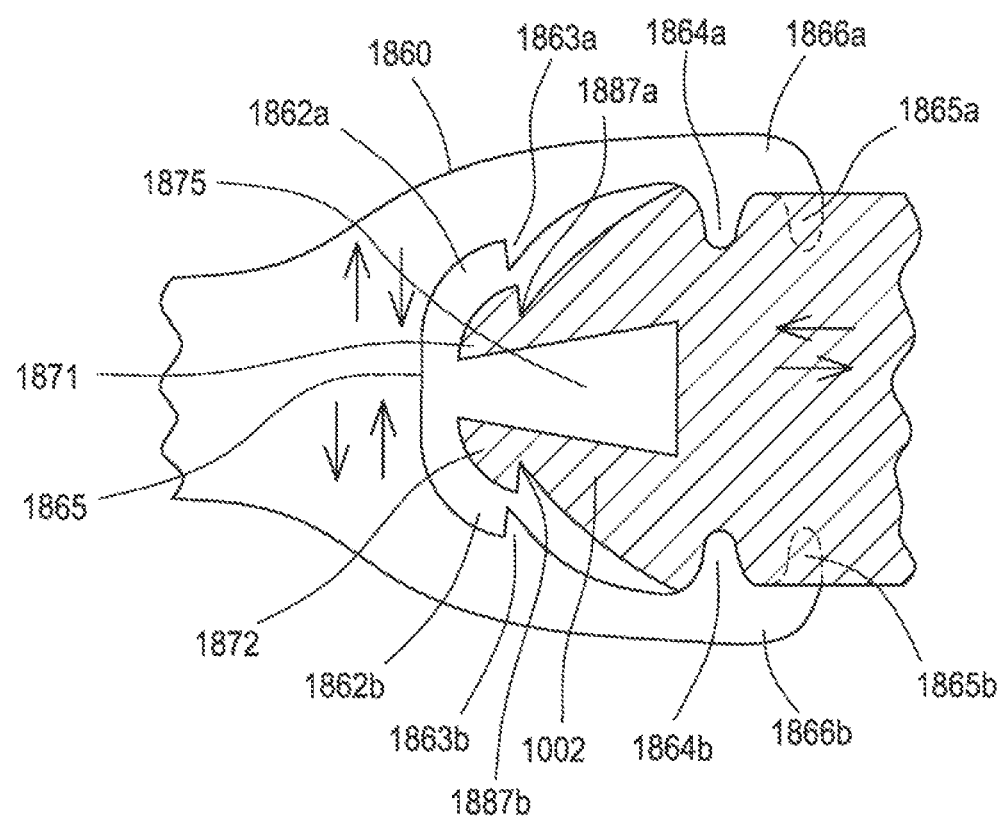

ORTHODONTIC ASSEMBLY

RELATED APPLICATIONS

This application is a continuation-in-part of PCT patent application number PCT/US2016/055773, filed Oct. 6, 2016, which claims priority U.S. patent application Ser. No. 14/879,555, filed Oct. 9, 2015, all of which are incorporated for all purposes by reference herein. This application also claims priority to U.S. Provisional Patent application No. 62/548,246 filed Aug. 21, 2017, which is incorporated for all purposes by reference herein.

TECHNICAL FIELD

The invention generally relates to a novel orthodontic assembly. More particularly, the invention relates to an orthodontic assembly having a versatile configuration including interchangeable and flexible components for causing tooth movement, bite correction and/or tooth position retention, while providing enhanced user comfort.

BACKGROUND OF THE INVENTION

Conventional orthodontic treatments are generally comprised of either fixed or removable components. Typically, the fixed components are bonded or cemented directly to the user's teeth, and a wire is inserted into brackets of the components and secured using elastomeric ties. The wire is usually bendable and may be distorted during the installation and adjustment process by the installer, which is typically an orthodontist or dental practitioner.

As the wire is adjusted into its original shape, the wire exerts a force on the connected tooth or teeth leading to teeth movement. In general, the force applied on teeth with the fixed orthodontic treatment is exerted only by the limited contact of the bracket, which in turn limits the contact forces exerted between the wire and the tooth. As such, in order to properly align the teeth using the fixed orthodontic treatment process, a series of wires are inserted into the brackets connected to the teeth.

The wire insertion process is typically initiated by inserting the most flexible wire first, and then inserting additional wires, gradually increasing the rigidity of the wire inserted into the brackets, thereby moving the teeth into the selected alignment.

One disadvantage of the above-described method is that the single rooted teeth, or the teeth with shorter roots, have a propensity to move first and flare forward, prior to the time of insertion of the more rigid wires, which tend to act on the posterior teeth to expand the arch (as in the cases of crowding). Further, when the wire is inserted into the arch, all of the teeth move simultaneously. As a result, treatment of a single tooth or a limited number of teeth is difficult to achieve without inadvertently exerting unwanted forces on teeth that are not targeted for treatment. Moreover, it is difficult to apply specific and different level forces on different teeth at the same time.

Additional problems with a fixed component orthodontic system may be compounded by poor patient oral hygiene and the inherent difficulties of brushing and flossing teeth with a fixed orthodontic system applied to the tooth. Poor oral hygiene may lead to white spots (decalcifications) appearing around the brackets or degeneration of periodontal tissue surrounding and supporting the teeth Consequently, inflamed gingiva, recession, or irreversible bone loss can occur during orthodontic treatment.

Furthermore, many patients do not like wearing the fixed orthodontic system because of the associated difficulties of chewing and eating and/or because of the undesirable aesthetics.

Removable orthodontic systems used to align the teeth are generally traditional spring acrylic retainers or clear shells that cover the entire surfaces of the teeth, similar to Invisalign®.

The acrylic spring retainers are generally composed of an acrylic frame and wires bent into a predetermined configuration and inserted permanently into the frame at the time of fabrication, where one or more wire components can be adjusted to apply a force on the tooth for tooth movement The disadvantages of the acrylic spring retainers include, but are not limited to, the following: The fabrication process is prolonged and difficult, especially as related to the fabrication and incorporation of smaller parts into the frame assembly. The size and thickness of the spring retainer can result in discomfort for the user and impede the user's speech. For practitioners, the acrylic spring retainers are of limited utility because they are generally limited to use on a small number of anterior teeth and they have limited capability to align the teeth.

Clear shell aligners are also removable appliances used to align the teeth that are of uniform thickness, cover the entire surface of the teeth, and must be changed with each subsequent movement of teeth.

The disadvantages of the clear shell aligners include, but are not limited to, the following: The user may experience discomfort because the aligners cover the entire surface of the teeth and the aligners may discolor with use, resulting in an unpleasant appearance. The uniformity of the clear shell aligners precludes application of deferential and precise force on specific teeth. For example, because of this, it is difficult to accomplish expansion of the arch successfully.

SUMMARY

In light of the present need for an orthodontic assembly to facilitate tooth movement and/or bite correction, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments relate to a removable orthodontic assembly to be used in a user's mouth, including: a frame member configured to be removably positioned proximate a lingual portion of the user's teeth; a first connector member, wherein the first connector member comprises a first end extending proximate to a labial portion of the user's teeth and a second end engaging the frame member; and a labial bow configured to be removably positioned proximate to the labial portion of the user's teeth having a first end and a second end, wherein the labial bow is configured to removably engage the first connector member.

Various embodiments are described, wherein the first connector member is an orthodontic clip configured to removably clip to the frame using a snap-fit connection.

Various embodiments are described, wherein the first connector member is formed integrally as part of the frame.

Various embodiments are described, wherein the second end of the first connector member includes a C-shaped head configured to engage the frame and the first end of the first connector member includes a C-shaped head configured to be removably connected to the labial bow.

Various embodiments are described, wherein the first end of the first connector member includes a C-shaped head configured to connect to the labial bow and the second end of the first connector member includes a C-shaped head configured to removably clip to the frame.

Various embodiments are described, wherein, the first end of the labial bow includes a first opening, a second opening, and an open slot connecting the first opening and the second opening, wherein the second opening is smaller than the first opening, and the first end of the first connector member has a fastener including a knob sized to be smaller than the first opening but larger than the second opening and a bridge configured to connect the knob to the connector member and wherein the bridge is sized to slide through open slot of the first connector member.

Various embodiments are described, further including a block member configured to be placed in the first opening.

Various embodiments are described, wherein, the first end of the first connector member includes a first opening, a second opening, and an open slot connecting the first opening and the second opening, wherein the second opening is smaller than the first opening, and the first end of the labial bow has a fastener including a knob sized to be smaller than the first opening but larger than the second opening and a bridge configured to connect the knob to the labial bow and wherein the bridge is sized to slide through open slot of the first connector member.

Various embodiments are described, wherein, the first end of the labial bow includes an elongated opening, wherein the elongated opening has a first width and a second width, wherein the first width is greater than the second width, the first end of the first connector member comprising a fastener including an elongated knob and a bridge configured to connect the knob to the first connector member, and the elongated knob has a third width and a fourth width and wherein the third width is greater than the fourth width, the third width is less than the first width but greater than the second width.

Various embodiments are described, wherein the first end of the labial bow member has a groove configured to capture and lock the first end of the first connector member when the labial bow is connected to the first connector member.

Various embodiments are described, wherein the first end of the first connector member includes an elongated opening, wherein the elongated opening has a first width and a second width, wherein the first width is greater than the second width, the first end of the labial bow has a fastener including an elongated knob and a bridge configured to connect the knob to the labial bow, and the elongated knob has a third width and a fourth width and wherein the third width is greater than the fourth width, the third width is less than the first width but greater than the second width.

Various embodiments are described, wherein the first end of the first connector member has a groove configured to capture and lock the labial bow to the first connector member when the labial bow is connected to the first connector member.

Various embodiments are described, wherein the labial bow further comprises extensions configured to engage a tooth.

Various embodiments are described, wherein, the first connector member further includes: a rod; and a C-shaped sliding member including a C-shaped body; a first locking extension and a second locking extension extending from the C-shaped body, wherein the first locking extension and the second locking extension extend towards one another; and an opening, wherein the opening is configured to receive the rod; wherein the first end of the first end of the labial bow further includes: a first locking block and a second locking block extending away from labial bow; and a first opening adjacent the first locking block and a second opening adjacent the second locking block; wherein C-shaped sliding member is configured to engage the labial bow by placing the first locking extension and the second locking extension through the first and second openings of the C-shaped locking member and then sliding the C-shaped sliding member so that the first locking extension and the second locking extension engage the first locking block and second locking block.

Various embodiments are described, wherein, the first locking member further comprises a board member extending from the C-shaped body with a board extension extending in a direction towards the labial bow, and the labial bow further comprises an opening configured to receive the board extension.

Various embodiments are described, wherein, the frame member further includes an end configured to connect to the first connector member further including: a first half-arrow portion extending from the end of the frame member including a first slot; a second half-arrow portion extending from the end of the frame member including a second slot; and an opening between the first half-arrow portion and the second half arrow portion, and the second end of the first connector member is configured to connect to the frame, including: a first prong including a first protrusion, a second protrusion, and third protrusion, wherein the first protrusion is at the proximal end and the first protrusion and the second protrusion are configured to receive the frame therebetween; a second prong including a fourth protrusion, a fifth protrusion, and sixth protrusion, wherein the fourth protrusion is at the proximal end and the fourth protrusion and the fifth protrusion are configured to receive the frame therebetween, and the third protrusion is configured to engage the first slot and the sixth protrusion is configured to engage the second slot when the frame member and first connector member are slid together so that the frame member and first locking member are securely fastened to one another.

Various embodiments are described, further including a block member configured to be placed in the opening between the first half-arrow portion and the second half arrow portion.

Various further embodiments relate to a removable orthodontic assembly to be used in a user's mouth, including: a frame member configured to be removably positioned proximate a lingual portion of the user's teeth; a first connector member, wherein the first connector member includes a first end extending proximate to a labial portion of the user's teeth and a second end engaging the frame member; and a labial bow configured to be removably positioned proximate to the labial portion of the user's teeth having a first end and a second end, wherein the labial bow is configured to removably engage the first connector member; and a first clip member including: a base portion configured to attach to the frame member; and a first head connected to the first base portion and configured to removably engage a tooth.

Various embodiments are described, wherein the head includes an elastic porous pad configured to engage the tooth and to apply the force to the tooth.

Various embodiments are described, wherein the head removably clips to the first base portion.

Various embodiments are described, wherein first base portion includes an opening configured to engage a frame extension.

Various embodiments are described, wherein comprising a screw and wherein the first base portion further comprises an extension configured to engage an opening in the frame and to receive the screw.

Various embodiments are described, wherein comprising a screw and wherein the first base portion further comprises an opening aligned with an opening in the frame to receive the screw.

Various embodiments are described, wherein comprising a second base portion removably engaging the first base portion and the frame, with a first opening, a pin, and a fastening member, wherein the first base portion further comprises a first opening configured to align with a first opening in the frame and the first opening in the second base portion and configured to receive the pin therethrough and wherein the fastening member is configured to engage a portion of the pin extending through the first opening in the frame to secure the first base portion and the second base portion to the frame.

Various embodiments are described, wherein the first base portion further comprises a first extension configured to engage a second opening in the frame and wherein the first base portion further comprises a second extension configured to engage a second opening in the second base portion.

Various embodiments are described, further including a second base portion removably engaging the first base portion and the frame, with an opening, and a C-shaped clip, wherein the first base portion includes a first extension configured to engage the opening in the second base portion and a second extension configured to engage an opening in the frame member, and wherein the C-shaped clip is configured to engage the second base portion and the frame to secure the first base portion and the second base portion to the frame.

Various embodiments are described, wherein the first base portion further includes: an extension in the vertical direction configured to engage a vertical opening in the frame; and a first fastening member and a second fastening member on opposite sides of the first base portion extension, wherein the first fastening member and second fastening member cooperatively engage the frame member to secure the orthodontic clip to the frame.

Various embodiments are described, wherein the first base portion extension further comprises a serrated surface configured to engage a corresponding serrated surface in the vertical opening in the frame.

Various embodiments are described, wherein, the frame member comprises a tapered part having a first section with a first elastic property and a second distal end section with a second elastic property providing different elasticity to the tapered part of the frame configured to engage the tooth.

Various embodiments are described, wherein the first base portion further comprises:

a C-shaped section; and first bottom extension and a second bottom extension, wherein the C-shaped section, first bottom extension, and second bottom extension are configured to engage an opening in a rigid portion of the frame; the head further includes: bar extending in a vertical direction; and sliding portion configured to slide along the bar and to engage a flexible portion of the frame configured to engage the tooth and apply a force to the tooth.

Further various embodiments include an orthodontic assembly to be used in a user's mouth, includes a frame member configured to be removably positioned proximate the lingual portion of the user's teeth including a fastening mechanism, and an interchangeable clip member configured to be removably affixed to the frame member such that the clip member engages at least one of the user's teeth. The fastening mechanism is configured to cooperatively engage the clip member such that the clip member may be removably affixed to the frame member.

In various embodiments of the orthodontic assembly, the frame member has a rigid portion configured to engage an inner portion of the user's mouth and a portion configured to engage at least one of the user's teeth.

In further various embodiments of the orthodontic assembly, the frame member includes a first rigid portion, a second portion, and a flexible intermediate portion provided intermediate to the first rigid portion and the second portion to provide flexibility to the frame member. The intermediate portion may have a flexible c-shaped cross-section configured to provide flexibility to the frame member.

In further various embodiments of the orthodontic assembly, the frame member includes a rigid portion having a first track member and a second track member in spaced relation to each other. The first track member and second track member each extend along an inner portion of the user's mouth and are cooperatively configured to operatively engage one or more clip members.

In further various embodiments of the orthodontic assembly, the frame member includes a first portion configured to engage a first lingual portion of the user's teeth, a second portion configured to engage a second lingual portion of the users' teeth and an adjustment member provided intermediate to the first and second portion to apply a force intermediate to the first and second portion to facilitate expanding the palate.

In further various embodiments of the orthodontic assembly, the frame member includes one or more tab members that extend from an inner portion of the frame member, permitting the frame member to be removably fastened to fixed screws inserted in the user's mouth.

In further various embodiments of the orthodontic assembly, the clip member includes a first portion configured to engage the frame member and a second portion configured to engage one or more of the user's teeth.

In further various embodiments of the orthodontic assembly, the clip member includes a portion configured to operatively engage the frame member and a flexible portion configured to operatively engage the tooth to facilitate tooth movement.

In further various embodiments of the orthodontic assembly, the clip member includes a retentive member configured to engage a portion of one or more of the user's teeth.

In further various embodiments of the orthodontic assembly, the clip member includes a first portion configured to engage a lingual portion of the user's tooth and a second portion configured to engage a buccal portion of the user's tooth.

In further various embodiments of the orthodontic assembly, the clip member includes a governing portion that cooperatively engages a lingual portion and an occlusal portion of the user's tooth to facilitate bite correction and tooth movement.

In further various embodiments of the orthodontic assembly, the first clip member includes a fastening portion that removably cooperatively connects to the frame member and second clip member, and a governing portion that extends over the occlusal surface to the buccal surface of the user's tooth to facilitate bite correction and tooth movement.

In further various embodiments of the orthodontic assembly, the orthodontic assembly further includes a bonded member fastened to at least one tooth, the bonded member configured to cooperatively engage the clip member such that the clip member and connected frame member may be removably affixed to the bonded member, so as to facilitate tooth movement and retention.

In further various embodiments of the orthodontic assembly, the orthodontic assembly further is operatively connected to the frame member and engages two or more teeth to facilitate tooth movement or retention.

In further various embodiments of the orthodontic assembly, the clip member has an engagement portion which includes a first flexible vertical wavelike member and a second flexible vertical wavelike members joined in a middle section to facilitate tooth movement.

In further various embodiments of the orthodontic assembly, the clip member has a flexible engagement portion that includes a plurality of flexible extension members and bristles that extend from the clip to engage and facilitate tooth movement.

In further various embodiments of the orthodontic assembly, the orthodontic assembly further includes a labial bow member that extends along an outer portion of the users' teeth and configured to operatively engage a first clip member connected to a first side of the orthodontic assembly and a second clip member connected to an opposing second side of the orthodontic assembly.

In further various embodiments of the orthodontic assembly, the orthodontic assembly includes at least two clip members, each including an outer lip portion including a locking portion configured to receivably engage a corresponding inner edge of the labial bow member.

In further various embodiments of the orthodontic assembly, the clip member is removably fastenable to an outer portion of the frame member.

In further various embodiments of the orthodontic assembly, the clip member is removably fastenable to an inner portion of the first track member and second track member of the frame member.

In further various embodiments of the orthodontic assembly, the orthodontic assembly, further includes a band member configured to receive a tooth member therein, the banded member configured to cooperatively engage the clip member such that the clip member and connected frame member may be removably affixed to the banded member, so as to facilitate tooth movement and retention In further various embodiments of the orthodontic assembly, the frame member is positioned proximate to the palatal portion of the user's teeth and the clip member fastenably engages a receiving portion of the frame member and includes a ramp portion configured to engage the opposing teeth in the mouth to facilitate bite correction.

In further various embodiments of the orthodontic assembly, the clip member includes an elastomeric pre-loaded biasing member configured to operatively engage at least one tooth to effectuate tooth movement.

In further various embodiments of the orthodontic assembly, an adjustment member includes a clip with a flexible biasing member configured to exert a force on the first portion and second portion of the frame member so as to facilitate expanding the palate.

In further various embodiments of the orthodontic assembly, an upper assembly includes at least one clip member with a first hook extending in a first direction and a lower assembly includes at least one clip member with a second hook extending in an opposing second direction of the first hook, wherein the first hook and second hook are operatively connected with at least one biasing member so as to facilitate bite correction and tooth movement.

In further various embodiments of the orthodontic assembly, the clip member is provided intermediate to the frame member and user's tooth.

In further various embodiments of the orthodontic assembly, the frame member is configured and manufactured to fit in a selected user's mouth via 3-D printing.

In further various embodiments of the orthodontic assembly, the clip member is configured and manufactured to engage the frame member and tooth via 3-D printing.

In light of the present need for a versatile orthodontic component assembly, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

BRIEF DESCRIPTION OF DRAWINGS

FIG. 1C is a side cross-sectional view of the frame member of FIG. 1B, including an intermediate flexible C-shaped portion provided along a central portion of the frame member;

FIG. 1D is a side cross-sectional view of the frame member of FIG. 1B, illustrating an intermediate flexible helical coil shaped portion provided along a central portion of the frame member;

FIG. 1E is an environmental internal view of the frame member of FIG. 1B, illustrating an intermediate sinusoidal shaped portion provided along a central portion of the frame member;

FIG. 1F is an environmental internal view of the frame member of FIG. 1B, illustrating an intermediate vertical wave-like configuration provided along a central portion of the frame member;

FIG. 1G is a side cross-sectional view of the frame member of FIG. 1B, illustrating an intermediate rotating hinge portion provided between two portions of the frame;

FIG. 6A is an occlusal partial top view of an embodiment of the orthodontic assembly, illustrating a clip member operatively engaged with a member in bonded connection with a user's tooth;

FIG. 6B is a side cross sectional view of the orthodontic assembly of FIG. 6A, illustrating the clip and frame members and bonded member in an operatively engaged connection;

FIG. 6C is a lingual side view of the orthodontic assembly of FIG. 6A engaged with the lingual surface of the user's tooth;

FIG. 9 is an environmental top view of the occlusal surface of a user's mouth illustrating another embodiment of the orthodontic assembly including an embodiment of a track frame member, positioned about the lingual portion of the user's teeth;

FIG. 10A is a cross-sectional side view of the orthodontic assembly of FIG. 9, illustrating the frame member and clip member operatively engaged with a tooth;

FIG. 10B is lingual perspective view of the orthodontic assembly of FIG. 9 illustrating the clip member with operative engagement with the frame member

FIG. 12A is a cross sectional side view of a pre-loaded biasing clip member connected to the track frame member of FIG. 9, providing a biasing force on an engaged tooth;

FIG. 12B is an environmental lingual view of the pre-loaded biasing clip member and frame track member interconnected;

FIG. 14A is an environmental top view of an embodiment of an orthodontic assembly provided on a palatal surface of the mouth, including an adjustment member for expanding the palate using a spring clip;

FIG. 14B is an environmental top view of an embodiment of an orthodontic assembly provided on a palatal surface of the mouth for expanding the palate using a screw clip member;

FIG. 14C is environmental view of a clip member removably insertable into a portion of the adjustment member of 14A;

FIG. 15Xb is a side view of preconfigured part of the frame member for the sliding connection with the modified C-shaped locking clip of FIG. 15Xa;

FIG. 15Xc is a top view of the preconfigured part of the frame member for the connection with the modified C-shaped locking clip of the FIG. 15Xa;

FIG. 15Xe is a side view of the adjustment tube of the modified C-shaped locking clip with prism and cylinder shape parts;

FIG. 15Yb is a top view of top-locking clip of FIG. 15Ya;

FIG. 15Yc is a front view of the ring of the top-locking clip of FIG. 15Yb;

FIG. 15Zb is a top view of the hinge locking clip of FIG. 15Za;

FIG. 15Zc is a slide view of a removable second clip of FIG. 15Za for locking the first clip and frame members of the assembly;

FIG. 15Zd is a side view of another clip member of the assembly of FIG. 15M illustrating half-arrow locking clip member;

To facilitate understanding, identical reference numerals have been used to designate elements having substantially the same or similar structure and/or substantially the same or similar function.

DETAILED DESCRIPTION

Figure 1A:
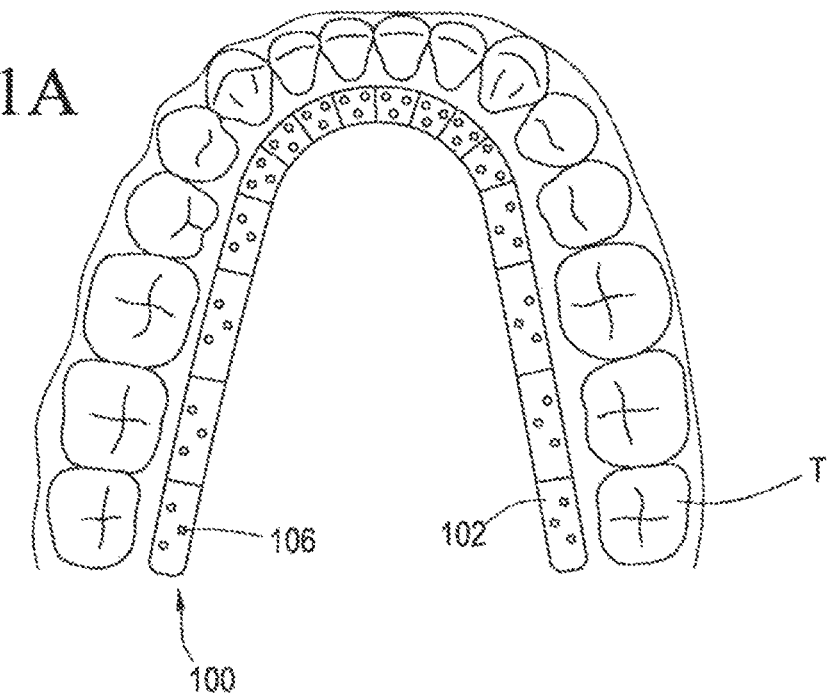
FIG. 1A is an environmental occlusal view of a user's mouth, showing a frame member of an orthodontic assembly positioned about the lingual surface of the user's teeth.

As previously discussed, conventional fixed orthodontic assemblies are undesirable esthetically; pose difficulties for the user to maintain good oral hygiene; and do not provide the precision and customization needed to selectively exert a force on a tooth, or group of teeth. One of the inherent disadvantages to existing removable appliances relates to the difficulty of fabrication and limitations related to the application of force on the teeth, as discussed previously. Accordingly, it is desirable to use a removable orthodontic assembly that is not uniform in its construction and application of force on the teeth. Such a removable orthodontic assembly provides an esthetic alternative to a fixed orthodontic assembly in that it can be removed from the mouth to permit proper oral hygiene care or removed for limited periods of time for the user's esthetic preferences (for example, when attending a formal event). When configured with versatile flexible components, a removable orthodontic assembly can exert precise force on one or more selected teeth and reduce the force exerted on teeth excluded from treatment. The components can be changed with subsequent movement of the teeth and/or changes to the bite without the need to replace the entire appliance.

It is also desirable to have a removable retainer assembly with flexible components that is incorporated into the frame assembly. Such an assembly can be used to allow desirable teeth settling following fixed orthodontic treatment and to regain minor tooth movement as teeth shift and relapse to an undesirable position due to poor retainer wear by the user.

3-D printing of embodiments of the orthodontic assembly provides versatility with one or more interchangeable clip members which may include the combination of a single extension, plural extensions, bristles pads, rests, clasps, occlusal coverage, or any other desirable component to precisely engage any part of the selected tooth or teeth, aid in securing the assembly on the teeth or in the mouth, or have components that are used to aid in teeth alignment, bite correction and/or habit modification. Further, 3-D printing of the orthodontic assembly provides customizable clip members having a variety of selected sizes, materials, shapes, directions, thickness, flexibility, configurations, and extensions, which may vary depending upon the dental practitioners/installers' desired treatment results.

3-D printing of embodiments of the orthodontic assembly provides versatility in fabricating a frame member, designed to allow attachment of a clip or group of clips, and having a variety of selected sizes, materials, shapes, directions, thickness, flexibility, configurations, and extensions. 3-D printing of embodiments of the orthodontic assembly provides versatility in fabricating the frame member with intermediate flexible parts or with any other flexible components to be positioned directly or indirectly on the teeth, which may include the combination of a single extension, plural extensions, bristles, rests, clasps, occlusal coverage, or any other desirable component to precisely engage any part or parts of the selected tooth or teeth, aid in securing the assembly on the teeth or in the mouth, or have components that are used to aid in teeth movement, bite correction, and/or habit modification.

3-D printing of embodiments of the orthodontic assembly provides versatility with frame assembly. This versatility allows the assembly to achieve desirable teeth settling following fixed orthodontic treatment and regain minor tooth movement as teeth shift and relapse due to undesirable positions caused by poor retainer wear by the user. The foregoing are illustrative of those that may be achieved by the various exemplary embodiments and are not intended to be exhaustive or limiting of the possible features which may be realized. Thus, these and other features of the various embodiments will be apparent from the description herein or can be learned from practicing the various embodiments, both as embodied herein or as modified in view of any variation that may be apparent to those skilled in the art. Accordingly, the invention resides in the novel methods, arrangements, combinations, and improvements herein shown and described in various exemplary embodiments. To facilitate understanding, identical reference numerals have been used to designate elements having substantially the same or similar structure and/or substantially the same or similar function.

3D printing and CAD design with the orthodontic assembly allow versatility with designing the assembly or attachment on the teeth using algorithms, artificial intelligence, AI, topology optimization and geometry modification including by not limited to designing the assembly with round, hexagonal or any other grid structures for added strength. These tools when used with various imaging and measurement tools that map patient's mouth, may be used to specifically tailor the orthodontic assembly to the patient's needs and desired outcome. Further, these techniques are used throughout treatment so that progress of the treatment towards the desired outcome is monitored and adjusted as needed.

Figure 1B:
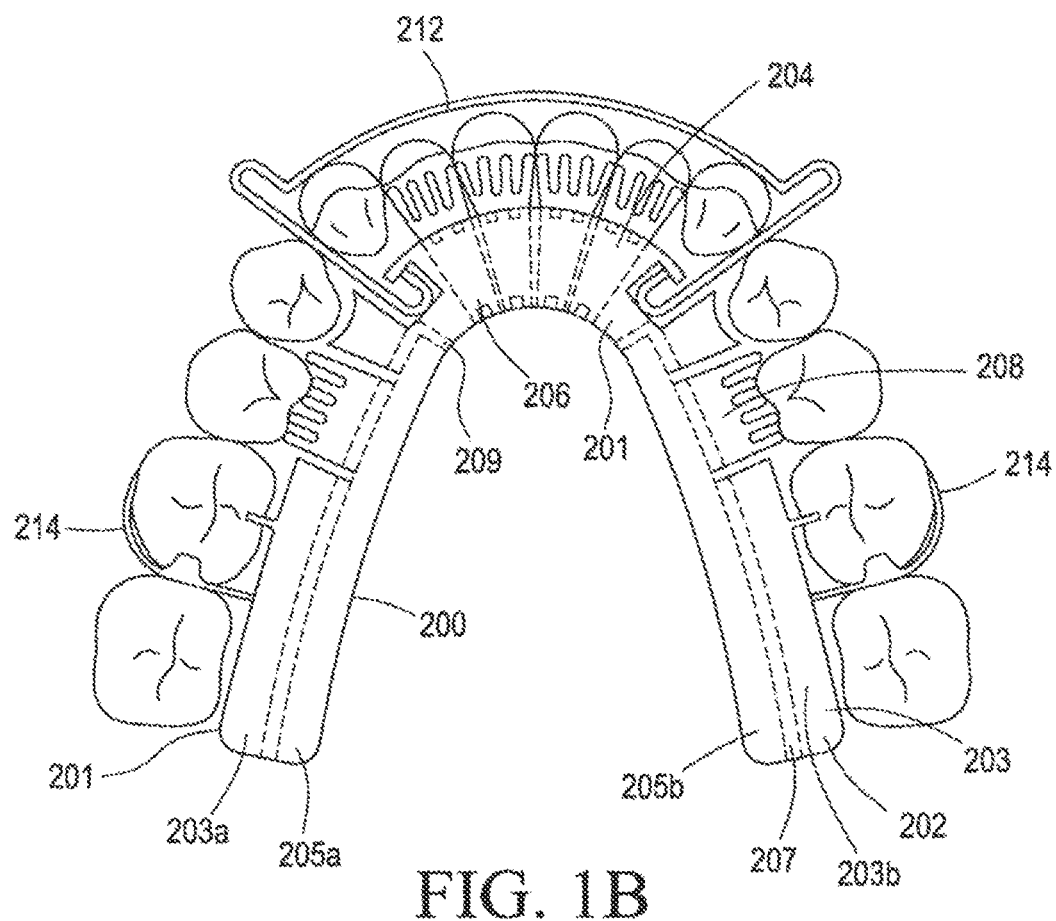
FIG. 1B is an environmental occlusal view of a user's mouth illustrating the orthodontic assembly including the frame member having intermediate portions and a plurality of interchangeable active components and removable clip members operatively engaged with the frame member.

Referring now to the drawings, wherein the illustrations are for purposes of describing one or more embodiments and not for the purposes of limiting the same, FIGS. 1A and 1B illustrate an embodiment of the orthodontic assembly FIG. 1A is configured for facilitating tooth movement, and/or tooth retention, when positioned in operative engagement in the user's mouth and teeth T. The orthodontic assembly 100 generally includes a frame member 102, and one or more clip members 104 (not shown), removably attachable to the frame member 102. The clip member 104 may be connected to the frame member 102 using a variety of fastening features, such as a snap-fit connection, or a screw fastener, for example.

The frame member 102 has a generally arcuate or U-shaped configuration, which via 3-D printing may include a rigid and/or a semi-rigid structure that is configurable to conform to the upper and/or lower palate of a user's mouth. Accordingly, via 3-D printing, the frame member 102 may be selectively customized for the user by scanning the interior of the user's mouth, and forming the frame member's structure based on the topography and/or shape of the interior of the user's mouth detected by the 3-D printer scan.

Notably it is contemplated that tooth movement may be effectuated using a "virtual tooth movement process." In this process, the user's teeth are scanned at several preselected views. A virtual mold of the user's teeth is then created and the user's teeth are then virtually moved in images and to create a series of virtual molds upon which the orthodontic assembly is virtually created and printed. The Printed components of the assembly have a number and/or a letter to facilitate the assembly and subsequent replacement of the components.

Accordingly, the frame member 102 may be comprised of but not limited to, metal, photo-hardening polymer and/or a variety of different material conducive for 3-D printing. It is contemplated that the 3-D printing methods used for manufacturing the frame member 102 may include, however are not limited to, fused deposition modeling, as well as, additive manufacturing processes for metal sintering, such as selective laser sintering, direct metal laser sintering or selective laser sintering, for example. Notably, other known 3-D printing methods used to manufacture metal and/or polymer devices, similar to the frame member 102, clip members 104 and other active components of the orthodontic assembly may be contemplated The frame member 102 is configured to receive one or more clip members 104 and other attachable components in a variety of configurations. As illustrated, the frame member 102 may include one or more extrusions and/or grooves 106 that are adaptable to receivably fasten a portion of the clip member 104 to the frame member 102. Similar to the frame member 102, the clip member 104 and other interchangeable components, may be configured using 3-D printing methods. The clip member 104 and components are configurable via 3D printing such that when the selected clip member 104 is fastened to the frame member 102 it exerts a pre-selected biasing force on the user's teeth based on the manufactured shape. The frame, clips or any other part of the assembly can be manufactured using other methods of fabrication in addition to 3D printing.

FIG. 1B illustrates an embodiment of the orthodontic assembly 200 similar to that of the orthodontic assembly 100 illustrated in FIG. 1A. The orthodontic assembly 200 illustrated in FIG. 1B may be comprised of a combination of flexible portions, semi-flexible portions and rigid portions integrally connected together with flexible intermediate connectors. As illustrated in FIG. 1B, the orthodontic assembly 200 may include a combination of different components to facilitate tooth retention and/or movement. The components of the assembly may include, but are not limited to, one or more interchangeable clip members 204, one or more retainer members 212, one or more C-clasp member 214, and one or more force elements 208, which may be integrally connected to the frame member 202 or connected by intermediate flexible connector, to operatively engage the tooth. Notably, these components may be selectively configured and manufactured via 3-D printing. Different materials can be incorporated into the fabrication of the orthodontic assembly such that the different components can be made of different materials. An example of this multi-material fabrication would be the fabrication of flexible titanium alloy active components, while fabricating other components of the assembly with polymeric materials. As part of this fabrication process, after initial fabrication of the 3D-printed first part, it is scanned and the second or same machine is calibrated with the 3D geometry of the first part to fabricate the second part by adding and building/mounting new and different material(s) in a preselected area so that the first part is imbedded and retained in the new material.

The frame member 202 may include a variety of different connection points and different levels of rigidity, and may be constructed from different materials which can be facilitated by 3-D printing. Accordingly, the frame member 202 may be a rigid or semi-rigid structure of virtually any shape, size, or thickness that, directly or indirectly via the clip members 204 and other components such as intermediate connectors, facilitate tooth movement, retention, support, habit modification and/or teeth and jaw alignment. Similar to the aforementioned embodiments, the frame member 202 may be manufactured using 3-D printing methods to provide a precise and conforming fit with the user's mouth. The frame, clips or any other part of the assembly can be manufactured using other methods of fabrication in addition to 3D printing.

The frame member 202 is customizable to the user. As illustrated in FIG. 1B, the frame assembly 202 may include an upper portions 203a, 203b positioned proximate to the teeth T, a lower portions 205a and 205b positioned proximate to the user's palate, front portion 201 connected together with a flexible intermediate portion 207. As previously discussed, the frame assembly 202 is customizable via 3-D printing, thus any of the portions 203a, 203b, 205a, 205b, 201 and 207 of the frame assembly 202 may be selectively configured with a variable range of rigidity and materials during manufacturing.

FIGS. 1C-1D are cross-sectional views of embodiments of the frame assembly 202 of the orthodontic assembly illustrated in FIG. 1C, the intermediate portion 207c of the frame assembly 202 may include a flexible C-shaped element 215c positioned between the top portion 203 and lower portion 205 of the frame assembly 202. The C-shaped structure provides a gap or opening 217 formed therein permitting the structure 207c and connected frame assembly 202 to bend or flex when inserted in the user's mouth thereby providing sufficient force to move the tooth or teeth into a selected position through the upper portion 203 of the frame assembly 202. Similar to the aforementioned embodiment, a W shaped element or other element that provide flexibility between different parts of the frame or clips may not only be used to provide a force to move the teeth, but also to provide the flexibility to prevent breakage from rough handling.

FIG. 1D is a cross-sectional view of another embodiment of the orthodontic assembly and frame assembly 202. The frame member 202 may have a generally flexible helically-coiled element 215d provided generally at the intermediate portion 207d between upper portion and lower portion 205 of the frame assembly 202. Similar to the aforementioned embodiment, the helically-coiled element 215d bends when the assembly is inserted in the user's mouth therefore providing the force to move the tooth or teeth into a selected position through the upper portion 203 of the frame assembly 202. FIG. 1E is lingual view of another embodiment of the orthodontic assembly and frame assembly 202. Similar to aforementioned embodiments, the frame assembly 202 has upper portion 203 and a lower portion 205 and an intermediate flexible element 215e positioned at the intermediate portion 207e, between the upper portion 203 and lower portion 205. As illustrated, the flexible element 215e includes one or more generally horizontally positioned sinusoidal wave-like structure 215e that weave between the upper portion 203 and lower portion 205 of the frame assembly 202, providing the frame assembly 202 with flexibility.

FIG. 1F illustrates another embodiment of the frame assembly 202 and orthodontic assembly. The active component is operatively connected to the frame assembly 202 by one or more vertically aligned sinusoidal wave-like elements 215f. This flexible integral connection permits the active component to flex relative to the frame member 205. As illustrated in this embodiment, two wave-like elements 215f extend between the frame member 205 and active component 208. Notably, more than two wave-like elements 215f may be provided to control the rigidity and flexibility of the intermediate part. Similar design can be incorporated into clip assembly for added flexibility.

FIG. 1G is cross-sectional views of an embodiment of the frame assembly 202 of the orthodontic assembly 2s illustrated in FIG. 1G, the intermediate portion 209 of the frame assembly 202 may include a rotating hinge element positioned between the front portion 206 and lower portion 205 of the frame assembly 202. Hinges may be used in retainers or assemblies to allow different parts to be folded in different directions for a variety of functions, including but not limited to, reducing their size to allow them to be kept and stored in smaller cases or to facilitate insertion and removal from the mouth.

Hinges may be may be configured to rotate in any directions and may be used anywhere in the frame, clips or assembly.

The clip members 204 are customizable interchangeable components capable of being removably connectable to the frame member 201 or the frame assembly 202. The clip members may be manufactured via 3-D printing. This permits the manufacturer to selectively customize the rigidity and flexibility and the material of the clip members 204 in accordance with the user's needs.

The clip member 204 may be configured for a different functions including but not limited to selectively exert a force on the tooth T or selected teeth, in order to facilitate tooth movement, retention, bite correction and/or habit modification. The clip members 204 may include flexible components for exerting a biasing force on the engaged tooth or teeth. Accordingly the clip member 204 is configured to bend or flex when the orthodontic assembly 2 positioned in the user's mouth.

FIG. 2A illustrates a plurality of clip members 204a-h having a variety of configurations, connected to the frame member 202 for effectuating tooth movement/tooth retention. As shown, each clip member 204 a-h may include a base portion 211a-h configured for fastenable engagement with the frame member 202, and a head or leaves portion 213a-h configured for operative engagement with the tooth T. As seen in FIG. 2B after the base portion 211 the rest of the clip may rest on the entire surface of the tooth, and accordingly is not limited to only the head portion.

As illustrated, the head portions 213a-h of the clip members 204a-h may have a variety of configurations to selectively distribute forces exerted on the tooth T by orthodontic assembly for example, the clip member 204b may be a singular flexible member 213b, clip member 204g may be double flexible member 213g, or clip member 204h may be triple flexible member 213h that substantially engages a lingual portion of the tooth T. The double flexible member 213g may be generally U-shaped with a slit or opening 216g that allows for additional flexibility. The triple flexible member 213h may be generally M-shaped with two slits or openings 216h that allow for additional flexibility. In other examples, the respective clip members 204c and 204a may include a group of smaller flexible vertical extension members/leaves 213c or horizontal extension members 213a that cooperatively engage the surface of a tooth T to effectuate tooth movement or retention. The head member 213f includes two flexible vertical wavelike members joined together in a middle section. As shown, head members 213*d* and 213*e* have multiple flexible members joined with a pattern.

Accordingly, it is contemplated that virtually any clip member 213 shape or configuration can be designed to effectuate tooth movement or retention.

It is contemplated that the head portions 213*a* and 213*c* of the respective clip members 204*a* and 204*c*, may be constructed to cover approximately the same surface of the tooth T as the singular flexible member 213*b* of the clip member 204*b*, double flexible member 213*g*, or the clip member 204*g* or triple flexible clip member 213*h* of the clip member 204*h*. The contact surface area between the active part of the clip member and the tooth surface may vary and depending on, the shape of the tooth, the amount of force and direction of force needed to effectuate tooth movement, and contact with the opposing tooth or teeth T. The contact surface area is not limited to the above-mentioned factors.

The head portions 213*a* and 213*c* provide the respective clip members 204*a* and 204*c* with a plurality of flexible thin extension members engaged on the lingual portion of the tooth T. The head portions 213*a* and 213*c* may be configured to exert precise forces at selected locations on the tooth T. The tip of the clip member may provide most of the force but the rest of the clip can also provide force transitioning toward the base of the clip member.

Most typical singular plate members are relatively rigid. In contrast, as illustrated in FIG. 2B, the singular plate clip member 204 may include a flexible intermediate portion or feature 218 connected to an extension or leave member 213. Notably, multiple flexible intermediate features, or similar flexible features, 218 may be added to the clip to enhance flexibility, as illustrated in FIG. 2F. As shown in FIG. 2A, the clip member 204*f* has an upper engagement portion 213*f* which includes a first curved member that engages an outer portion of the selected tooth and a second curved member that engages an opposing outer portion of the selected tooth to facilitate provide added flexibility.

Notably, it is contemplated that the clip member 204 and other engagement components in cooperation with the flexible feature 218 will have the flexibility to be provided as a singular flexible plate member that engages one tooth T.

As shown in FIG. 2B-2E the clip member 204 may be removably fastenable to the frame member 202 using a snap-fit connection. As shown the clip member 204 may include fastening member's 210*a-b* and an opening 224 provided there between for receiving a portion of the frame member 202 therein. Additionally, one or more screws or fasteners 222 may be used to further secure the clip member 204 to the frame member 202.

Figure 2C:
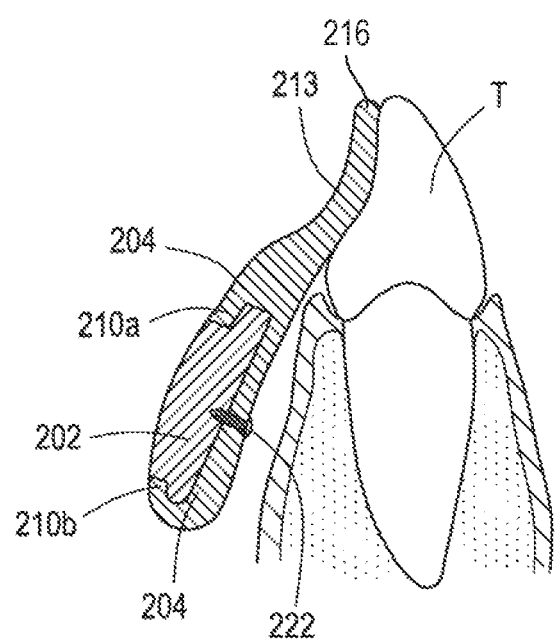
FIG. 2C is a side cross-sectional view of the orthodontic assembly of FIG. 2A illustrating the clip and screw member fastened to the frame member and operatively engaged with a lingual portion of the user's tooth in a first position.
Figure 2D:
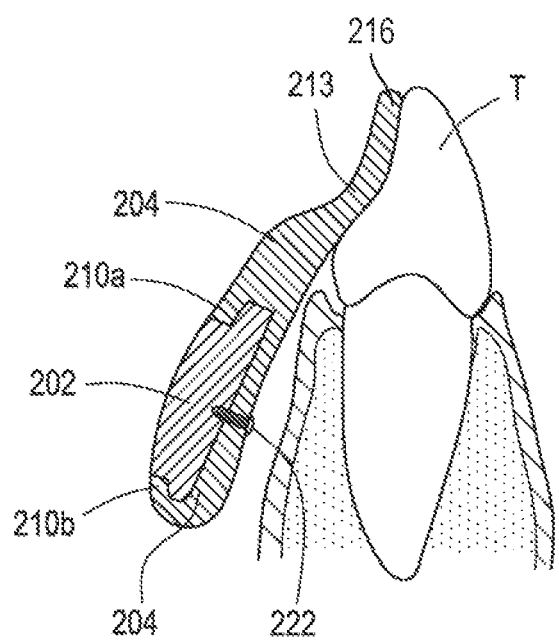
FIG. 2D is a side cross-sectional view of the orthodontic assembly of FIG. 2A operatively engaged with a lingual portion of the user's tooth showing the tooth moved into a second position.
Figure 2E:
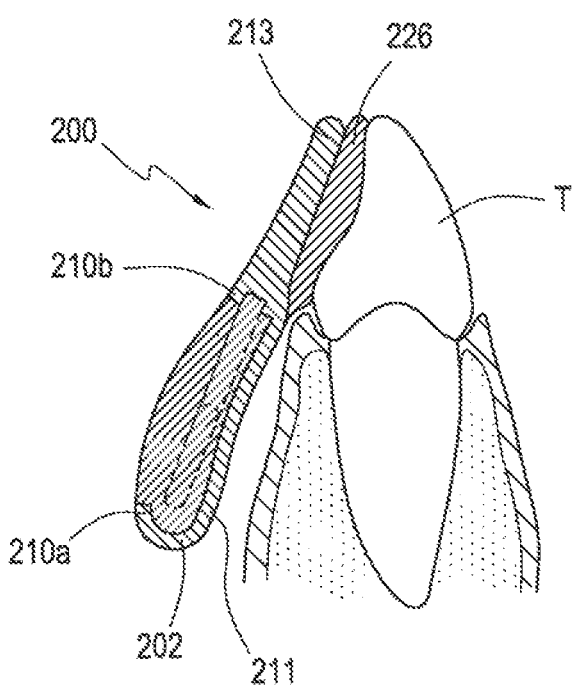
FIG. 2E is a side cross-sectional view of the orthodontic assembly of FIG. 2A illustrating a clip member having bristle shaped pads components engaged with a tooth.
Figure 2F:
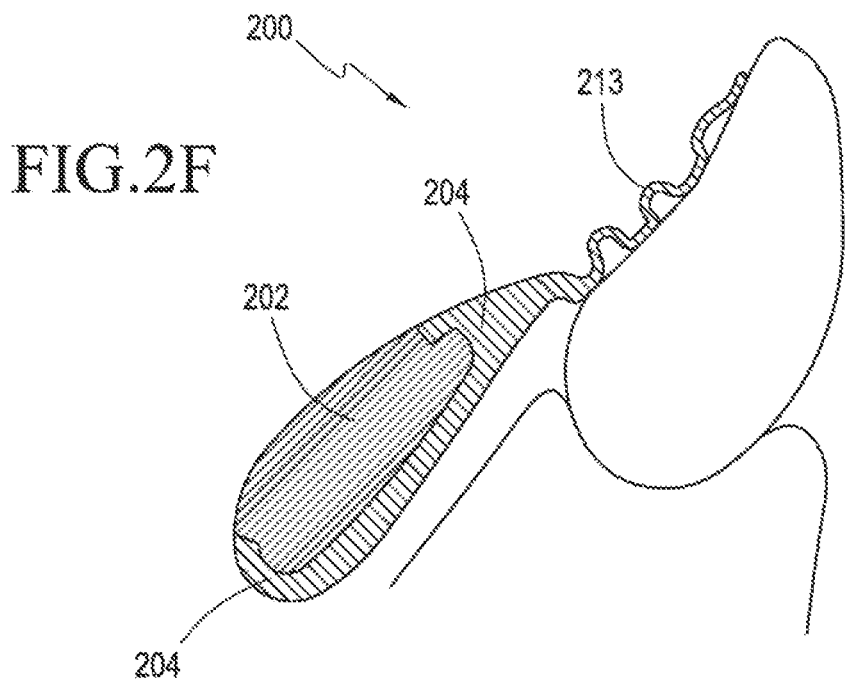
FIG. 2F is a side cross-sectional view of the orthodontic assembly of FIG. 2A illustrating a clip member having a flexible configuration engaged with a tooth.
Figure 2G:
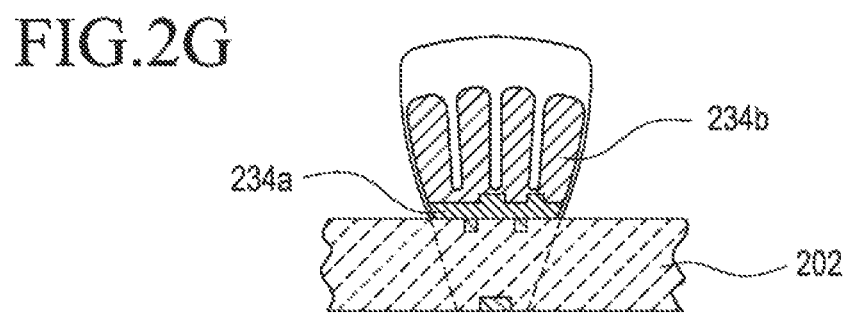
FIG. 2G is an environmental internal view of the orthodontic assembly including the frame member of FIG. 1B and a first and second clip member, wherein the first clip member engages a tooth surface and a second clip member, the second clip member engages a first clip member and a frame.
Figure 2H:
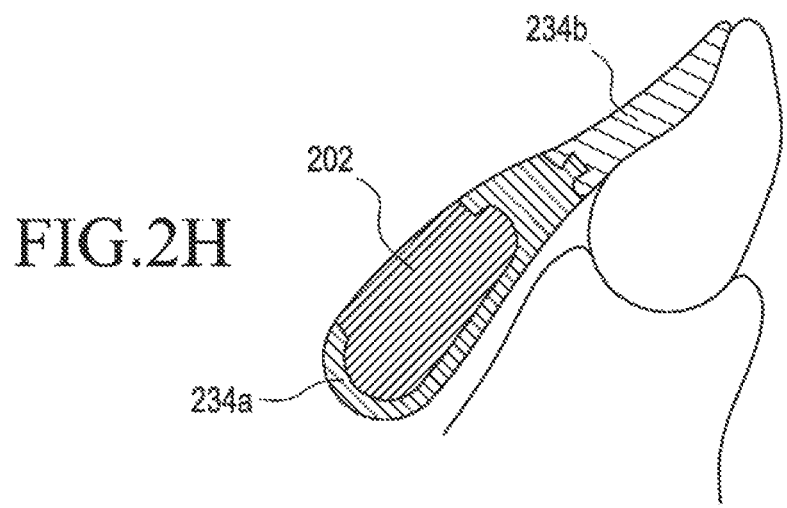
FIG. 2H is a side cross-sectional view of the orthodontic assembly of FIG. 2G.

As illustrated in FIG. 2G and FIG. 2H, the clip may include a first clip member 234*a* and a second clip member 234*b*. FIG. 2G illustrates an environmental internal view of the orthodontic assembly including the frame member 202 of FIG. 1B and the first clip member 234*a* and the second clip member 234*b*, wherein the first clip member 234*a* engages the frame 202 and engages the second clip member 234*b*, and the second clip member 234*b* engages the first clip member 234*a* and the tooth. Further, the second clip member 234*b* may engage an attachment on the tooth surface or any member that is used to align the teeth, correct the bite, or modify habits. FIG. 2H is a side cross-sectional view of the orthodontic assembly of FIG. 2G. Such a clip allows for the second clip member 234*b* to be manufactured once, and then different first clips 234*a* may be manufactured and replaced as the treatment progresses. Further the process may be reversed.

As illustrated in FIGS. 2C and 2D, tooth movement can be achieved by interchanging different shaped clip members 204 or changing the frame 202 that is configured to fit a standard clip design within a certain distant from the teeth or soft tissue to allow for the tooth movement with the frame member 202 selectively controlling the biasing force exerted on the tooth T. In one example, a portion of the frame member 202 is received within the respective fastening members 210*a* and 210*b* of the clip member 204. As such the connecting features 210*a* and 210*b* engage the frame member 202, thereby providing a secure snap-fit connection between the clip member 204 and the frame member 202, as shown.

Figure 2I:
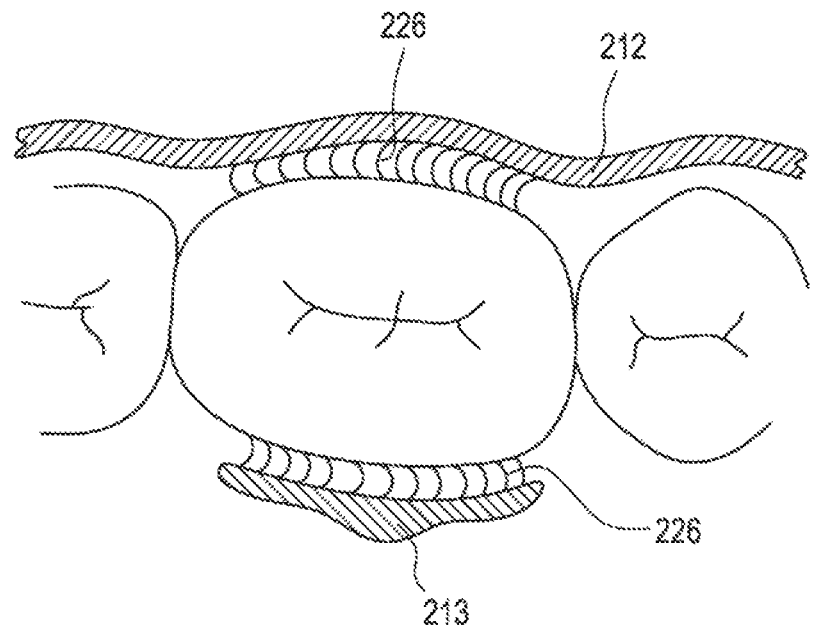
FIG. 2I is a top occlusal view of the orthodontic assembly including a labial bow member and clip member of FIG. 1B illustrating clip and labial bow members having curved bristle shaped pads components in operative engagement with a tooth.

The clip member 204 may be configured to provide force to the tooth T at precise locations 216 on the tooth T. As illustrated in FIG. 2E and FIG. 2I, the clip member 204 may include a plurality of bristles pads 226 that extend outward from the head or leaves portion 213 applying an engaging force to engage the tooth T. The bristles pads 226 may be configured with any shape, sizes, and number including but not limited to the following, straight, curved, wave-shaped, tapered, grouped, same direction, different direction, small, large, micro and nano structures to enhance the contact surface area between the orthodontic assembly and the tooth T and to accelerate tooth movement or retention.

The bristles can be used on the clip, labial bow clip, connected directly to the frame, used on a bonded attachment (bracket) on the teeth, or incorporated into clear aligners. Further, the bristles may be used on the inner side of the clear aligner system opposing at least a portion of one surface of that tooth, and the clear aligner with bristles can be manufactured using 3D printing, added to the aligner within a clip through a window created to insert an attachment with the bristles, or through a variety or manufacturing methods and combinations.

The bristles may be used with vibrating devices available in the market, such as Acceledent. The vibration from the vibrating device allow the bristles to vibrate and to place an intermittent pulsating forces on the tooth to facilitate the tooth movement. The shape and direction of the bristles may be configured according to the predetermined tooth movement of the teeth. The bristles in contact with the tooth may have more than one direction in order to accomplish more complex movements of the tooth in more than one direction.

Figure 2J:
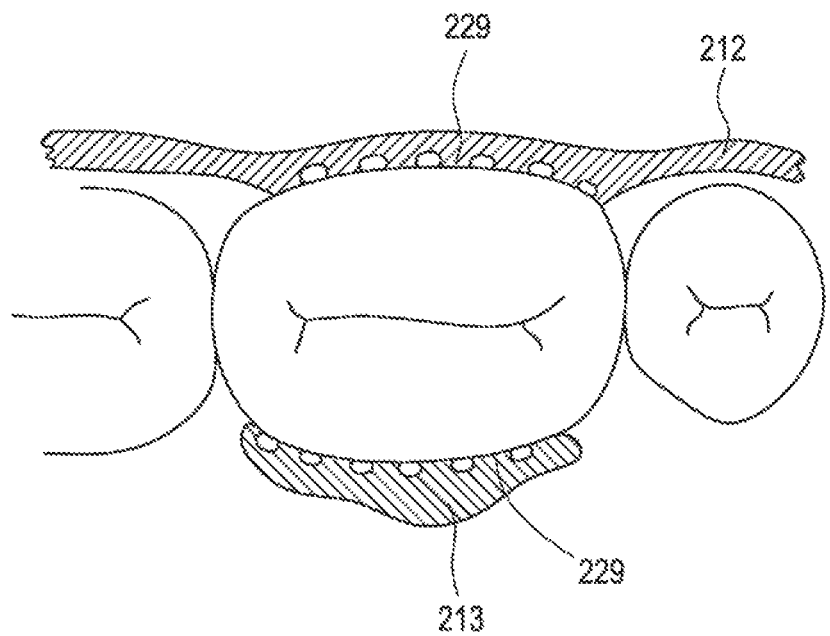
FIG. 2J is a top occlusal view of the orthodontic assembly including a labial bow member and clip member of FIG. 1B illustrating clip and labial bow members having suction cup components in active engagement with a tooth.

As illustrated in FIG. 2J, the clip member 204 may also be configured with suction cups 229 that extend outward from the head or leaves portion 213 to engage the tooth T. The suction cups 229 may also be used on the surface of an aligner that is in contact with the tooth.

The suction cups 229 may be configured with any shape, size, and number to enhance the retention and facilitate tooth movement when the suction cup is in active engagement with the tooth surface so that the clip head or aligner using the suction cups 229 is activated to move the tooth.

FIGS. 2K-S are cross-sectional views of different clip designs, combination clips, grooves/openings 106 of FIG. 1A and locking parts of the orthodontic assembly.

FIGS. 2K-S clip members 204, 234*b* and/or frame member 202 may include fastening members 266*b* extending throughout and into the outer surface of the clip or frame members or fastening 266*a* extending through part of the clip or frame members.

Figure 2K:
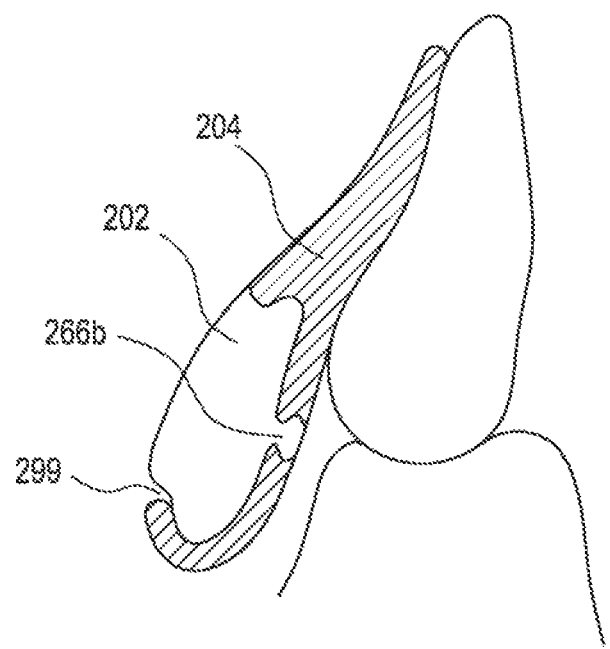
FIG. 2K is a cross-sectional view of the orthodontic assembly of FIG. 2A including extrusion from the frame extending throughout and into the outer surface of the clip.

FIG. 2K illustrates an opening or groove 299 in the frame member 202 to aid in the removal of clips or any fastening members. Further, fastening member 266b extending into an opening in the clip 204.

Figure 2L:
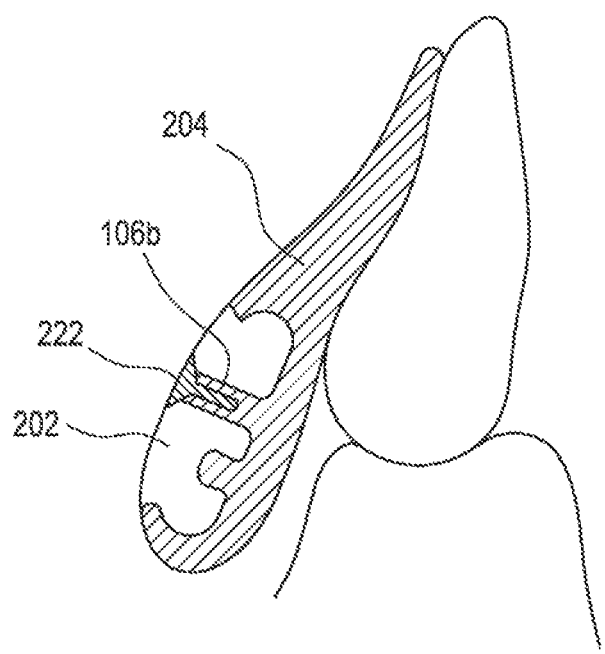
FIG. 2L is a cross-sectional view of the orthodontic assembly of FIG. 2A including first extrusion from the clip into part of the width of the frame and second extrusion from the clip throughout and into the outer surface of the frame and fixed into a screw.

FIG. 2L illustrates a screw 222 inserted into a pre-configured opening in the extension member 106b for additional retention.

Figure 2M:
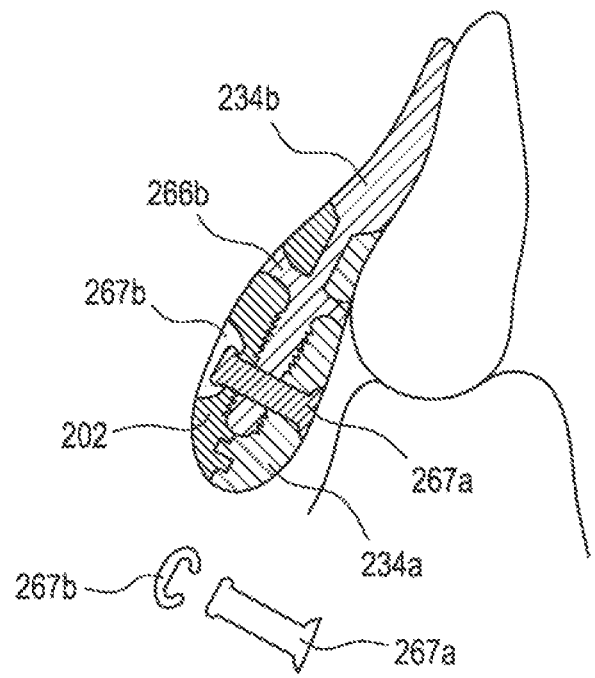
FIG. 2M is a cross-sectional view of the orthodontic assembly of FIG. 2A including first clip member in active engagement with second clip and frame members of the assembly. The first clip member is positioned between a frame and a second clip and is fastened by additional fastener pin and cap extending into the frame member, first clip member and second clip member.

FIG. 2M illustrates first clip 234b having extensions 266b into the frame 202 and second clip member 234a and a pin member 267a extending throughout openings in the second clip 234a, first clip 234b, and frame 202 and locked into position with a cap clip or screw nut 267b, locking members of the assembly into active engagement.

Figure 2N:
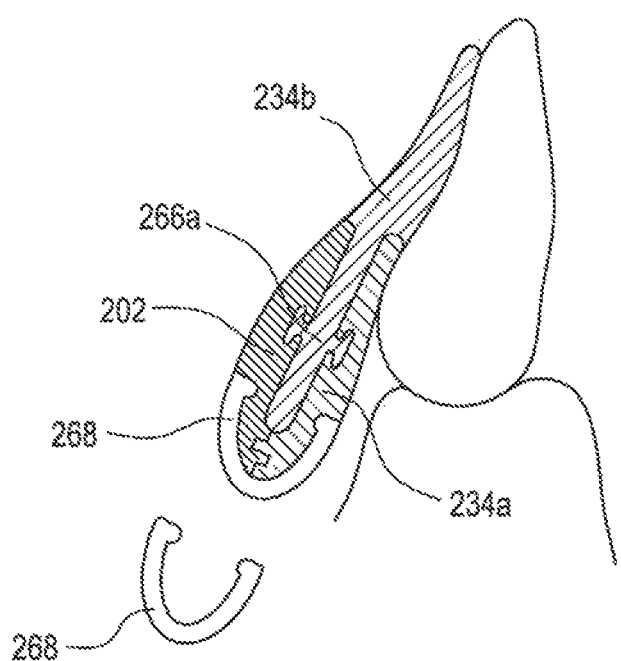
FIG. 2N is a cross sectional, view of the orthodontic assembly of FIG. 2A including first clip member with extrusions in active engagement with a second clip member and a frame member of the assembly and is fastened by an additional C-shaped fastener clip.

FIG. 2N illustrates the first clip 234b having extensions 266a into the frame 202 and second clip member 234a and C-shaped clip 268 engaging the second clip 234a, and frame 202 and aiding in the retention of the first clip member 234b in the assembly.

Figure 2O:
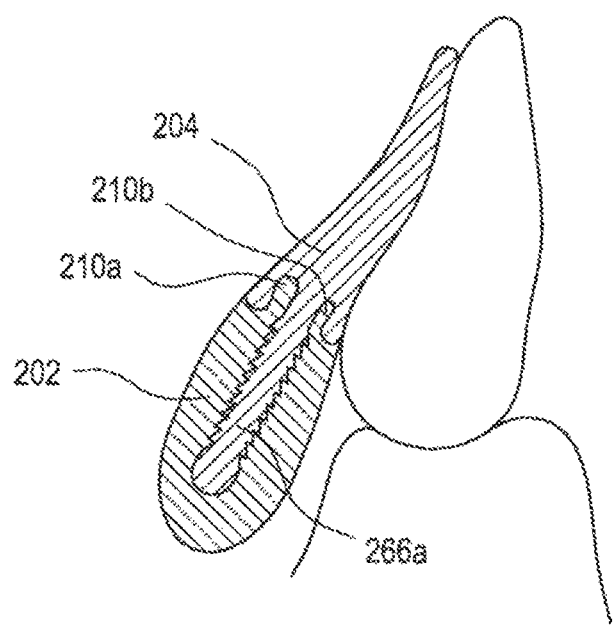
FIG. 2O is a cross-sectional view of the orthodontic assembly of FIG. 2A including a clip member in active engagement with an opening in the frame.

FIG. 2O illustrates a cross-sectional view of the orthodontic assembly of FIG. 2A including a clip member 204 having extension 266a and is in active engagement with an opening in the frame 202. The clip 204 also included fastening member 210a-b to engage the frame 202. The opening in the frame 202 may have a serrated surface that engages a corresponding serrated surface on the extension 266a to help secure the clip 204 in the frame 202.

Figure 2P:
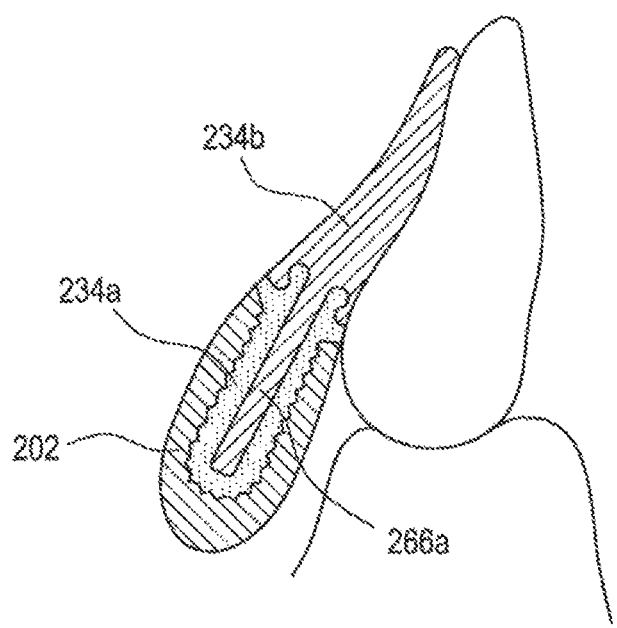
FIG. 2P is a cross-sectional view of the orthodontic assembly of FIG. 2A including first clip member in active engagement with an opening in a second clip member and a second clip member in active engagement in an opening in the frame member of the assembly.

FIG. 2P illustrates the second clip member 234a engaging a pre-configured opening in the frame member 202 and extension 266a of the first clip member 234b engaging another preconfigured opening in second clip member 234a. The second clip member 234a may have a serrated surface that engages a corresponding serrated surface on the clip 202 to help secure the second clip member 234a in the frame 202.

Figure 2Q:
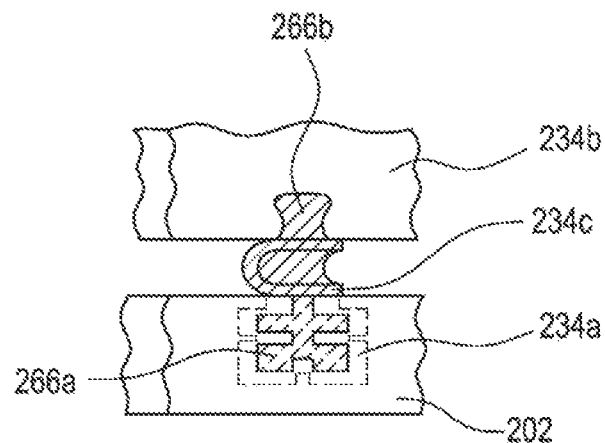
FIG. 2Q is a side view of the C-shaped first clip member of the assembly in active engagement with the second clip of the assembly and the frame.

FIG. 2Q is a front view of the C-shaped intermediate member of FIG. 1C of the orthodontic assembly of FIG. 1B. The C-shaped intermediate member or any other intermediate member 207 of the assembly of FIG. 1B may be designed as in FIG. 2Q as a first clip member 234c having extrusions 266b engaging a preconfigured opening of the second clip member 234b. Further the C-shaped intermediate member 234c may also have a second extension 266a engaging a preconfigured opening in the frame member 202 and a third clip 234a.

Figure 2R:
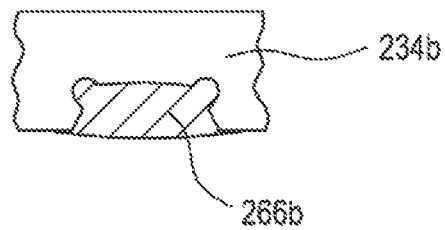
FIG. 2R is a cross-sectional view of the assembly of FIG. 2Q with the first clip member in active engagement with the frame member.

FIG. 2R is a cross-sectional view of extension 266b of the clip member 234c of FIG. 2Q in active engagement with frame member 202.

Figure 2S:
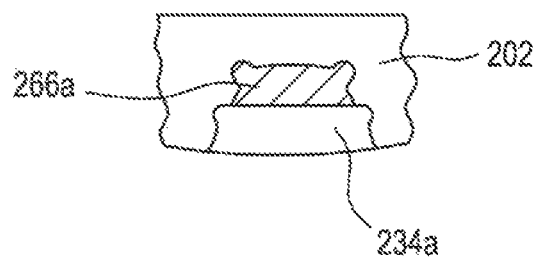
FIG. 2S is a cross-sectional view of the assembly of FIG. 2Q with the first clip member in active engagement with frame member and third clip member.

FIG. 2S is a cross-sectional view of extension 266a of the clip member 234c of FIG. 2Q in active engagement with frame member 202 and third clip member 234a, where the extension 266a of the clip member 234c is positioned between frame member 202 and third clip member 234a.

Clip members of the assembly may be removably attached to the frame, other clips or other members of the assembly or may be irreversibly attached to the frame, other clips or other members of the assembly.

When separating components of the assembly, some components may be damaged and may need to be replaced, other components may be reused in the same assembly or in a different assembly.

Sealant or bonding agents may also be used between different components in some parts of the assembly, the sealing or bonding process between different parts of the assembly may allow different parts of the assembly to be removably or irreversibly attached to each other. The benefit of the sealants or bonding agents is to provide additional retention and ease of assembly.

Figure 2T:
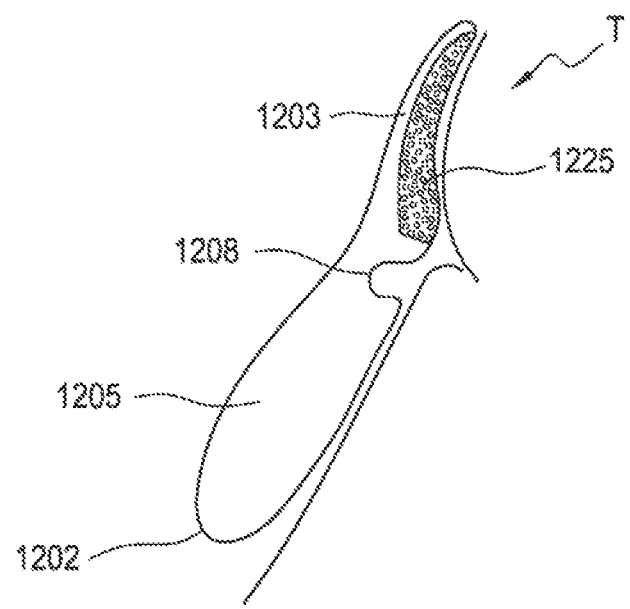
FIG. 2T is a cross sectional view of the assembly with C shape intermediate flexible C shape portion and elastic porous pads in active engagement with the tooth.
Figure 2U:
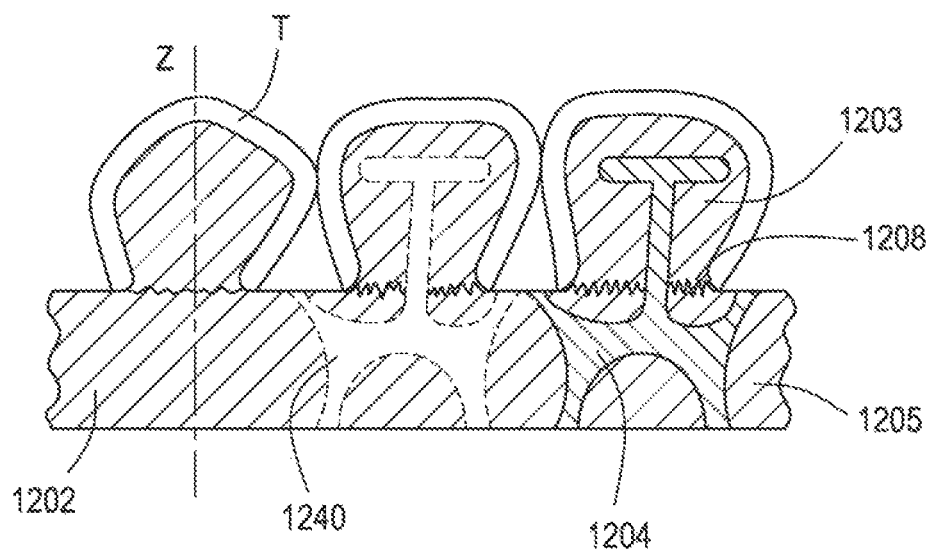
FIG. 2U is an environmental internal view of the orthodontic assembly including the frame member of FIG. 1B and a clip member configuration to operatively engage with a preconfigured parts in the assembly.

FIG. 2T is cross sectional view of the frame 1202 of FIG. 2U along Z axis. The frame 1202 has a lower portion 1205, an upper portion 1203 and an intermediate portion 1208 providing flexibility between the upper and lower portions. The upper portion 1203 has an elastic porous pad component 1225. The elastic porous pad component 1225 is compressed when in active engagement with tooth T and provide a force for tooth movement or retention when that force is opposed by similar force on the opposing side of the tooth. The size of the pores and the material used may be altered to change the compressibility of the pad and force exerted on the tooth.

FIG. 2U illustrates a clip member 1204 connected to the frame member 1202 for effectuating tooth movement/tooth retention. Clip member 1204 is connected to the lower portion of the assembly 1205 and upper portion of the assembly 1203. The assembly has a first upper portion 1203, intermediate flexible portion 1208 and lower portion 1205. The clip member 1204 clips into a preconfigured area 1240 of the assembly. The preconfigured area 1240 for clip engagement may be on the outer side or inner side of the assembly 1202.

Figure 2V:
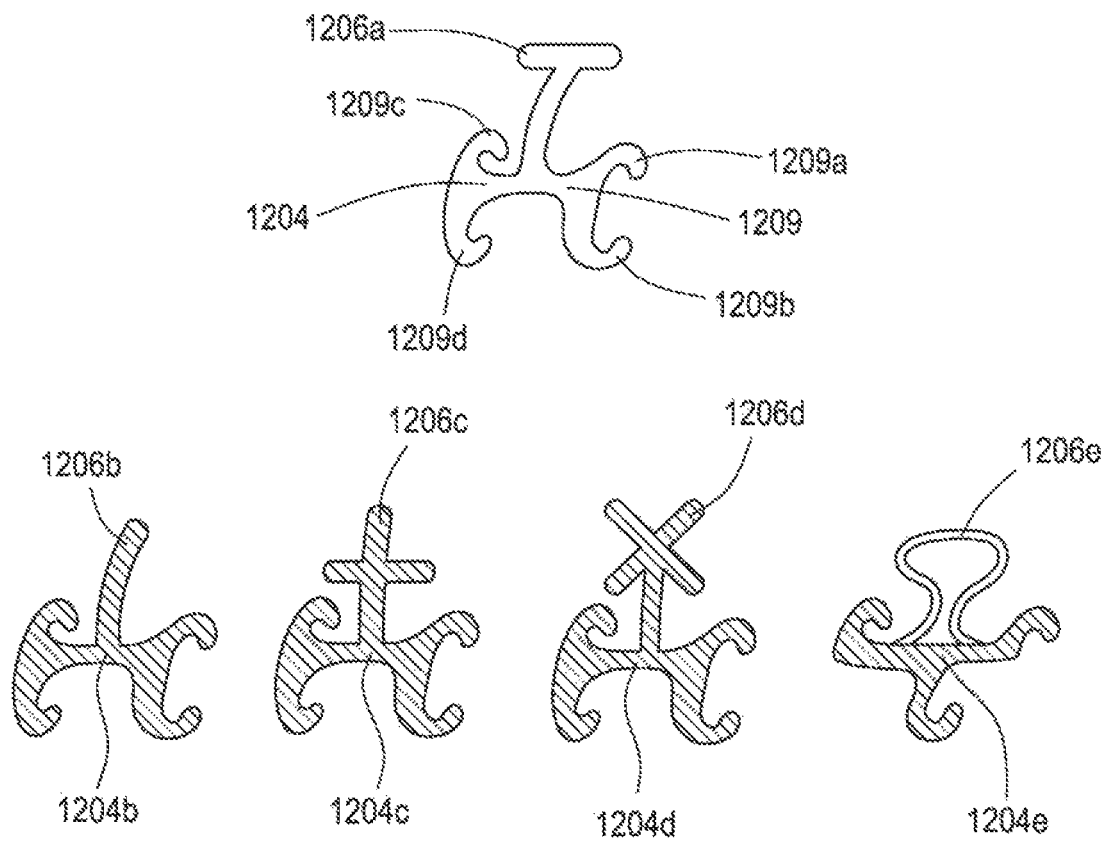
FIG. 2A is an environmental internal view of the orthodontic assembly including the frame member of FIG. 1B and a variety of clip member configurations operatively engaged with a lingual surface of the user's teeth in a first position.
FIG. 2B is a side cross-sectional view of the orthodontic assembly of FIG. 2A and clip member, including a flexible intermediate component.
FIG. 2 V is another view of the clip of the FIG. 2U with different head designs.
FIG. 2W is an environmental internal view of the orthodontic assembly including the frame member of FIG. 1B and an adjustable clip member configuration operatively engaging a preconfigured parts of the assembly.
FIG. 2X is a cross-sectional view of the assembly of FIG. 2W with an adjustable clip member in active engagement with preconfigured parts in the assembly and a tapered part of the frame with different material property engaging the tooth surface.

As illustrated, in FIG. 2V the clip member 1204 has a head portion 1206a and body portion 1209, the body portion 1209 having a first extrusion 1209a, second extrusion 1209b, third extrusion 1209c and forth extrusion 1209d. The clip member 1204 and the extrusions 1209a-d from the clip members 1204 engage preconfigured parts 1240 of the assembly therefore, fastening the clip into the assembly. The head portion 1206a of the clip member 1204 is generally flexible and may have different shapes and configurations, for example clip member 1204 has a T-shaped head portion 1206a, clip member 1204b has a single bar shaped head portion 1206b, clip member 1204c has a cross shaped head portion 1206c, clip member 1204d has X shaped head portion 1206d extending from a bar portions, and clip member 1204e has a loop shaped head portion 1206e and first, second, and third extrusions as shown. Clip 1204 may also have only a first extrusion and second extrusion.

Figure 2W:
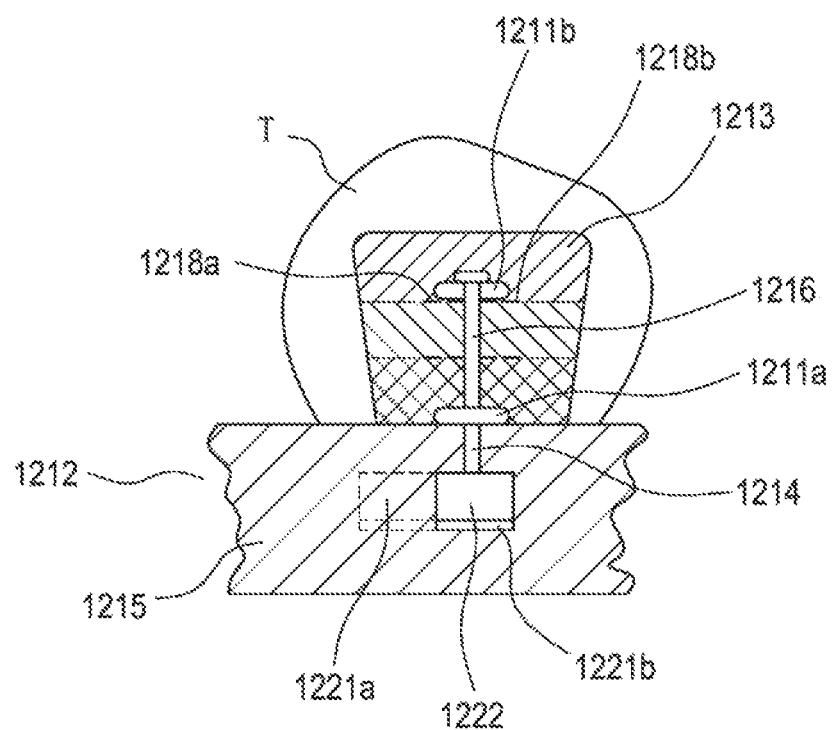
Figure 2X:
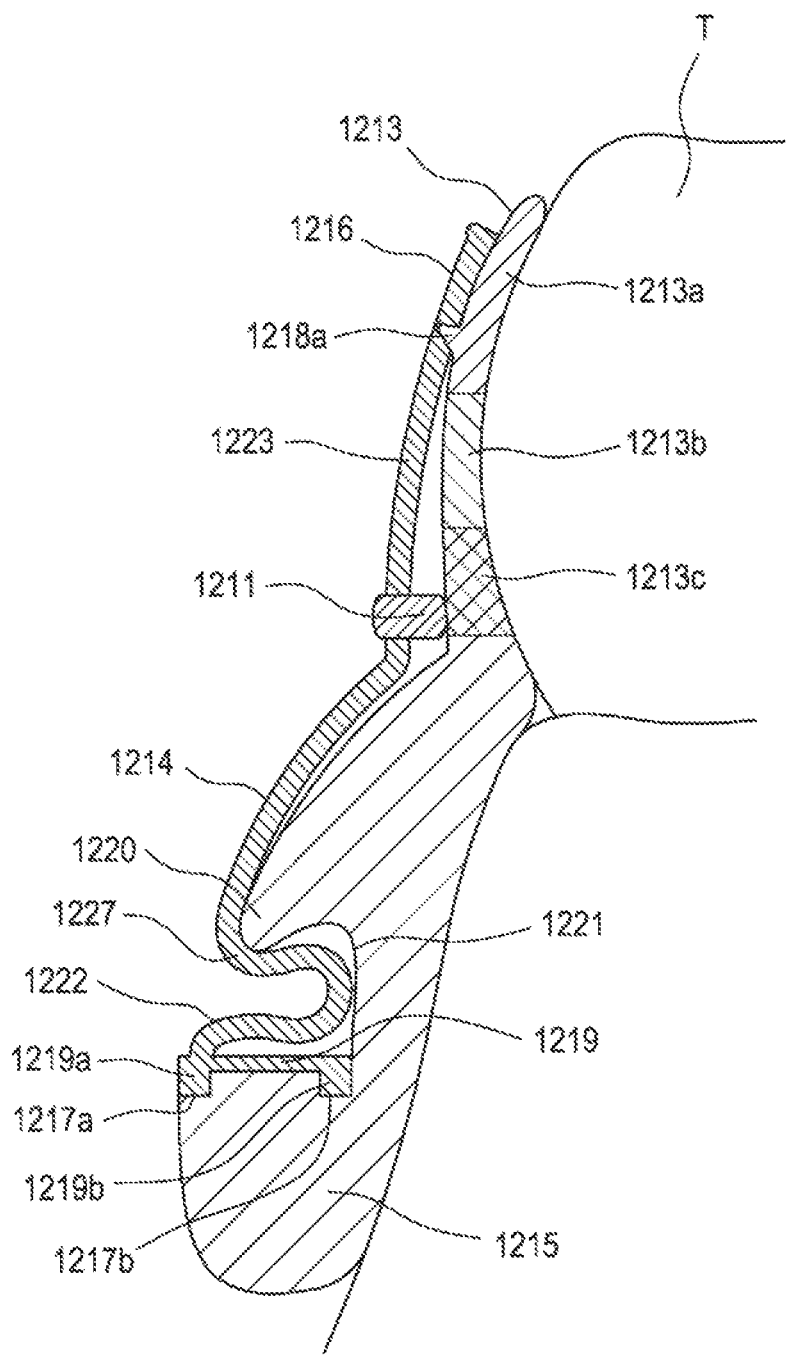

FIG. 2W and FIG. 2X illustrate a clip member 1214 configured to clip to a frame member 1212 having a flexible portion 1213 and rigid portion 1215. As illustrated in FIG. 2X, the clip member 1214 has a base 1219, a C-shape flexible portion 1222, a bar or plate 1223 having a distal end 1216, and an adjustable portion 1211. The clip member 1214 is connected to a preconfigured area in the rigid portion 1215 and flexible portion 1213 of the frame 1212. Clip member 1214, as shown in FIG. 2W, is preconfigured to fit into an opening 1221a in the rigid portion 1215 and slide into a second adjacent and contiguous opening 1221b in the rigid portion 1215. Clip member 1214 may also be configured to snap directly into opening 1221b. Openings 1221a and 1221b have protrusion 1220 engaging the upper curved section 1227 of the C-shaped part of the clip 1214. Opening 1221b has first opening 1217a and second opening 1217b preconfigured to respectively engage the first extrusion 1219a and second extrusion 1219b of the base 1219 of the clip member 1214. As the clip 1214 slides from opening 1221a to 1221b, protrusion 1220 on one side and protrusions 1219a and 1219b on the opposite side lock the clip in place while allowing the C-shape part of the clip to bend and place additional force on the flexible portion 1213 for tooth movement or retention. The clip member 1214 may be made from a flexible material, such as for example nickel titanium, while the assembly may be made from flexible 3D printed polymers, but any material combinations providing the desired force on the tooth may be used. Opening 1221a may be filled and sealed by inserting a removable, or permanently fixed, block (not shown) preconfigured to fit opening 1221a after the clip member 1214 is in second position in opening 1217b.

Bar 1223 may have an adjustable portion 1211, where the adjustable portion 1211 has an opening engaging the bar 1223 to allow the adjustable portion 1211 to slide on the bar 1223 from first position 1211a to second positon 1211b relative to the flexible part 1213 of the assembly. The flexible part 1213 may have first protrusion 1218a and second protrusion 1218b on the opposite sides of the distal end of the bar 1216 to prevent the adjustment part 1211 from siding from position 1211b to 1211a. The shape of the first protrusion 1218a and the second protrusion 1218b allow for the adjustable portion 1211 to slide over them. When the adjustment part is in its second position 1211b the bar 1223 is deflected away from the flexible portion 1213 and as the C shape part of the clip 1222 is further compressed, a force is exerted onto portion 1213 for tooth movement or retention.

Alternatively, and in other embodiments clip 1214 may snap fit directly into opening 1221a and is removable or permanently attached into the assembly.

Flexible member 1213 may be formed having a first portion 1213a, second portion 1213b, and third portion 1213c, where each portion may be formed with different elasticity or stiffness to provide the desired force on the tooth The flexibility or rigidity may be formed during 3-D printing by printing the different portions with materials having different flexibility or rigidity or by using topology optimization, artificial intelligence and geometry modification including but not limited to designing the assembly with round, hexagonal, rectilinear, triangular, wiggle, honeycomb or any other grid structures.

Figure 3A:
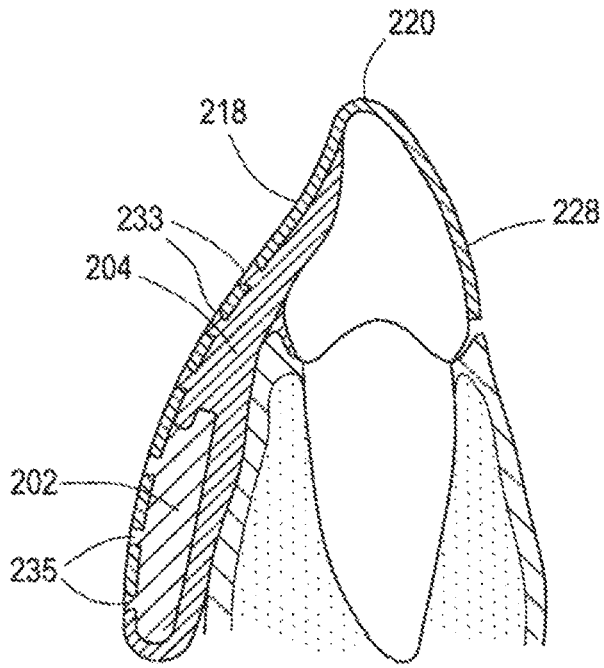
FIG. 3A is a side cross-sectional view of another embodiment of the orthodontic assembly, illustrating the frame member and clip member engaged with an over layer of clear shell component covering both frame and clip members and extends to the buccal surface of the tooth to enhance the tooth alignment and retention.
Figure 3B:
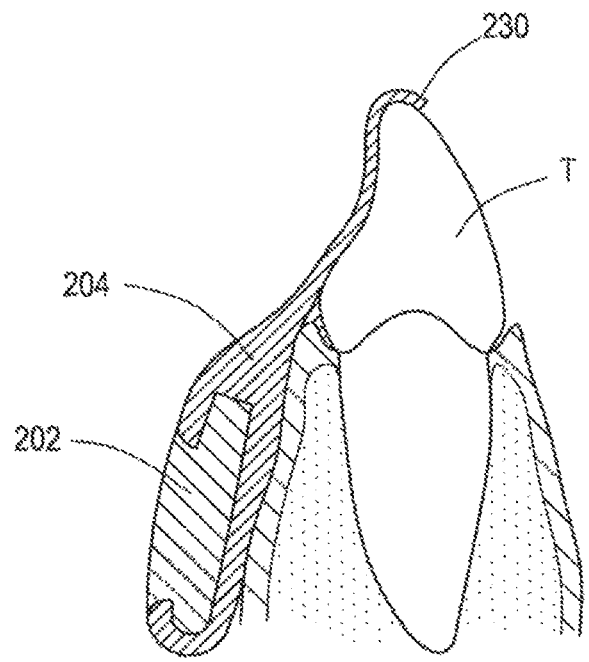
FIG. 3B is a side cross-sectional view of another embodiment of the orthodontic assembly, illustrating the frame member and clip member in operative engagement with the lingual surface and incisal edge of the user's tooth.

In an embodiment illustrated in FIGS. 3A and 3B, the orthodontic assembly provides occlusal coverage of one or more teeth T to facilitate tooth movement and retention. As illustrated in FIG. 3A, the outer surface of the clip member 204, the frame member 202 and the remaining tooth surfaces are covered by a generally thin, governing member 220 that may be configured to cover in addition to the clip and frame a portion of the tooth, the entire tooth, a group of teeth, or the entire arch, to facilitate tooth movement and/or retention. The thin clear shell governing member 220 is locked into corresponding locking parts on the outside part of the frame and clip through a corresponding grooves or holes in addition to the any other retentive part on the teeth.

As illustrated, the clip member 204 is configured for engagement with the tooth T and the frame member 202. The clip member 204 may be made of metal and/or polymer, or any other desirable material. The governing member 220 provides a shell that includes a series of openings 233 and 235 formed about the outer portions of the respective clip member 204 and frame member 202. Accordingly, the governing member 220 fastenably engages the outer portion of the frame member 202 and clip member 204 and respective extrusions 235 and 233 locking the shell in to the frame member 202 and clip member 204. Alternatively, the governing member 220 may extend and cover the extrusions 235 and 233 and lock the shell into the frame and clip members for added retention. The governing member 220 generally includes a first governing portion 218 that is configured for cooperative engagement with a lingual surface of the tooth T, as well as the outer surface of the clip member 204 and frame member 202. The governing member 220 further includes a second governing portion 228 that covers the buccal surface of the tooth T.

The governing member 220 is fastenable to the frame member 202 and clip member 204, covering both members and may extend over the rest of the tooth, adjacent teeth or the entire arch. To enhance aesthetics, it is contemplated that the governing member 220 may be made of a generally clear polymer material.

As illustrated in FIG. 3B, clip member 204 may also be configured to partially engage the incisal edge of the tooth T with an extension portion or governing member 230 to effectuate occlusal coverage. Regarding FIGS. 3A and 3B, the occlusal coverage configuration of the clip members 204 may facilitate a variety of functions, including, but not limited to facilitating tooth movement, opening or deepening of the user's bite, reducing occlusal interferences during the tooth movement process, as well as further protecting the user's teeth from grinding or bruxism.

Figure 4A:
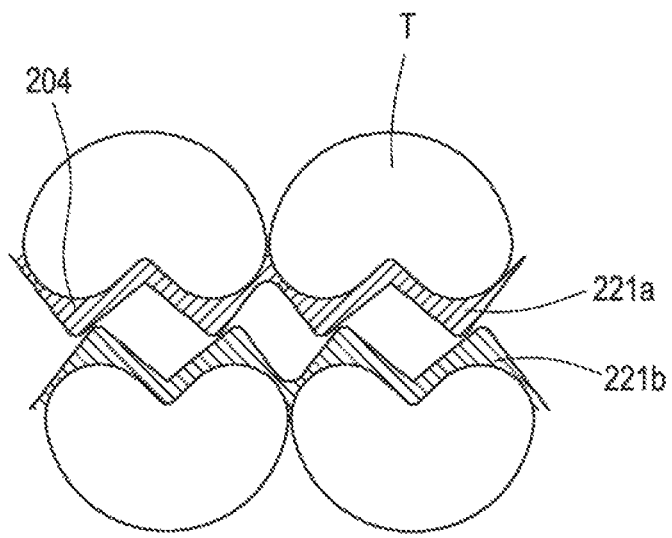
FIG. 4A is an environmental side sectional view of the clip member of the orthodontic assembly covering the occlusal surface of the teeth, for facilitating tooth movement and bite alignment.
Figure 4B:
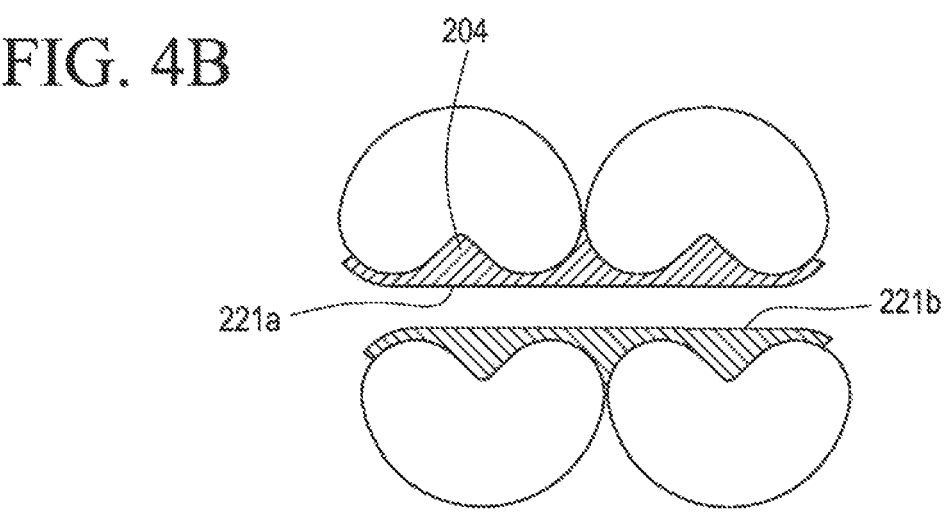
FIG. 4B is an environmental side sectional view of the clip member covering the occlusal surface of the teeth for facilitating teeth movement and bite alignment.
Figure 4C:
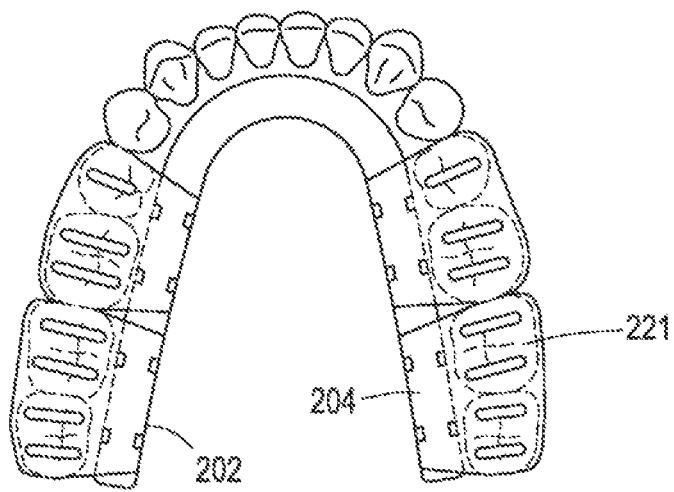
FIG. 4C is top occlusal view of the orthodontic assembly and clip member of FIG. 4A, illustrating the governing portion extending over the tooth to facilitate teeth movement and bite alignment.

In an embodiment shown in FIGS. 4A-4C, the frame member 202 or the clip member 204 may include a governing portion 221a, 221b that provides occlusal coverage of the posterior teeth T to aid in teeth movement or in bite correction for the user. FIG. 4A illustrates a pre-selected desired shape of occlusal surface of the teeth T. As illustrated in FIG. 4A, the governing portion 221a may be configured via 3-D printing to guide the bite into a favorable position when the user bites down on the governing portion 221b so as to effectuate bite correction. A series of governing portions may be needed to guide the bite into its final position.

As illustrated in FIG. 4B, the governing portions 221a and 221b may be a generally smooth surface, match the occlusal or lingual shape of the teeth or pre-selected shape to guide the teeth into a different and more desirable bite, therefore facilitating bite correction. The pre-selected shape for occlusal coverage can be progressively incorporated into new clips to ensure that the changes occur at a desirable speed according to the patient's adaptation to the new bite. Similar to the other components disclosed herein, shaping of the clip member 204 and governing portions 221a, 221b to provide accurate and optimal occlusal coverage may be achieved via 3-D printing.

As illustrated in FIG. 4C, the governing portion 221 extends from the clip member 204 over the tooth T, such that when a user bites down, the lower jaw slides into a preselected position based on the shape and position of the governing members covering the upper and lower teeth surfaces.

In an embodiment illustrated in FIGS. 5A-5D, the orthodontic assembly includes a frame member 202 and one or more a clip members 244 operatively connectable thereto. The clip member 244 generally includes a stem portion 236 and a C-shaped extension member 238, contoured to engage the lingual surface of the tooth T. The C-shaped extension member 238 extends generally from the mid-portion 232 of the clip member 244, providing a contoured surface that engages the outer contour of the tooth T. As shown, the C-shaped extension member 238 may include tapering tips 240a, 240b, provided generally on both ends of the clip member 244. Notably, it is contemplated that the C-shaped configuration of the clip member 244 may also be used to engage the gingival area of posterior teeth T for added retention, if desired.

Figure 5A:
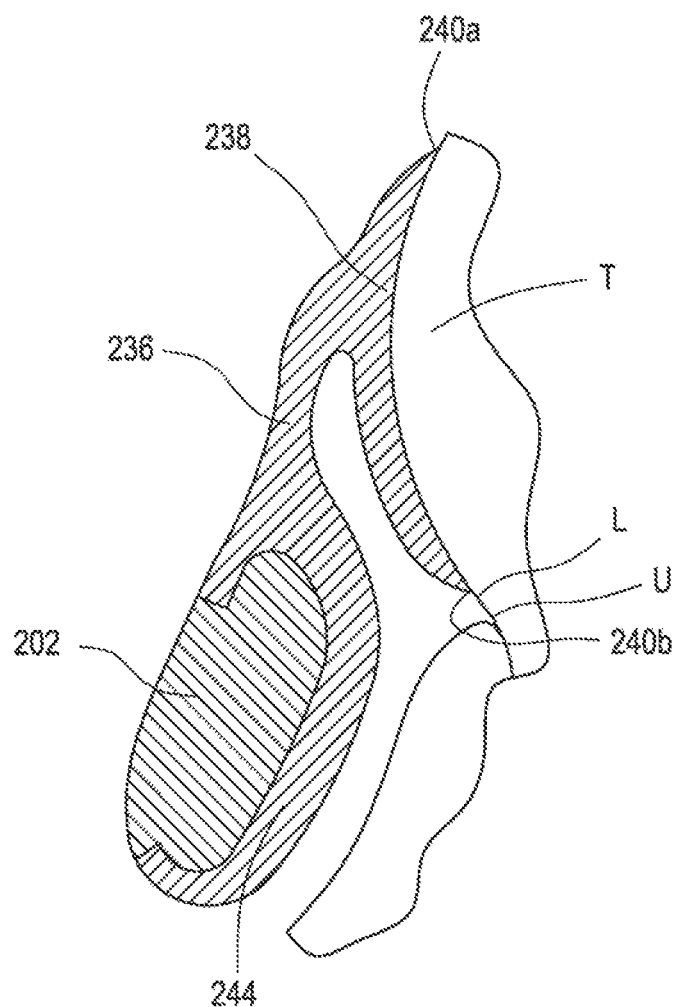
FIG. 5A is a side cross-sectional view of another embodiment of the orthodontic assembly including a clip member having a contoured C-shaped configuration with a flexible portion operatively engaging an undercut of the lingual portion of the user's tooth.
Figure 5B:
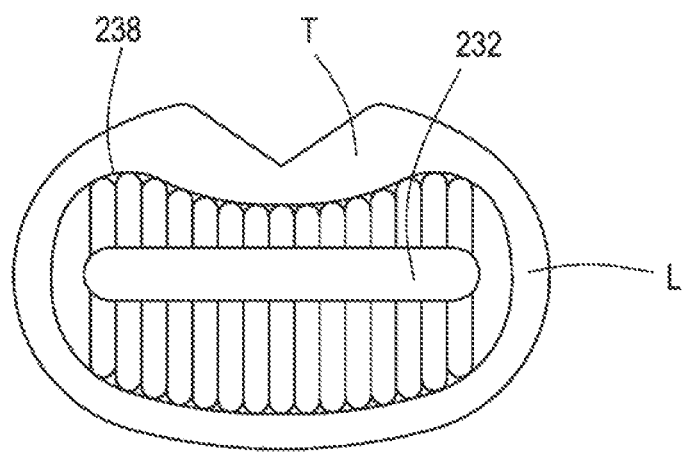
FIG. 5B is a lingual side view of the orthodontic assembly and clip member of FIG. 5 A, engaged with a lingual portion of the tooth illustrating a clip member with leaves connected thereto.
Figure 5C:
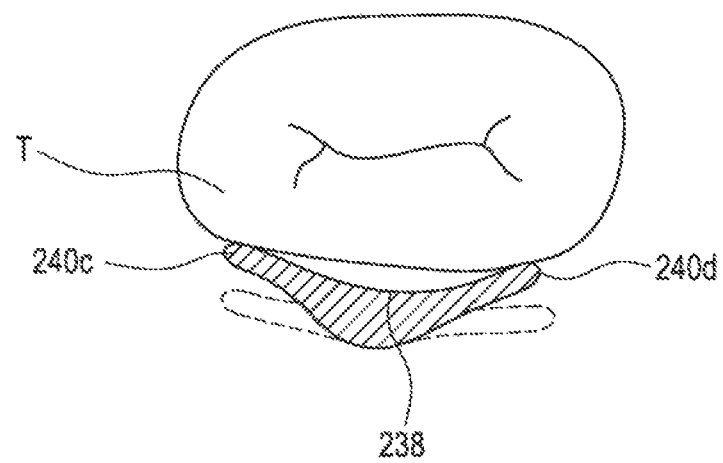
FIG. 5C is an occlusal top view of another embodiment of the clip member of the orthodontic assembly of FIG. 5A illustrating limited contact of the flexible part of the clip with the tooth.
Figure 5D:
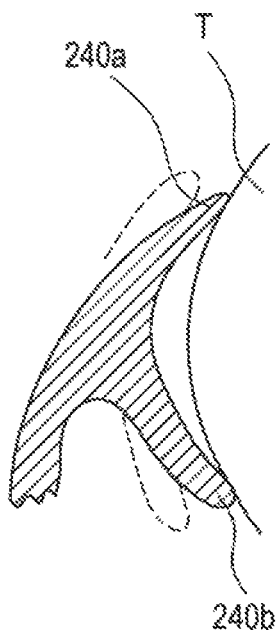
FIG. 5D is a side cross-sectional view of FIG. 5C.

FIGS. 5C and 5D illustrate a C-shaped extension member 238 with limited contact with the tooth T. FIG. 5C is an occlusal top view of another embodiment of the clip member of the orthodontic assembly of FIG. 5A illustrating limited contact of the flexible part of the clip with the tooth. FIG. 5D is a side cross-sectional view of FIG. 5C. The C-shaped extension member 238 may be configured such that the tapering tips 240a, 240b, 240c, 240d may have only limited contact the tooth surface. The limited contact with the tapering flexible members 240a, 240b, 240c, 240d allow the flexible members to exert force on the tooth when activated by limited tooth movement due to shifting when used in retainers or when configured during the fabrication process to allow for tooth movement.

Figure 5E:
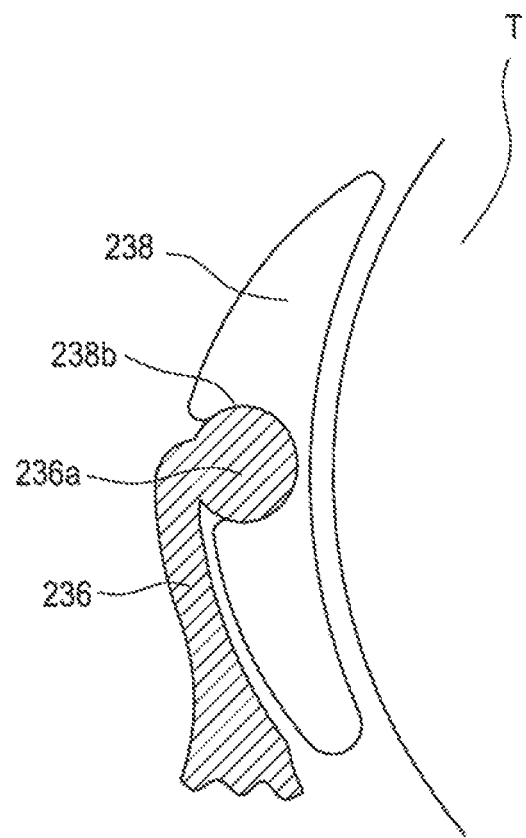
FIG. 5E is a cross-sectional view of another embodiment of the clip member of the orthodontic assembly of FIG. 5A illustrating a ball and socket relationship between the stem portion and C-shaped extension.

FIG. 5E illustrates a ball and socket relationship between the stem member 236 and C-shaped extension 238. The stem member 236 has a ball or long strip shaped end 236a configured to engage a preconfigured socket or long groove shaped opening 238b in the C-shaped extension member 238 allowing the C-shape extension to limited rotational movement around the ball to maintain contact with the tooth surface as the tooth moves into a second position in the mouth.

One advantage of the orthodontic assembly and C-shaped clip member 244 arrangement is that the clip member 244 is capable of engaging the undercut on the lingual surface L of the teeth T, as illustrated. The lingual engagement type of engagement is another benefit that the orthodontic assembly provides. Other fixed orthodontic assemblies are usually blocked from engaging the area under the contour of the tooth which is called the "undercut area" U, as shown in FIG. 5A.

Teeth movement and retention may also be facilitated and/or improved by using bonded components or banded components attached directly to the specific tooth or teeth designated for treatment. It is contemplated that the components may have virtually any shape or size desired and may be fabricated using 3-D printing methods or other fabrication methods. It is further contemplated that the components may be comprised of virtually any material and may be bonded or otherwise attached to any part of tooth. For example, a bonded member on the tooth T may engage a leaf, a wire, or a plate attached to a clip member. In another example the bonded member provided on the tooth T may directly engage the frame member of the orthodontic assembly.

In an embodiment illustrated in FIG. 6A-C, the orthodontic assembly includes a frame member 202, one or more clip members 244, and one or more bonded components 242 configured to receive operative engagement with the respective clip members 244. As illustrated, the orthodontic assembly may be provided along the lingual surface of the tooth T. As such, the bonded component 242 may be connected directly to the tooth T, via connection features such as bonding agents.

As illustrated in FIG. 6B, the clip member 244 generally includes an engagement feature 250, which may have a contoured C-shaped surface complementary to the outer surface of the tooth T and interior surface 248 of the bonded component 242. As illustrated, an opening 246 is provided between the engagement component 250 and the upper portion 256 of the clip member 244. The opening 246 formed between the engagement component 250 and the upper portion 256 is configured for receiving therein the connecting feature 252 of the bonded component 242, forming a connection between the engagement bonded component 242 and the clip member 244. In an inserted position, the bonded component 242 helps secure the clip member 244 onto the tooth T. As such, the clip member 244 exerts a force on the bonded component 242 and directly to the tooth T. The force and direction applied to the tooth T may be adjusted by incrementally adjusting the shape of the clip member 244 provided for connection with the bonded member 242. Similar to the aforementioned clip members, adjustment and replacement of the clip member 244 to achieve a desired movement of the tooth T may be achieved by 3-D printing various customized clip members.

Figure 7A:
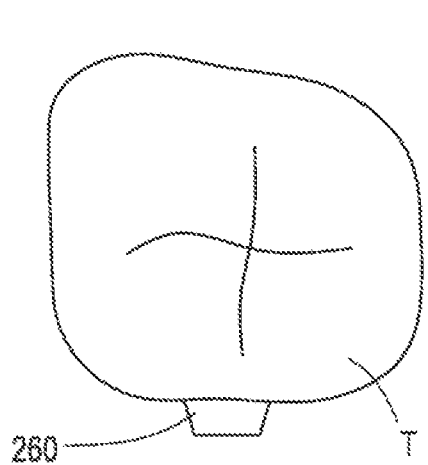
FIG. 7A is a top view of another embodiment of the orthodontic assembly illustrating a bonded member operatively engaged with a tooth.
Figure 7B:
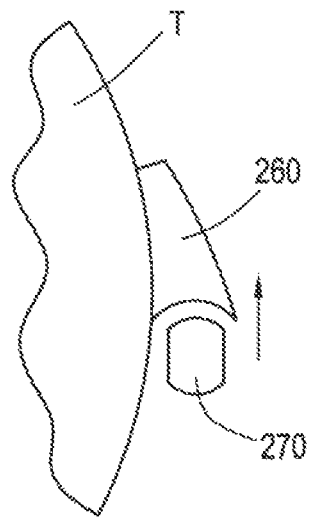
FIG. 7B is a side cross sectional view of the orthodontic assembly of FIG. 7A, illustrating a wire member in operative engagement with the bonded member.
Figure 7C:
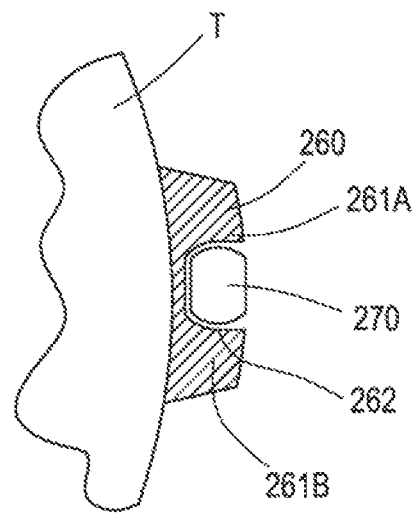
FIG. 7C is a side cross sectional view of the orthodontic assembly of FIG. 7A, illustrating another embodiment of the bonded member.

In another embodiment shown in FIGS. 7A-C, the assembly may further include a bonded component 260, which may be connected directly to the outer surface of the tooth T. The assembly further includes a wire or biasing member 270 which, in connection with a connected frame member not shown), exerts a force on the connected bonded component 260 to facilitate movement of the connected tooth T or for retention. The wire or biasing member 270 may be fabricated using 3-D printing or any other fabrication methods.

As illustrated in FIG. 7C, the bonded component 260 may include a first portion 261a and a second portion 261b, and a groove 262 formed therebetween configured to receive the first portion the biasing member 270 therein to effectuate tooth movement or retention.

Figure 7D:
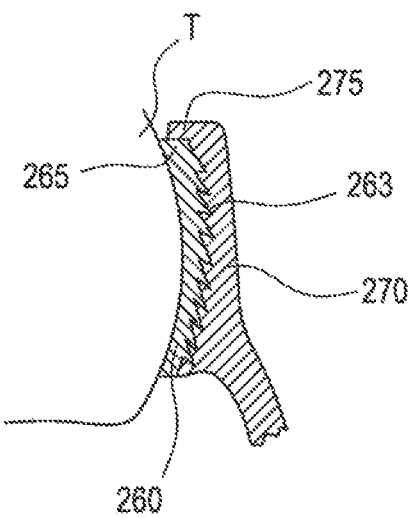
FIG. 7D is a side cross-sectional view of an embodiment of another head of the clip of FIG. 5A of the orthodontic assembly illustrating another embodiment of the bonded member in operative engagement with micro structures on a clip member.

As illustrated in FIG. 7D, which is a side cross-sectional view of an embodiment of another head of the clip of FIG. 5A, the bonded component 260 may include at least one saw-tooth shaped micro-ridge 263 or plurality of ridges. The ridges can be horizontal, vertical, stacked, alternated, or combinations thereof. The bonded component 260 may also include outer first portion 264a and second outer portion 264b and top portion 265. The ridges 263 and outer portions 264a and 254b are configured to receive the biasing member 270. The biasing member 270 includes a top portion 275. When member 270 is in active engagement with bonded member 260, top portion 275 of the biasing member 270 will rest on the top portion 265 of the bonded component 260. The top portion 275 helps to align the biasing member 270 and bonded component 260. The top portion 275 also may apply a force on the biasing member 270.

It is also contemplated that similar micro structures may be used instead of the saw-tooth shaped micro ridges on the bonded component and corresponding biasing member including but not limited to loops and hooks interlocking micro structure, mushroom-shaped fastener structures, bristles, and suction cups micro structures.

In an embodiment illustrated in FIGS. 8A-D, the orthodontic assembly 300 includes a frame member 302, a clip member 304 removably connectable to the frame member 302, and one or more bonded members 360 to achieve tooth movement. As illustrated, the bonded member 360 is connected to the tooth T. The bonded member 360 includes dual engagement members 362a, 362b formed in a v-shaped configuration for receiving the clip member 304 therebetween.

The clip member 304 generally includes a head portion 313a operatively connected to a spring or biasing member 319a, and a base member 311. Similar to the aforementioned embodiments, the clip member 304 may have a snap-fit connection with the frame member 302. The head member 313a has a v-shaped configuration and side hook members 315a and 315b for insertion and secure attachment between the dual engagement members 362a, 362b, of the bonded member 360. In an inserted position with the dual engagement members 362a, 362b, the side hook members 315a and 315b, the head member 313a and the biasing member 319a in cooperation with the clip member 304 and frame member 302 exerts a force on the bonded member 360, thereby exerting a force on the connected tooth T.

Figure 8A:
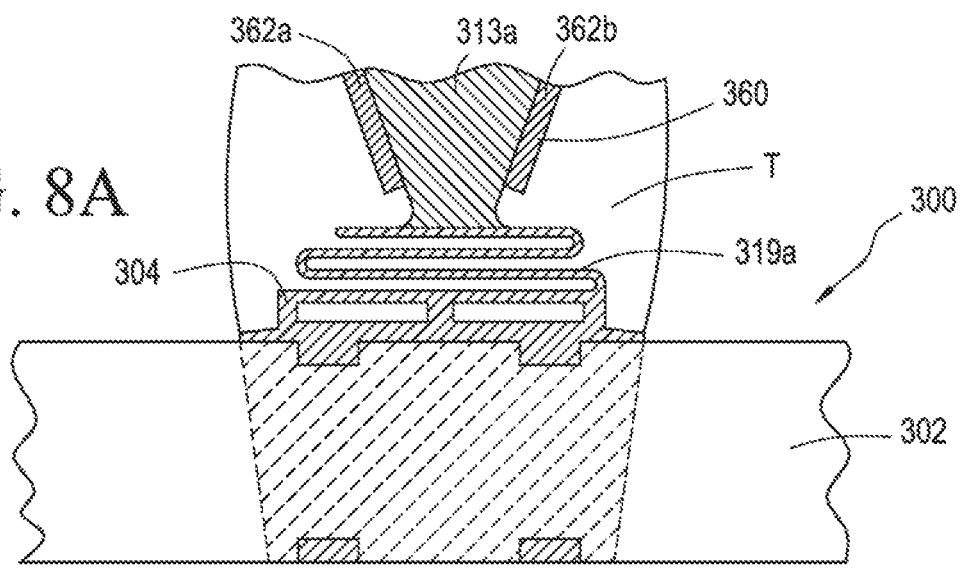
FIG. 8A is a lingual view of an orthodontic assembly including a bonded member and clip member having a biasing component for tooth movement and retention.
Figure 8B:
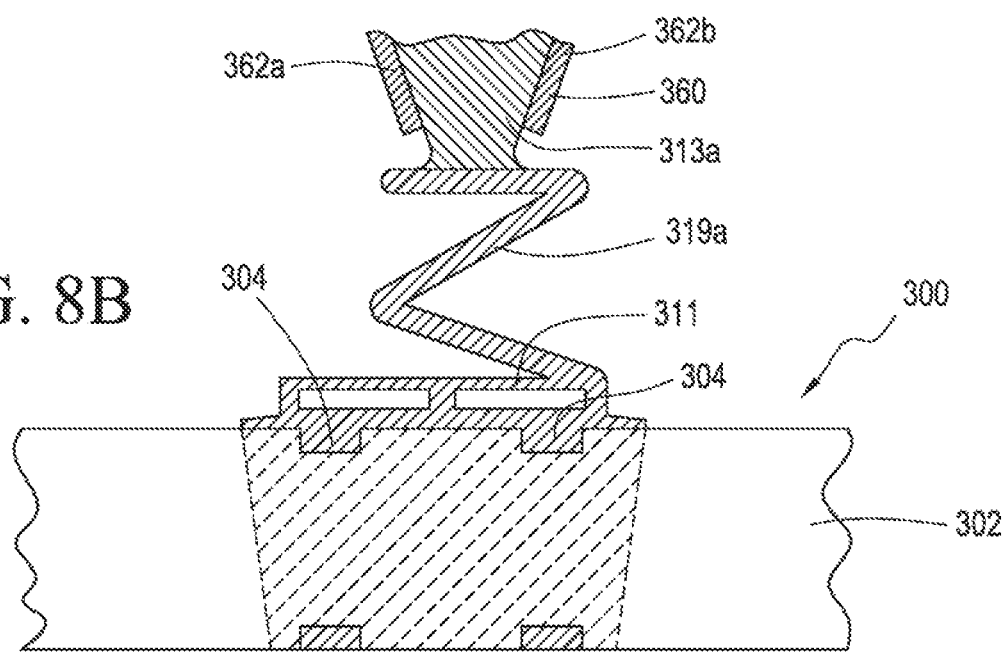
FIG. 8B is a lingual view of an orthodontic assembly of FIG. 8A illustrating the biasing component in an extended position.
Figure 8C:
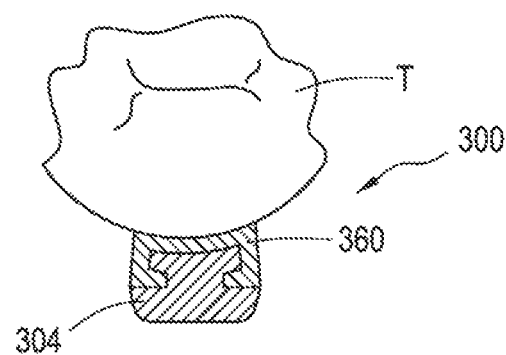
FIG. 8C is a top view of the orthodontic assembly of FIG. 8A.
Figure 8D:
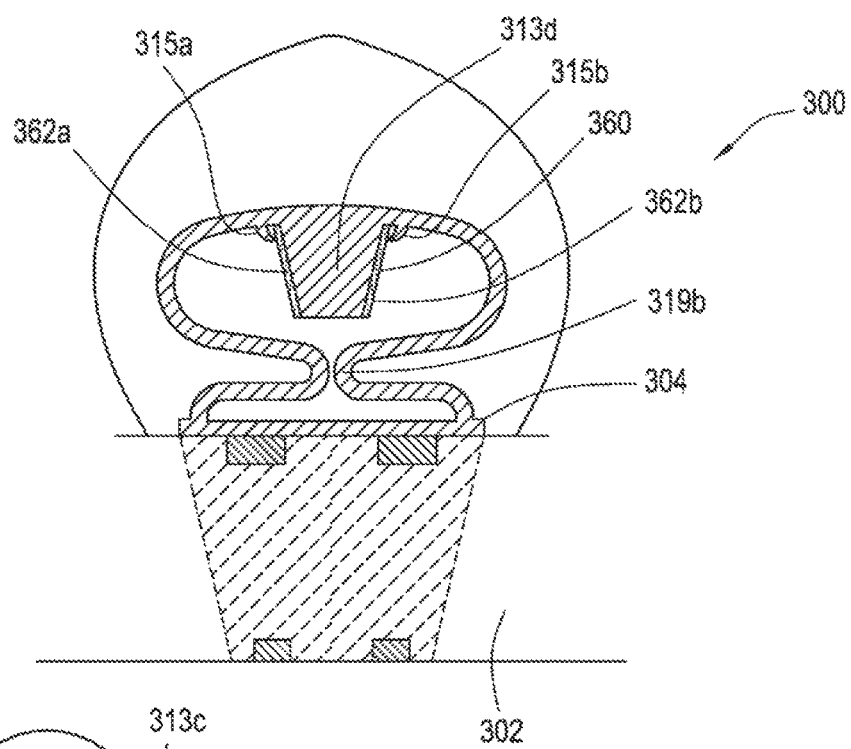
FIG. 8D is another embodiment of the orthodontic assembly including a bonded member and a wave like biasing member.
Figure 8E:
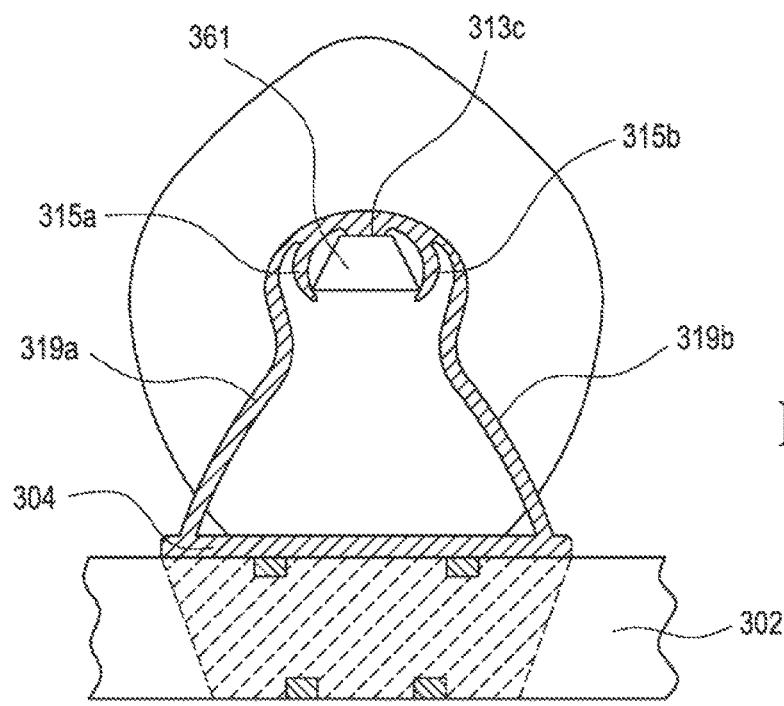
FIG. 8E is another embodiment of the orthodontic assembly including a bonded component and a wave like biasing member.
Figure 8F:
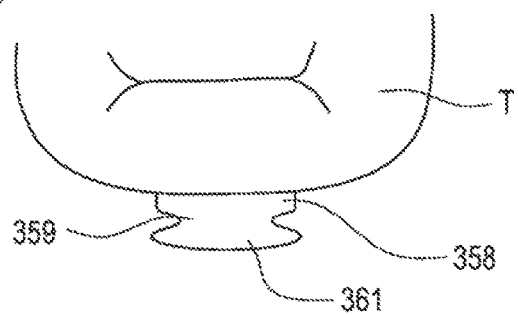
FIG. 8F is an occlusal surface view of the bonded member of FIG. 8E.

Similar to the aforementioned embodiments, and as illustrated in FIG. 8E and FIG. 8F the clip member 304 may have a snap fit connection with frame member 302. The head member 313c is a C shaped configuration with flexible end hook members 315a and 315b form a snap on clip for a bonded attachment 361. The bonded attachment 361 has inverted V shape. It is bonded to the tooth with base member 358 and has a narrowing neck member 359.

Figure 8G:
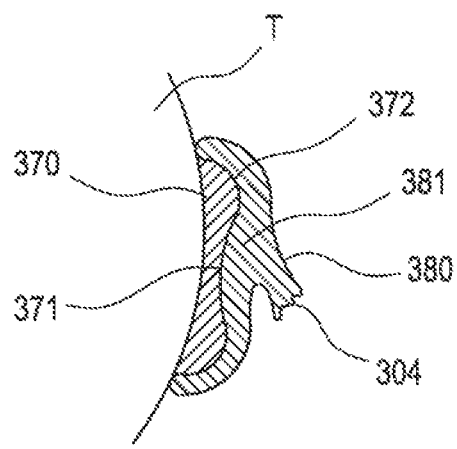
FIG. 8G is a side cross sectional view of a head of a clip of the orthodontic assembly illustrating concave shaped bonded member in operative engagement with a suction cup on a clip member.
Figure 8H:
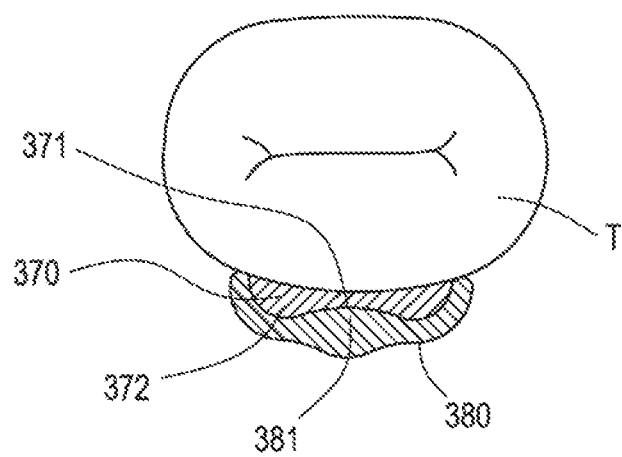
FIG. 8H is a top occlusal view of the assembly of FIG. 8G.
Figure 8I:
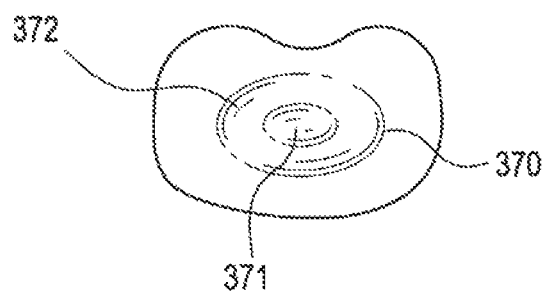
FIG. 8I is a lingual view of the bonded component of FIG. 8G.

In other embodiments, and as illustrated in FIG. 8G, FIG. 8H and FIG. 8I the clip member 304 may have suction cup-shaped head 380 configured to engage a bonded member 370. Bonded oval shaped component 370 may have a concave middle part 371 and convex oval outer ridge 372 configured to fit the corresponding configuration of the clip member 380, whereas convex part 381 fits in the concave part 371 and end peripheries 372 of the suction cup member 380 extend over the convex part 372 of the bonded component 370 to form a seal with the bonded component. The suction-cup interaction between the clip member 380 and the bonded member 370 allows for a more secure connection between the clip member 380 and the bonded member 370. This also allows for an effective application of a force from the clip member 380 on the tooth T via the bonded member 370.

As illustrated in FIG. 8D, the biasing member 319b may have dual flexible members for exerting a force on the bonded member 360 and tooth member T. The head member 313d is inserted between the dual engagement members 362a, 362b of the bonded member 360.

In another embodiment shown in FIG. 9, the orthodontic assembly 400 may include a frame member 402 having a U-shaped track configuration for clip on components or for facilitating slidable movement of components along the frame member 402. As illustrated, the frame member 402 may include a track-like configuration including one or more rails 403a, 403b configured to receivably permit one or more clip members 404 and/or other interchangeable components to clip or slide along the frame member 402. As such, the clip member 404 exerts a force on one or more teeth T.

As illustrated in FIG. 10A-10B the clip members 404 may include connecting features or lips 405a, 405b, which are configured for a clip or snap engagement with the respective rails 403a and 403b of the frame member 402. The frame member 402 permits the clip members 404 to slide or clip along the frame member 402 for selective engagement with one or more of the desired teeth T The connecting features 405a and 405b each include respective openings or grooves 407a, 407b for receiving the respective rails 403a, 403b therein.

As illustrated in an embodiment shown in FIGS. 11A-11E, the orthodontic assembly provides a frame member 402 and a slidable clip member 404 configured to engage the user's tooth T. The clip member 404 may include one or more slides, or wheels 460a, 460b that permit the clip member 404 to slide along the frame member 402 and respective rails 403a, 403b. The clip member 404 may further include a sleeve member 406 which is configured to engage the buccal and lingual portions of the tooth. Engage the tooth like a ring or band around the tooth.

Figure 11A:
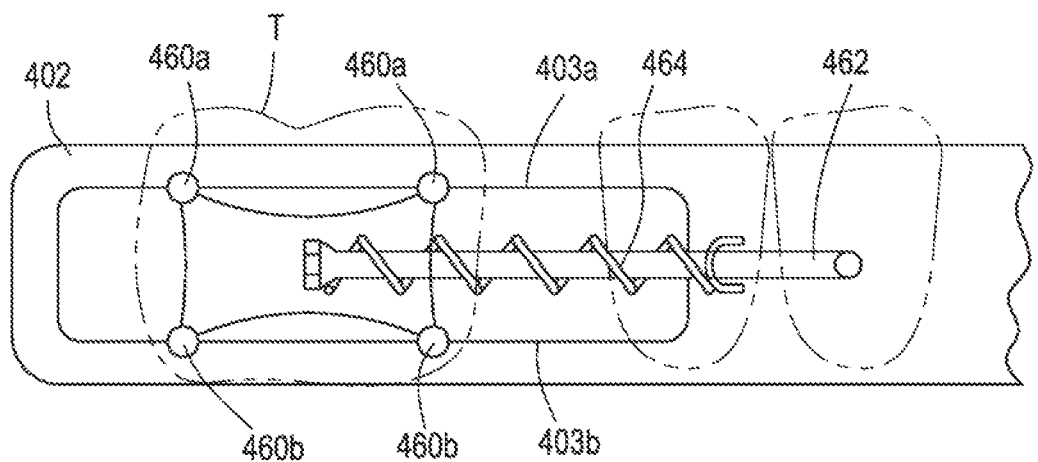
FIG. 11A is a lingual perspective view of an embodiment of an orthodontic assembly illustrating the track frame member of FIG. 9 and a sliding clip member connected to a biasing member.
Figure 11C:
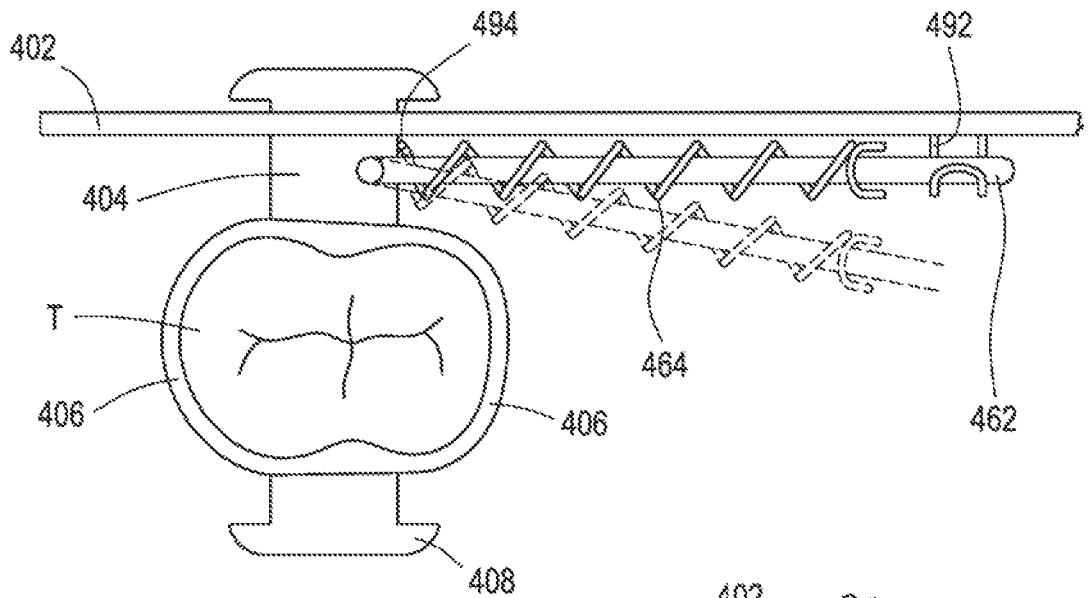
FIG. 11C is an occlusal environmental view of the orthodontic assembly of FIG. 11A.
Figure 11B:
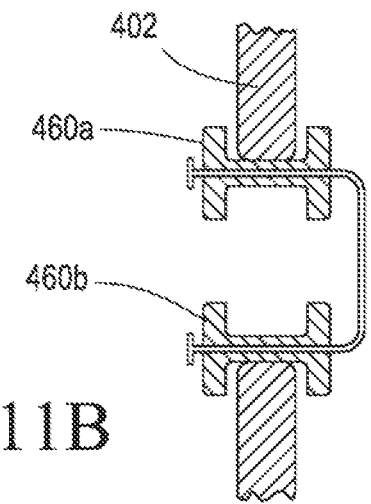
FIG. 11B is a cross-sectional side view of the sliding clip member of FIG. 11A configured for operative engagement with a track frame member.

As depicted in FIG. 11A, the frame member 402 may be provided in the posterior area of the mouth to distalize the molar. The frame member 402 is operatively connected to a clip member 404 which includes a part member 408 to help in the seating of the band member 406 around the tooth T.

The orthodontic assembly may further include a spring or biasing member 464. The spring 464 may be pre-loaded such that when the orthodontic assembly 4 positioned in the user's mouth, the spring 464 exerts a force on the operatively connected clip member 404 and connected tooth T, thereby facilitating tooth movement or retention.

As illustrated, the orthodontic assembly may further include a rod member 462. The rod member 462, which may be connected to the frame member 402 and extends along the rails 403a, 403b to provide guidance and support as the clip member 404 slides along the frame member 402. The biasing member 408 and band member 406, which encloses the tooth T, is capable of sliding along frame member 402 and through locking engagement 492. Rod member 462 may be rotated about a hinge member 494 provided on one side of the clip member 404 into locking engagement with a hook 492 on the frame member 402 on the other side.

Figure 11D:
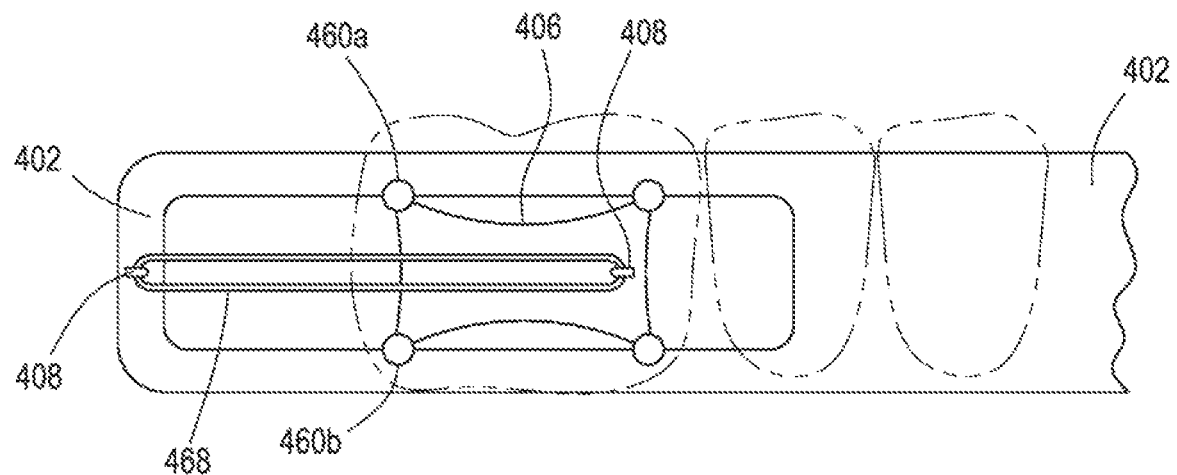
FIG. 11D is a lingual perspective view of an embodiment of an orthodontic assembly illustrating the track frame member of FIG. 11A and a sliding clip member connected to a biasing member using elastic bands for tooth movement.
Figure 11E:
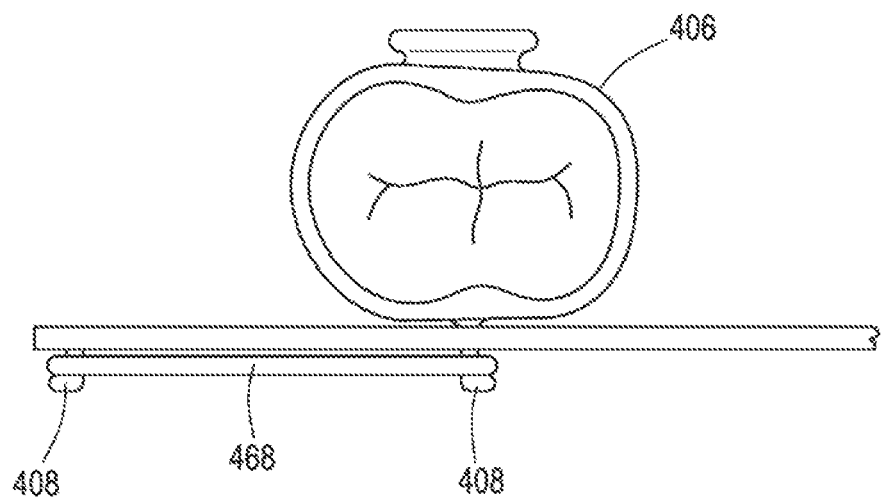
FIG. 11E is an occlusal environmental view of the orthodontic assembly of FIG. 11D.

The rod member 462 hinged engagement with hook 494 allows the spring 464 to be removed, activated, or replaced as needed. As illustrated in FIGS. 11D-E, elastic rubber bands 468 may also be connected to a catch members 408 on the band member 406 of the clip member 404, and to the outer surface of the frame member 402 and exert a biasing force on the tooth T. In an embodiment of the orthodontic assembly illustrated in FIGS. 12A and 12B, the clip member 434 is connectable to the track frame member 402 to exert a force on an engaged tooth T. The clip member 434 may include a generally elastic module 433. Notably, the clip member 434 may be provided with the elastic member, wherein the elastic module inserted into the frame member 402 and pre-loaded to exert a biasing force on tooth T or group of teeth when in an engaged position. The force applied to the tooth T may be controlled by modifying the size of the clip member 434 and elastic module 433. Further, the force applied to the tooth T may be adjusted by varying the distance between the frame member 402 and the tooth T. In this situation, a standard clip may be used, and the force exerted on the tooth is based upon the shape of the frame member. As the tooth moves, a new frame may be used to further move the tooth by changing the shape of the frame to apply a force on the tooth using the standard clip. As a result, the treatment may advance by either changing the clips on a set frame, or changing the frame using standard clips, or even a combination of both.

The clip member 434 may be operatively connected to one or more hooks, windows or grooves (not shown) provided in the frame member 402. As such, when the orthodontic assembly is positioned in the user's mouth, and the clip member 434 is seated in the frame member 402, the elastic module 433 may be compressed or stretched, thereby selectively exerting a force on the engaged tooth T or teeth. Notably, the clip member 434 and elastic module 433 may be configured as one joined component.

The elastic clip member 434 may be interchanged with a clip member 434 having a different shape or biasing force to force the tooth to move in the desired direction. Notably, it is contemplated that clip member 434 may be manufactured in customizable size, shapes, and colors, including a clear color, using 3-D printing and any other manufacturing processes. It is further contemplated the clip member 434 may be used in the anterior portion of the mouth and attached to a fastening member such as a hook, which is described below herein.

Figure 13A:
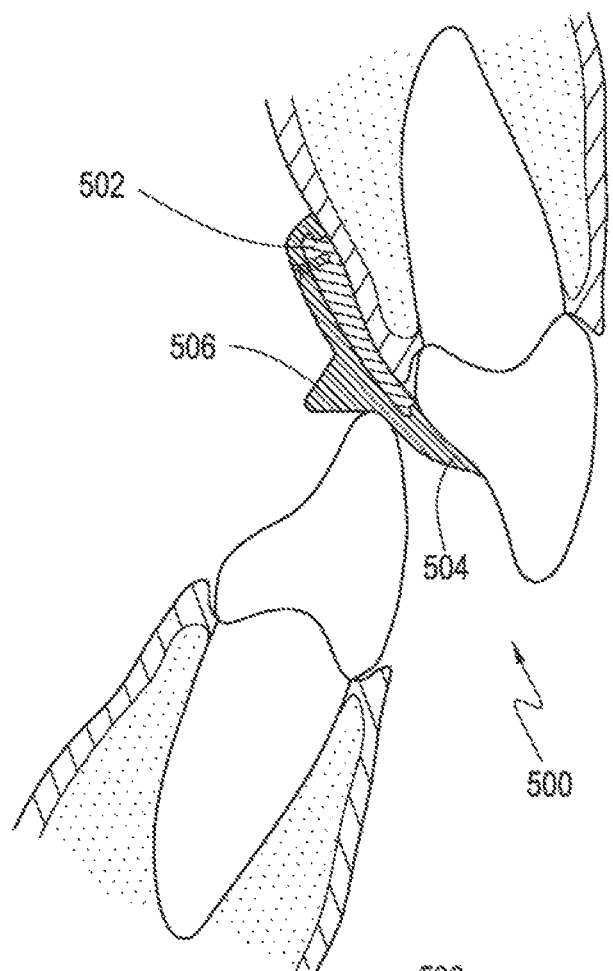
FIG. 13A is a cross sectional side perspective view of an embodiment of an orthodontic assembly including a clip member engaged with a frame member positioned on a palatal surface for engagement with the lower incisors to facilitate bite correction.
Figure 13B:
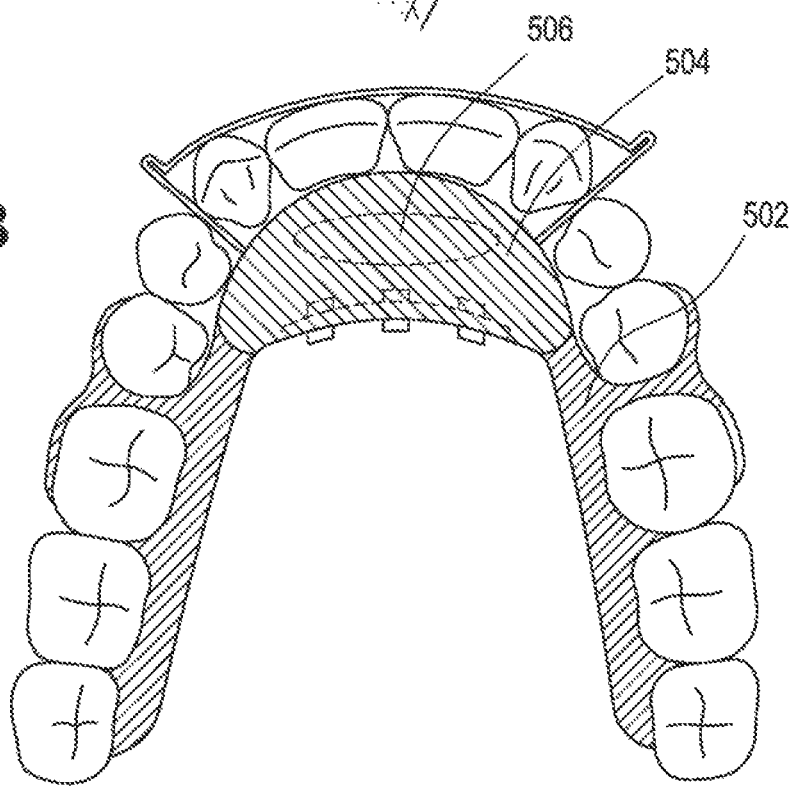
FIG. 13B is an occlusal top view of the upper palate illustrating the orthodontic assembly and clip member of FIG. 13A positioned in the frame.

In an embodiment illustrated in FIGS. 13A and 13B, the orthodontic assembly 500 may further include a frame member 502 including clip members 504 to facilitate "bite correction." Notably, different clip members having different components may also be used for habit modification. As shown, the clip member 504 may include one or more angled or ramp portions 506. The ramp or inclined portion 506 may be positioned for engagement with a portion of the lower teeth to facilitate bite correction. It is contemplated that multiple clip members 504 may be provided with different positions of the ramp on the clip for the purposes of forward positioning of the lower jaw in addition to opening the bite. Forward positioning is when the lower jaw and teeth are forced into a position that is a more forward position than the natural closing position over a period of time until the new jaw position becomes permanent.

FIG. 13B is an occlusal top view of the upper palate illustrating the orthodontic assembly and clip member 504 of FIG. 13A positioned in the frame 502.

Figure 13C:
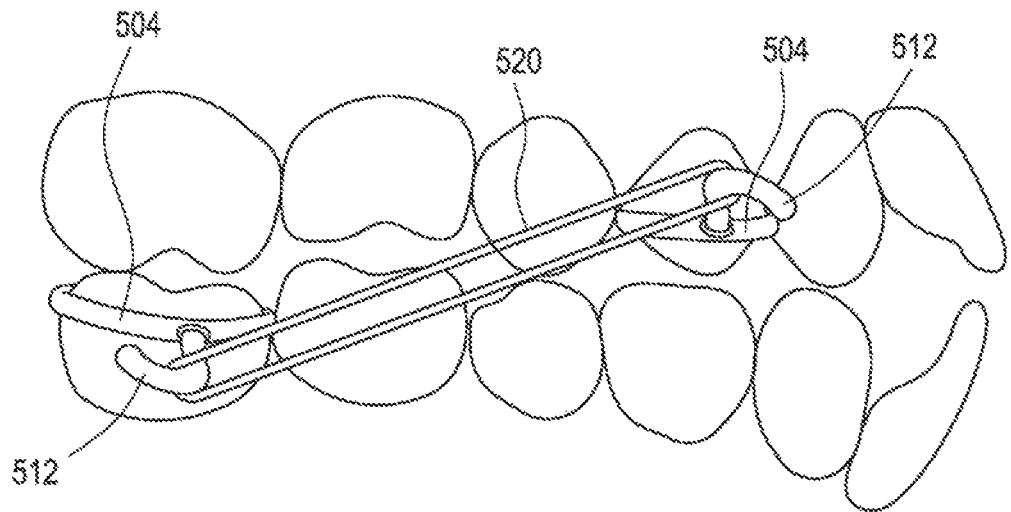
FIG. 13C is a lateral, side view of the hooks component originating from a frame or clips on the frame (not shown) of the upper and lower arches and connected with elastic rubber bands for bite correction.
Figure 13D:
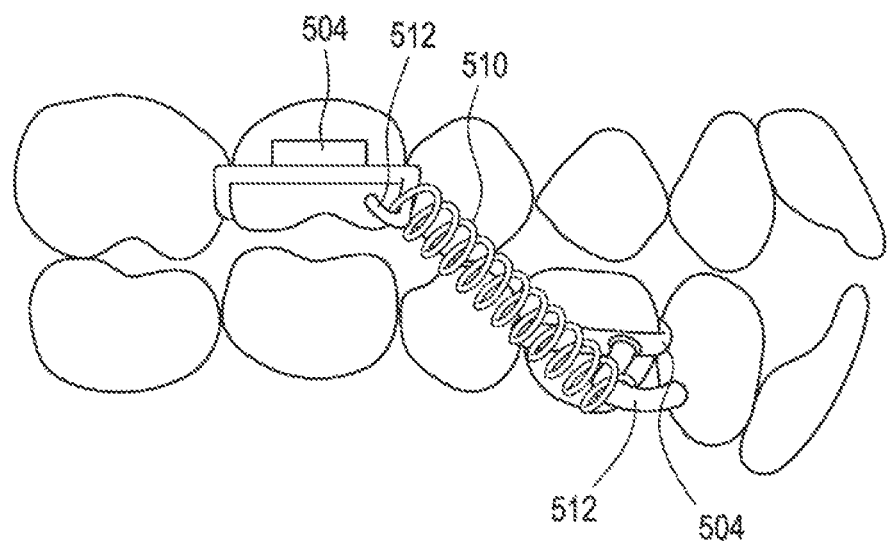
FIG. 13D is a lateral, side view of components originating from a frame or clips on the frame (not shown) of the upper and lower arches and connected with a spring for bite correction.

FIG. 13C is a lateral, side view of a hook component 512 originating from a frame member 502 or clip member 504 on the frame (not shown) of the upper and lower arches and connected with elastic rubber bands 520 for bite correction. FIG. 13D is a lateral, side view of components originating from a frame member 502 (not shown) or clip member 504 on the frame member of the upper and lower arches and connected with a spring 510 for bite correction.

In another embodiment illustrated in FIGS. 14A and 14B, the orthodontic assembly 600 may be configured to facilitate widening of the arches of a user's teeth. The orthodontic assembly includes a frame assembly 602 of two portions 603a and 603b and an adjustment member 690. The frame assembly 602 and adjustment member 690 may be configured and manufactured via the aforementioned 3-D printing methods. As such, the frame assembly 602 is configured and manufactured to conform to the middle of the upper portion and/or lower portion of the user's mouth to facilitate widening of the arches. As illustrated, the frame assembly 602 may include a first portion 603a and a second portion 603b configured to receive a dual clip member active component 690 for the expansion of the palate of the user's mouth. In one embodiment, arch widening may be achieved by inserting the assembly with the dual clip adjustment member 690 into the user's mouth, and providing after a predetermined time a replacement of the dual clip adjustment member 690 incrementally increasing the force on the teeth forcing them apart.

The adjustment component 690 may be but not limited to, a rotating active component 690b called hyrax, commonly used in fixed appliances to expand the arch and the teeth in the mouth, FIG. 14 B, or a flexible U-shaped spring member 690a FIG. 14 A. The active member 690 is positioned intermediate to the first portion 603a and second portion 603b to apply a lateral biasing force or pulling force to each of the portions 603a, 603b. The adjustment component 690 may be adjusted, replaced or modified to vary the force exerted on the first and second portions 603a, 603b. As such, during the adjustment process, replacement of the adjustment member 690 to selectively increase the biasing or pulling forces of the adjustment member 690 on the portions 603a, 603b either forces the first portion and second portion 603a, 603b together to facilitate narrowing of the arches or pushes the first portion 603a and second portion 603b apart, thereby facilitating of the expansion of the user's arches. The dual clip adjustment member 690 may be removed after the expansion is accomplished and replaced by a simple bar to minimized discomfort associated with the size and shape to the active components. As shown in FIG. 14C the clip member 692 is removably insertable into a portion of the adjustment member 603 of the frame assembly 602. The edge portion 680 is insertable into the aperture 684 formed in the adjustment member 603, and the clip portions 682 engage the inner edge of the aperture 684 thereby locking the clip members 692 to the adjustment member 603.

Figure 15A:
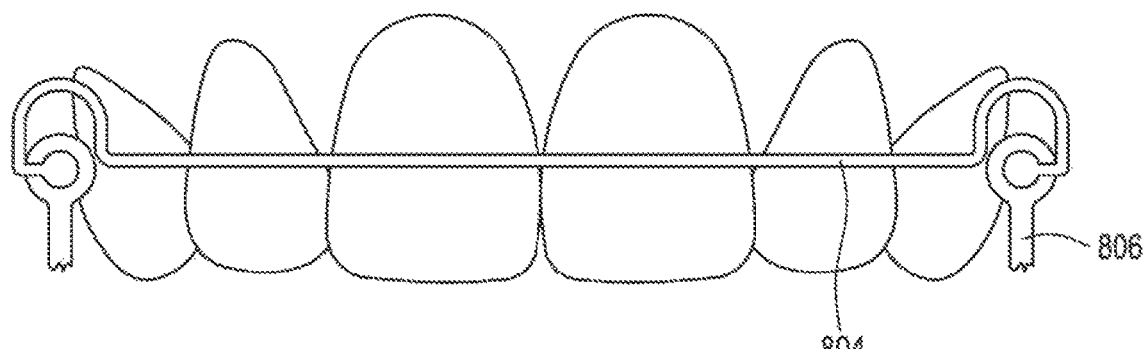
FIG. 15A is a frontal view of a labial bow member attached to a special design component.
Figure 15B:
FIG. 15B is a frontal view of another embodiment of the labial bow member configured to connect to a special component in FIG. 15A.
Figure 15C:
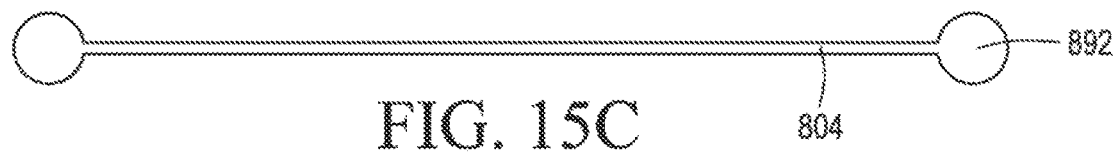
FIG. 15C is a frontal view of another embodiment of the labial bow elastic module member configured to connect to a special component in FIG. 15A.
Figure 15D:
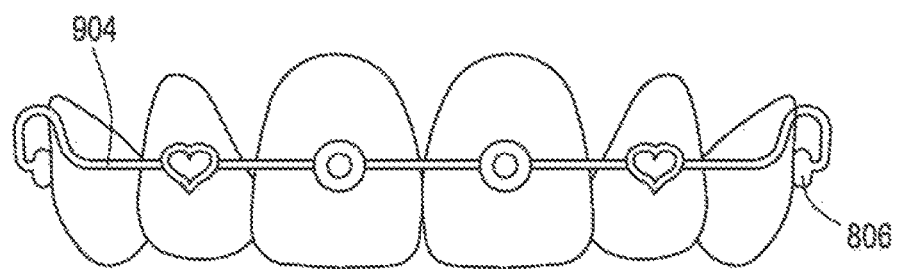
FIG. 15D is a frontal view of another embodiment of the labial bow member illustrating decorative features.
Figure 15E:
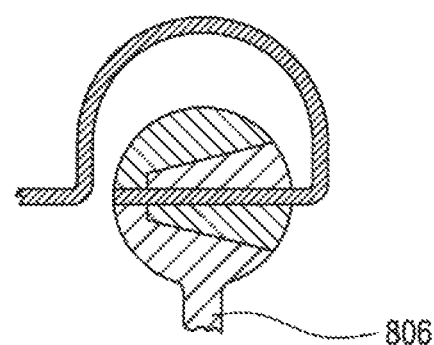
FIG. 15E is a detailed frontal view of the special configure component in FIG. 15A and labial bow member connection.
Figure 15F:
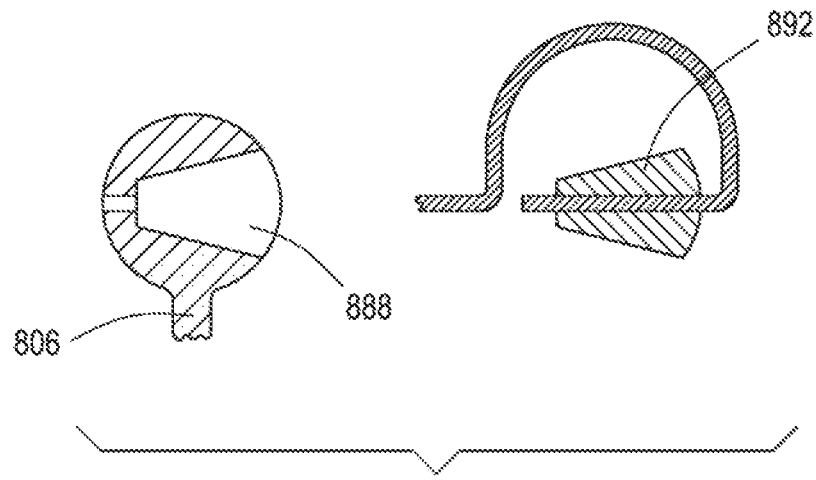
FIG. 15F is an exploded detailed view of the special configure component and labial bow member connection of FIG. 15E.
Figure 15G:
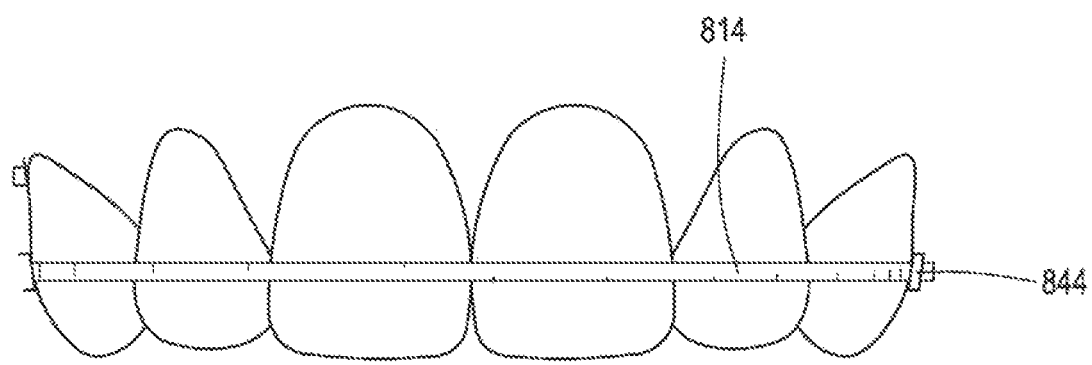
FIG. 15G is another embodiment of the orthodontic assembly including a labial bow member assembly.
Figure 15H:
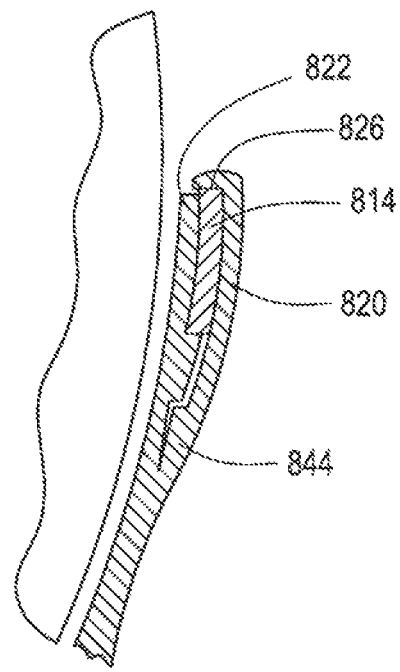
FIG. 15H is a side cross sectional view of the orthodontic assembly of FIG. 15G, illustrating the labial bow member and clip member connection.
Figure 15I:
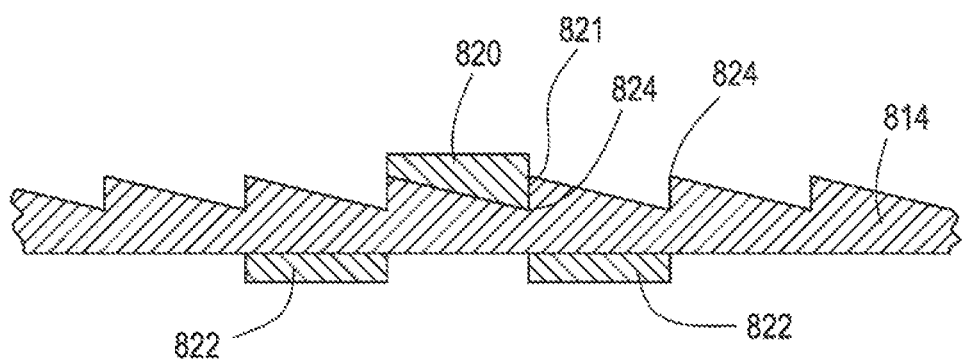
FIG. 15I is a top sectional view of the orthodontic assembly of 15G, illustrating the labial bow member and the clip member connection.
Figure 15J:
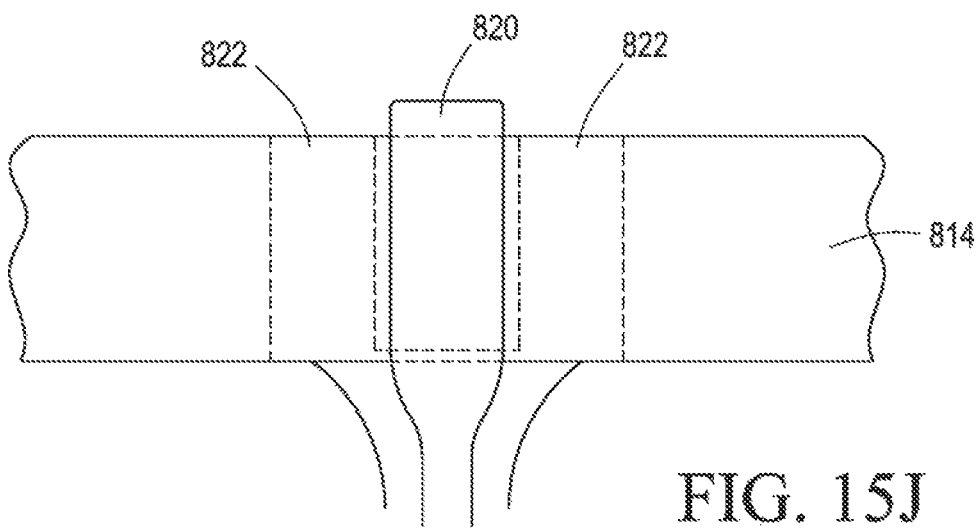
FIG. 15J is a frontal view of the orthodontic assembly of 15G, illustrating the labial bow member and the clip member connection.
Figure 15K:
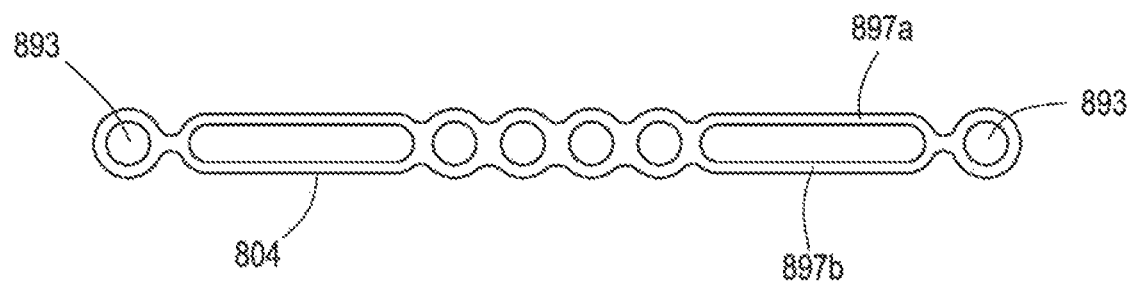
FIG. 15K is a frontal view of another embodiment of the labial bow member configured with first and second strips, wherein the first and second strips connect and separate at predetermined locations.
Figure 15M:
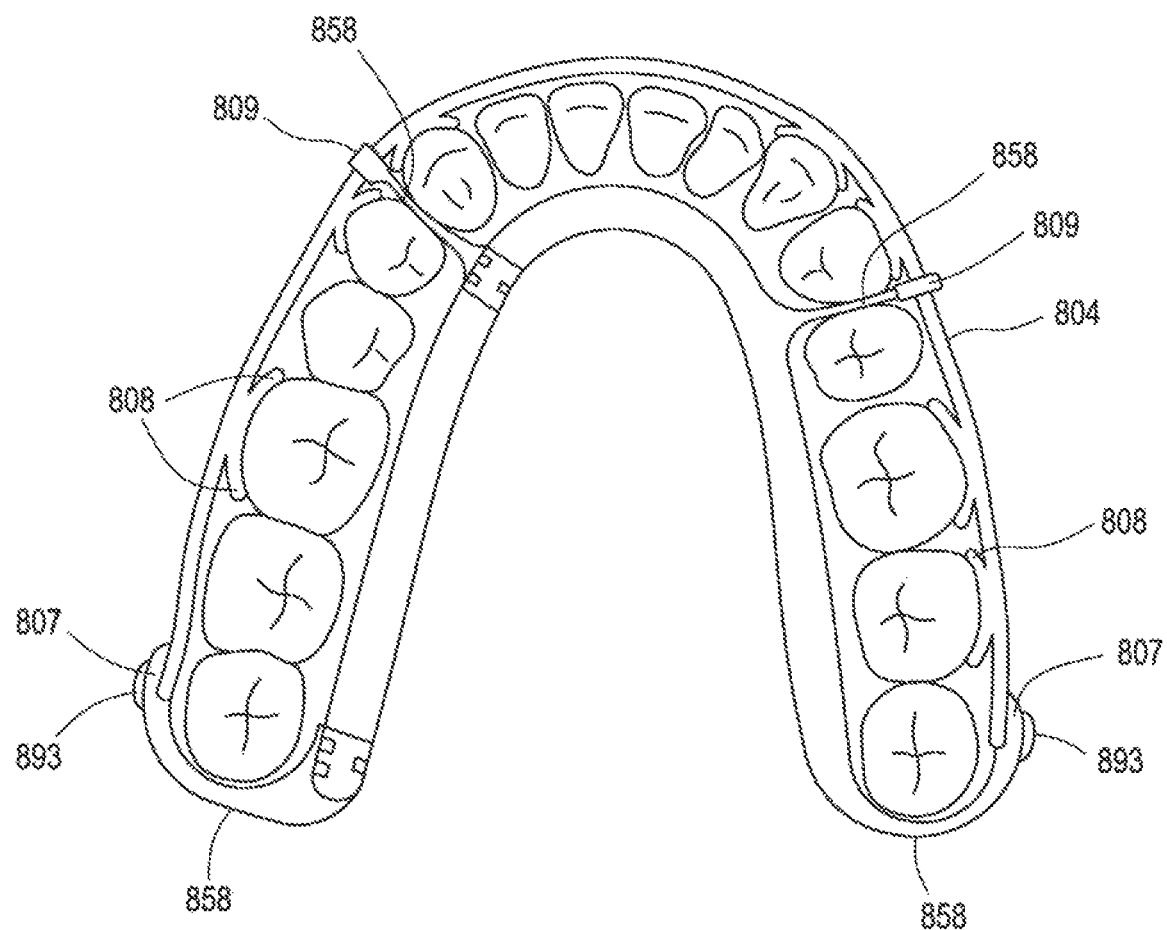
FIG. 15M is a top occlusal view of an assembly with labial bow clip member with curved extensions in active engagement with loop and C shape components on a frame or intermediate clip members of the assembly.
Figure 15L:
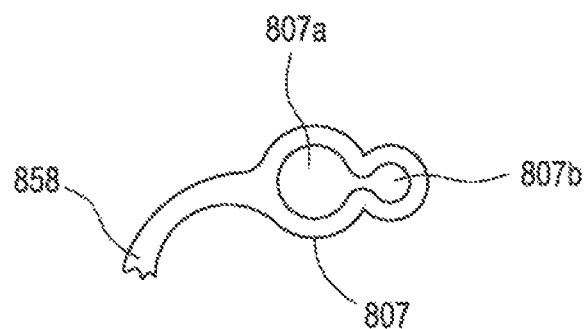
FIG. 15L is a side view of the openings of a receiving part of the other loop component for the connection of labial bow member.
Figure 15N:
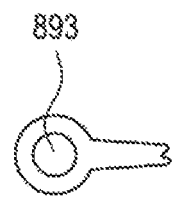
FIG. 15N is a side view of locking component of loop component of the labial bow member.
Figure 15O:
FIG. 15O is a top view of FIG. 15N.
Figure 15P:
FIG. 15P is side view of locking component of C-shaped component for connection with the labial bow member.
Figure 15Q:
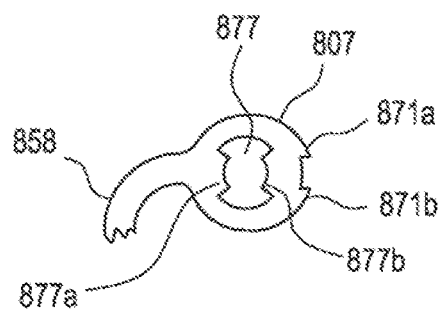
FIG. 15Q is a side view of an opening of another loop component for connection with the labial bow member of FIG. 15M.

In embodiments illustrated in FIGS. 15A-P, the orthodontic assembly includes labial bow member 804, which is configurable for positioning in the anterior portion in the user's mouth and a component member 806. The labial bow member 804 is removably connected to the component member 806 to apply a force or rest passively on the user's teeth. The component member 806 may be connected to a frame member (not shown).

As illustrated, the labial bow member 804 exerts a force on the user's teeth to facilitate tooth movement or rest passively on the user's teeth and may include a variety of configurations. The labial bow 804 may include an assortment of configurations, which may include, but are not limited to, two or more strips in combination in joining areas, extensions 808, bristles, suction cups, circles, hearts, and stars. Additionally aesthetic clips may be used in combination with a connected frame member. Labial bow member may also include two or more sections configured to engage each other with ball and socket configuration similar to illustration in FIG. 5E allowing designated sections to maintain contact desirable contact with the tooth surface as the tooth moves or for applying specific force for tooth movement or retention. The labial bow member 804 is interchangeably replaceable such that a user or orthodontic professional may easily remove and/or replace the labial bow as desired. The labial bow member 804 may be inserted into an opening formed in a locking component member.

The opening in the locking component member can take can take different shapes and configuration to receivably engage the corresponding component on the labial bow member 804.

The labial bow member 804 may also include a fastening member 892 on labial bow member 804 having a wedge-shaped body. To facilitate the interchange of labial bow members 804, the orthodontic assembly further includes a component member 806 having an aperture 888 formed therein configured to receive the fastening member 892 therein. As illustrated, the fastening member 892 is inserted into the aperture 888 securing the bow member 804 to the hook member 806. Notably, the labial bow configuration permits a user to easily interchange or adjust the labial bow members 804 with a different labial bow member 804 having different shapes, designs, materials or biasing force on the teeth T.

Further, the labial bow embodiment permits the insertion of elastomeric string FIG. 15 C which is flexible and may be stretched permitting the ball shaped endings to be inserted into the respective fastening members 888.

The component locking member 806 may receive an either semi-rigid or elastomeric labial bow member therein, for added flexibility and for visually aesthetic purposes. Notably the loop originating from 892 of semi-rigid configuration may be flexed to facilitate the insertion of the labial bow into the opening 888.

As illustrated in FIG. 15G, the labial bow may include a clear strip member 814 that is provided about the outside portion of the teeth to achieve tooth retention and or movement. The clear serrated strip member 814 slides into a locking clip member 844 that is attached to the frame 802 or clip member 804 provided on a frame member 802. The length of the clear strip member 814 may be adjusted using a cable and tie feature.

As illustrated in FIG. 15H of the orthodontic assembly of FIG. 15G includes the labial strip member 814, a clip member 844 configured to receive the labial member 814 therein. The clip member 844 includes an inner clip portion 822 and an outer clip portion 820 configured to receive a portion of the labial member 814 there between. The outer clip portion 820 has a flexible body permitting the outer clip portion 820 to flex when the labial member 814 is slidably adjusted, thereby permitting the labial member to slide therein.

As illustrated in FIG. 15I, the outer lip portion 820 includes a locking portion 821, which engages a corresponding inner edge 824 of the labial bow member 814, locking the strip member in a selected position. The clip portion 820 also includes a top edge member 826 which controls movement of the labial member 814. As illustrated, FIG. 15I is a top sectional view of the orthodontic assembly of 15G, illustrating the labial bow member and the clip member connection. FIG. 15J is a frontal view of the orthodontic assembly of 15G, illustrating the labial bow member 814 and clip member 804 relationship. Labial member 814 could be either simple clear serrated strip or could be customized and 3D printed to fit the individual teeth of the user.

Other examples of the locking components are shown in FIGS. 15K-W. FIG. 15K is a frontal view of another embodiment of the labial bow member 804 configured with first and second strips 897a, wherein the first and second strips 897b connect and separate at predetermined locations. FIG. 15M is a top occlusal view of an assembly with labial bow member 804 with curved extensions 808 in active engagement with the teeth, and the labial bow member 804 is in operative engagement with loop shape locking members 807 and C shape locking members 809. The loop shape members 807 and C shape members 809 may have extensions 858 for the connection with clips or with the frame of the assembly. FIG. 15N is a side view of one example of fastening member 893 of loop locking component of the labial bow member, and FIG. 15O is a top view of FIG. 15N. The fastening member 893 acts as a locking member to lock the labial bow 804 to the opening 807b of the loop member 807. The fastening member 893 on the labial bow member 804 may have a round or oval shaped body. To facilitate the interchange of the labial bow member 804, the loop member 807 of the orthodontic assembly may have two openings 807a and 807b formed and configured to receive the locking component 893 as shown in FIG. 15L. The fastening member 893 may fit through and then slide from the larger opening 807a into the smaller opening 807b into a locking position. Further, a block (not shown) may be placed in opening 807a to prevent the locking component 893 from disengaging.

Figure 15R:
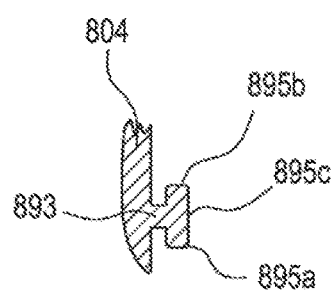
FIG. 15R is a top view of FIG of FIG. 15S.
Figure 15S:
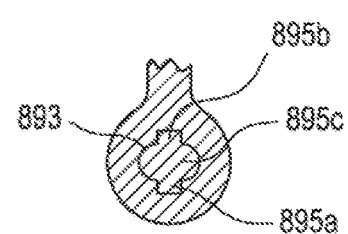
FIG. 15S is a side view of the locking component of the loop component of FIG. 15Q of the labial bow member.
Figure 15V:
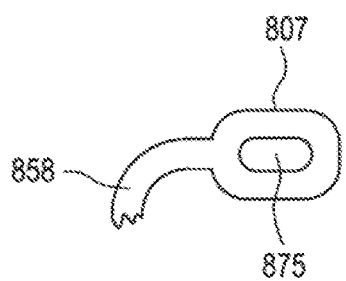
FIG. 15V is a side view of a rectangular-shaped opening of a receiving part of the loop components for the connection of labial bow member.

FIG. 15S is a side view and FIG. 15R is a top view of another example of the fastening member 893 with a first extrusion 895a and second extrusion 895b from a round base 895c. The locking members 895a and 895b of FIG. 15S are configured to fit into an opening 877 of the loop member 807 of FIG. 15Q and rotated into a locking position to engage corresponding locking elements 877a and 877b respectively to form locking engagement, FIG. 15U is a cross-sectional view of the front part of loop 807 with groove shaped configuration for additional locking and positioning of the labial bow 804 between the corresponding 871a and 871b components of the loop 807.

Figure 15W:
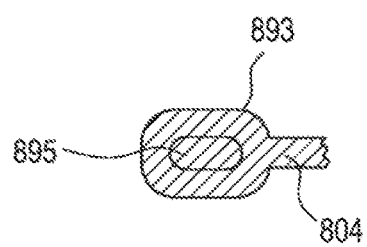
FIG. 15W is a side view of a rectangular-shaped locking component of the loop component of the labial bow member.
Figure 15T:
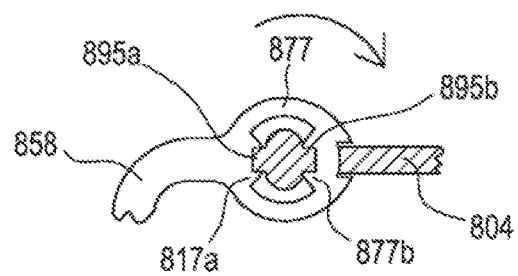
FIG. 15T is a side view of the loop component of FIG. 15Q in active engagement with the locking component of FIG. 15S.
Figure 15U:
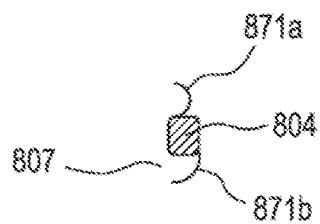
FIG. 15U is a cross-sectional view of FIG. 15T showing a groove in the front part of the loop component in active engagement with the labial bow component.

FIG. 15W is a side view of another example of the fastening member 893 with a rectangular-shaped locking component 895. The rectangular-shaped fastening member 895 is configured to snap fit into corresponding rectangular opening 875 of the loop member 807 of FIG. 15V. The fastening member 895 on the labial bow member 804 may have a round, oval, or any shape and combination shaped body to snap fit or slide into corresponding opening 875 of the loop member 807.

Another example of a locking component is a C shaped component member 809 included in the orthodontic assembly 8 shown in FIG. 15P. The C shaped component member may engage the labial bow 804, and stabilize the labial bow 804 in selected areas as determined by the orthodontist as shown in FIG. 15M.

Figure 15X:
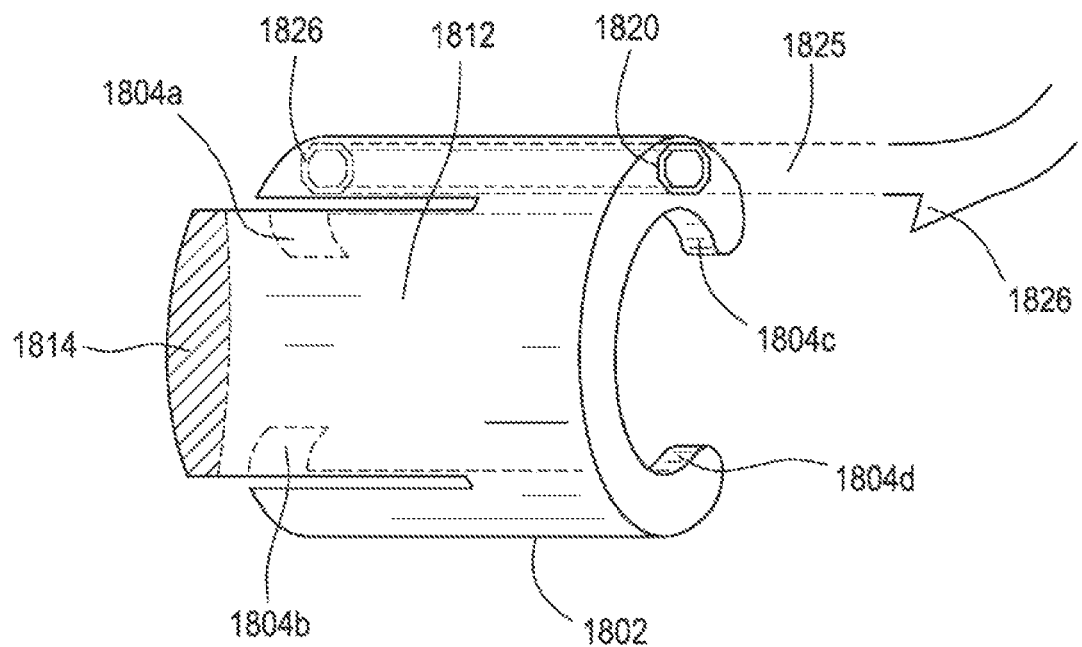
FIG. 15Xa is a side view of another clip member of the assembly of FIG. 15M illustrating a modified C-shaped locking clip member.
Figure 15X:
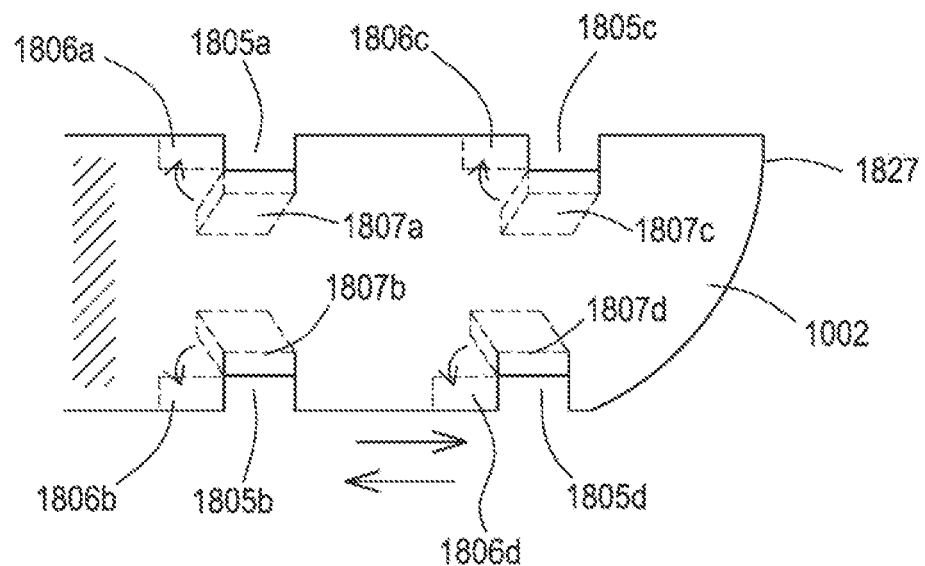
Figure 15X:
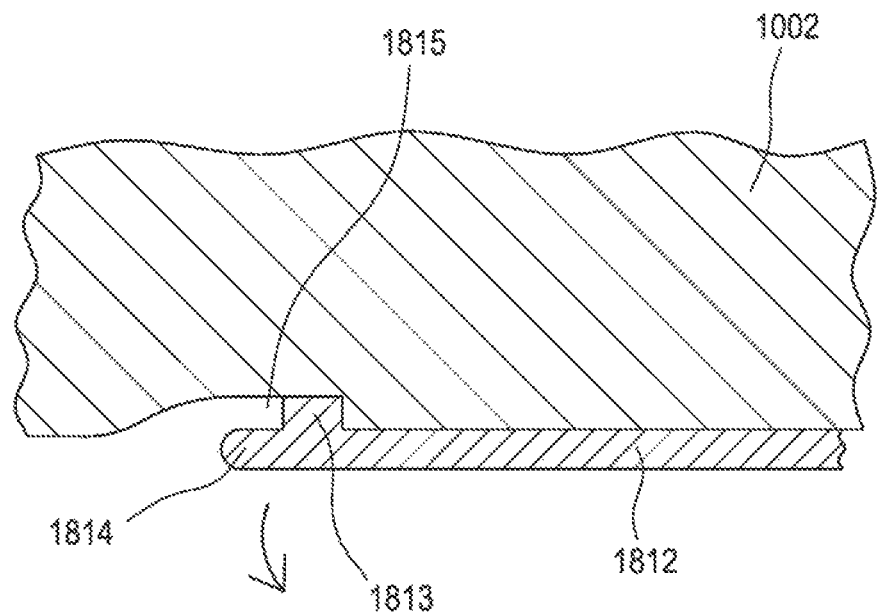
Figure 15X:
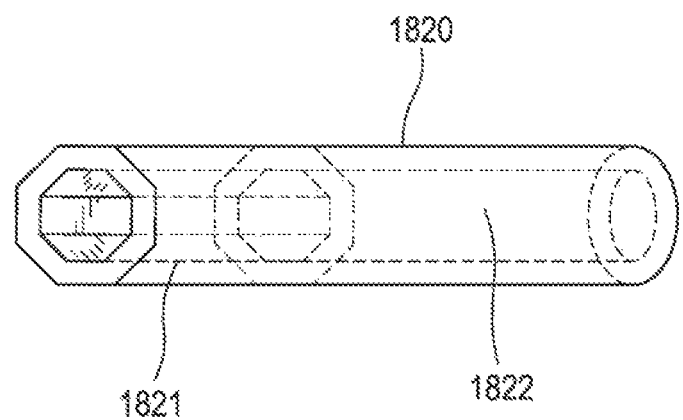

As illustrated in FIG. 15M the extension member 858 connects with the rest of the assembly with at least one locking component forming the back connector. Another example of a locking component connecting the back connector to the rest of the assembly is a modified C-sliding member 1802 in FIG. 15Xa. The modified C-sliding member 1802 has a first locking extension 1804a and a second locking 1804b in generally opposing directions towards one another. Member 1802 may have additional extensions 1804c and 1804d. Extensions 1804a, 1804b, 1804c and 1804d of member 1802 first engage the frame member 1002 or bow member of the assembly in corresponding preconfigured openings 1805a, 1805b, 1805c and 1805d, as shown in FIG. 15Xb, and slide into corresponding locking preconfigured position 1806a, 1806b.1806c and 1806d respectively. Additionally, the frame member may have at least one locking block member corresponding the opening for the initial engagement of the clip member 1802 with the frame. The locking block prevents the clip 1802 from sliding on the frame 1002 once in its final position. FIG. 15Xb illustrates locking blocks 1807a, 1807b, 1807c and 1807d corresponding to openings 1805a, 1805b, 1805c and 1805d.

The modified C-sliding member 1802 may also have a locking board member 1812, As illustrated in FIGS. 15Xa and 15Xc the board member 1812 connects to the clip member 1802 and extend in a shape similar to a diving board to form a flexible end 1814 opposing the connection with the clip member. As illustrated in FIG. 15Xc the locking board 1812 has extension an 1813 preconfigured to fit into a corresponding opening 1815 in a locking position with the frame member 1002 when the clip slide into its final position. The clip may be unlocked by lifting the free end 1814 with a finger or instrument inserted into opening 1815.

As illustrated in FIG. 15Xa, the clip member 1802 may have a sliding adjustable tube 1820 that may be rotated for adjustment around a rod 1825. The adjusting the tube allows the opposing part of the clip to be positioned proximal to the tissue of the mouth. The rod 1825 has an end ring 1826 preventing the clip from sliding off of the rod.

As illustrated in FIG. 15Xe the tube 1820 may have first inner prism part 1821 and second inner cylinder part 1822 that fits the corresponding parts on the rod when the clip is in its final position on the frame. The clip is adjusted prior to insertion into the frame by sliding the clip on the rod so that the inner prism part of the tube will rotate around the cylinder part of the rod into the desired position and slide it back into the prism part of the rod to prevent further rotation once in the desired position. The inner prism part may be any non-circular cross-section that prevents the rotation.

The rod 1825 has an extension 1826, FIG. 15Xa, corresponding to preconfigured surface 1827, FIG. 15Xb, of frame member 1002. The surface 1827 prevents the clip from sliding in the extension 1826 direction once the frame and clip are in locked position.

Figure 15Y:
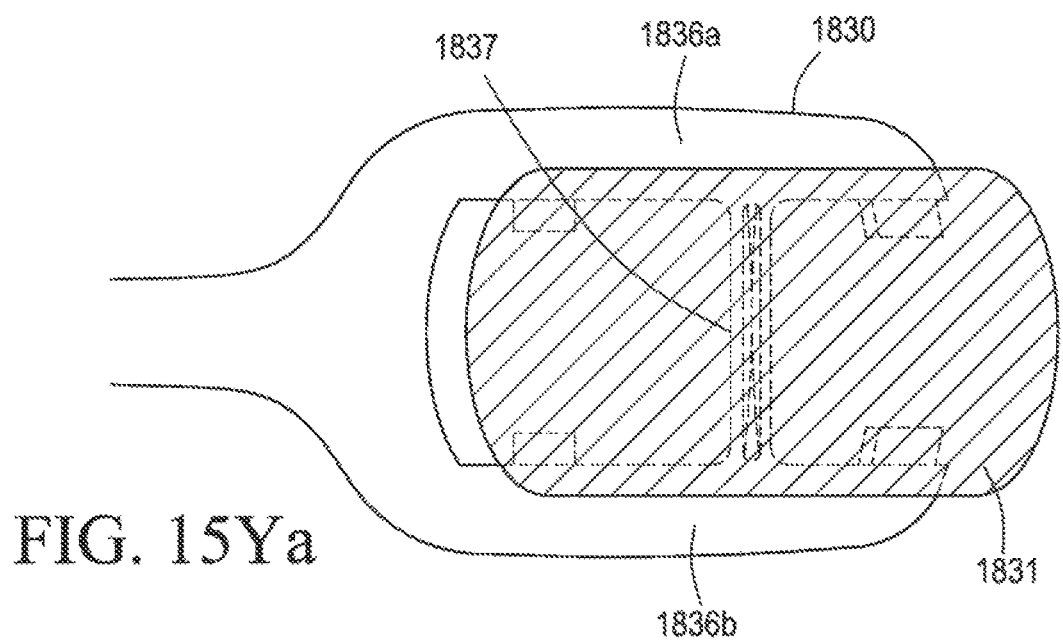
FIG. 15Ya is a side view of another clip member of the assembly of FIG. 15M illustrating a top-locking clip member.
Figure 15Y:
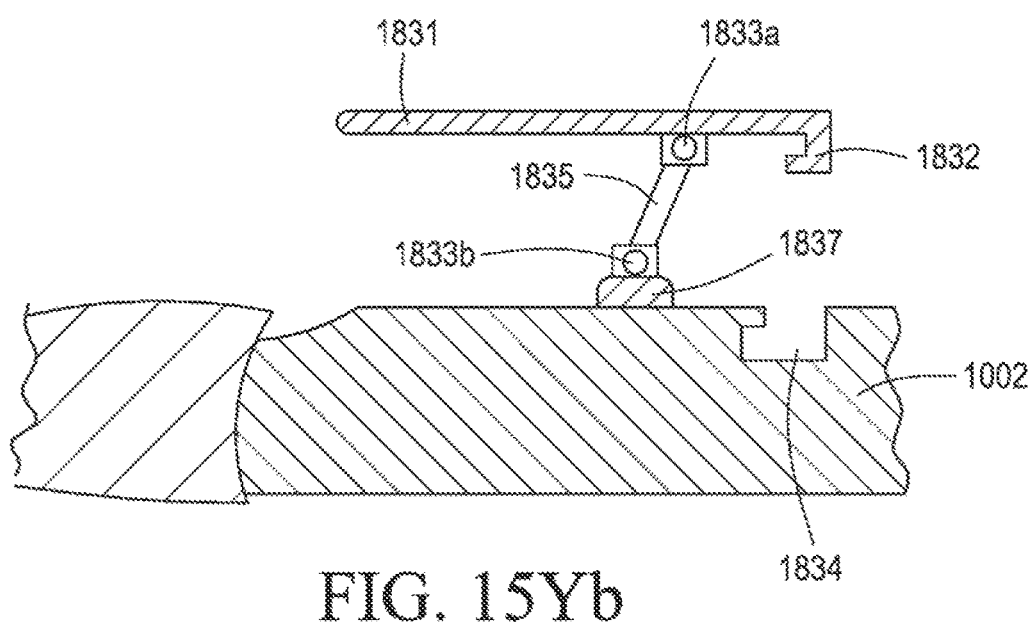
Figure 15Y:
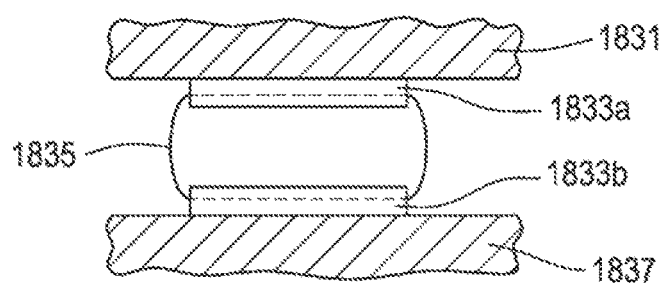

Another example of a locking component connecting the back connector to the rest of the assembly is a top-locking clip member. As illustrated in FIG. 15Ya, a clip member 1830 is two-pronged shape with first prong 1836a, second prong 1836b and bar 1837 connecting the first and second prongs together. As illustrated in FIG. 15Ya, FIG. 15Yb and FIG. 15Yc the top-locking clip member 1830 has a top part 1831 with a hook-shape part 1832 at an end for locking engagement with a preconfigured corresponding opening 1834 in the frame 1002. The clip member 1830 further has a ring rotating around a first hinge 1833a on the top part of the clip and second hinge 1833b on the bar 1837 of the clip. After the clip 1830 is engaged with the frame, the hook part 1832 is inserted into its corresponding opening 1834 in the frame and the top part 1831 is pressed on the opposing end of the hook part to rotate the ring 1835 around the first and seconds hinges 1833a and 1833b into a locking position as the ring is distorted and active tension is created in the ring to lock the engaged clip and frame together. The opening 1834 may in some embodiments be hook shaped corresponding to the hook-shaped part 1832 of the top part 1831.

Figure 15Z:
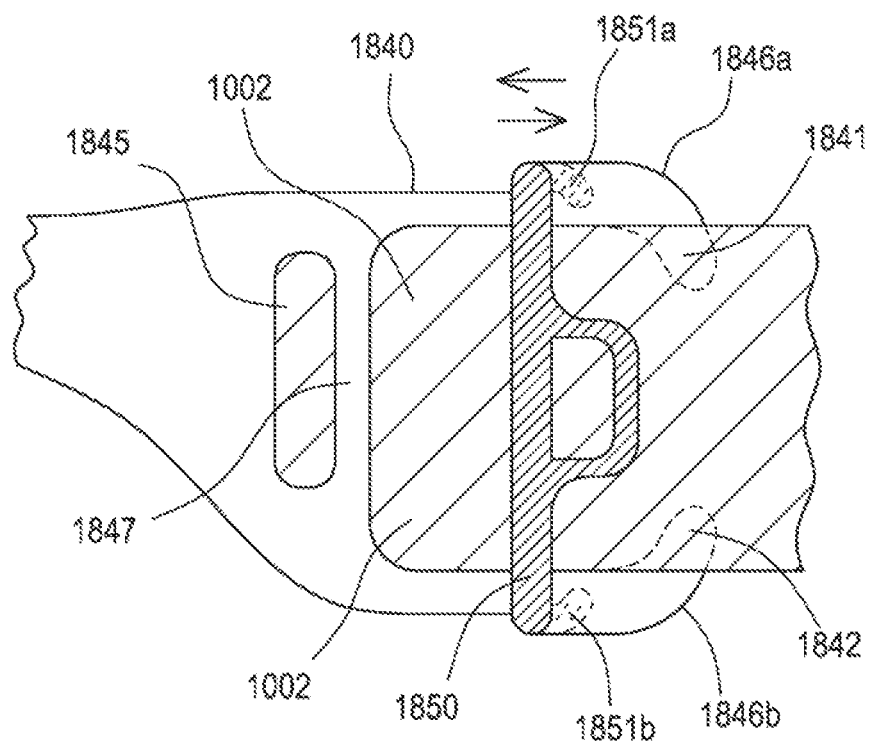
FIG. 15Za is a side view of another clip member of the assembly of FIG. 15M illustrating a hinge locking clip member.
Figure 15Z:
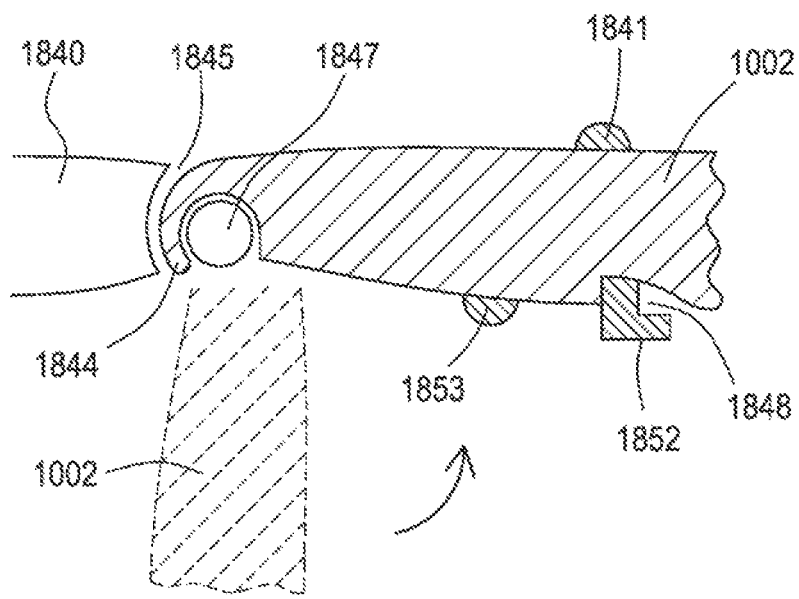

Another example of a locking component connecting the back connector to the rest of the assembly is a hinge clip member. As illustrated in FIG. 15Za hinge clip member 1840 is two-pronged shape with a first prong 1846a, a second prong 1846b and a hinge 1847 connecting the first and second prong together. The first prong 1846a has a first extension 1841, and the second prong 1846b has a second extension 1842. The first extension 1841 extends downward and inward towards the second extension. 1842 The second extension 1842 extends downward and inward towards the first extension. 1841. FIG. 15Za also illustrates a removable clip 1850 in active engagement with clip member 1840 and frame member 1002.

FIG. 15Zb is a top view of FIG. 15Za illustrating a hook shaped end 1844 of the frame member 1002 rotating to engage an opening 1845 between the hinge 1847 and clip member 1840.

As illustrated in FIG. 15Zc, the removable clip 1850 has a generally C-shaped and loop in the middle. The removable clip 1850 has a body 1853, first extension, 1851a, second extension 1851b, and loop portion 1852. Another embodiment of the removable clip would replace the C-shaped part by a ring. Another removable clip would only include a ring. As illustrated in FIG. 15Zb, After the frame member 1002 engages clip member 1840, the removable clip 1950 slides to engage both frame member 1002 and clip member 1840. The body part 1853 of clip 1850 contacts the frame member 1002 in a preconfigured position preventing the frame from rotating and disengaging the clip member 1840. Extensions 1851a and 1851b of clip member 1850 engage clip prongs 1846a and 1846b of clip 1840 respectively. The loop member 1852 of clip member 1850 engages a preconfigured opening 1848 in the frame member 1002 preventing the clip member 1850 from sliding and disengaging both frame member 1002 and clip member 1840. The process may be reversed by lifting loop member 1852.

Another example of a locking component connecting the back connector to the rest of the assembly is a split-arrow clip member 1860. As illustrated in FIG. 15Zd, the split-arrow clip member 1860 has a two-prong shaped clip. The split-arrow clip member 1860 has a first prong 1866a and a second prong 1866b. The first prong 1866a has a first protrusion 1864a and a second protrusion 1865a. The second prong 1866b has a first protrusion 1864b and a second protrusion 1865b. The first protrusions 1864a-b extend on the opposite side of the second protrusions 1865a-b, so that a frame member 1002 may slide between them such that first protrusions 1864a-b and second protrusions 1865a-b engage opposite sides of the frame member 1002. Additionally, and toward the base of the clip member 1860, the inner side of the first prong 1866a and second prong 1866b curve to form protrusions 1863a, 1863b followed by openings 1862a and 1862b respectively.

The frame member 1002 has first half-arrow portion 1871 and second half-arrow portion 1872 separated by opening 1875. The first and second half-arrow portions 1871, 1872 have slots 1887a, 1887b respectively. As the half-arrow portions 1871 and 1872 slide between the protrusions 1864a 1865a, 1864b and 1865b into protrusions 1863a and 1863b the half arrow 1871 and 1872 respectively bend into the opening 1875 and snap into the openings 1862a and 1862b respectively, thus leading to a locking engagement between the clip member 1860 and frame member 1002, wherein protrusions 1863a, 1863b engage slots 1887a, 1887b respectively. A partially attached or separate block 1890 may be inserted in the opening 1875 to prevent first and second half-arrow portions 1871 and 1872 from bending toward the opening 1875, to further secure the frame member 1002 to the locking component 1860.

Figure 16A:
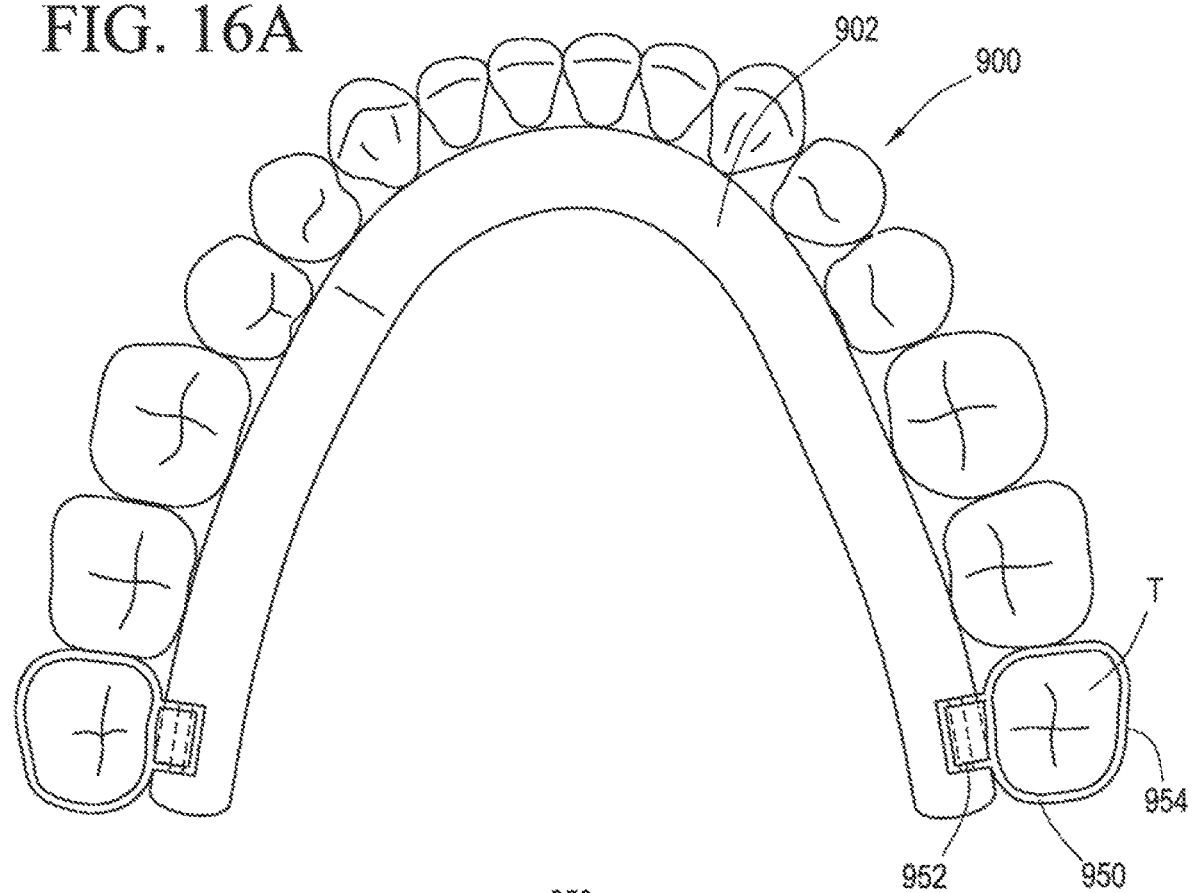
FIG. 16A is an environmental occlusal view of another embodiment of the orthodontic assembly positioned about the lingual surface of the user's teeth and engaged with a band member for retaining the frame member therein.
Figure 16B:
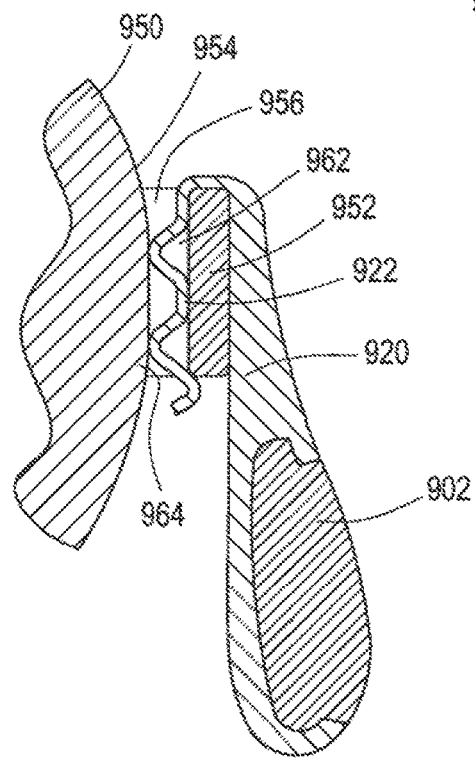
FIG. 16B is a cross-sectional view of the band member and clip member and frame member connection.

In an embodiment of the orthodontic assembly illustrated in FIGS. 16A-B, the orthodontic assembly 900 generally includes an arcuate U-shaped frame member 902 which via 3-D printing is adaptable to be conformed for positioning about the lingual portion of the user's teeth T. The orthodontic assembly further includes a tooth band assembly 950 configured to receivably encompass a selected tooth or series of teeth, and an extension from the clip member 904 or frame member 902 configured for securing the frame member 902 to the tooth band assembly 950.

As illustrated in FIG. 16A, the tooth band assembly 950 generally include a band member 954 which is adapted to receive the user's tooth therein. A lip member 952 extends generally outward from the band member 954. An opening 956 is formed between the band member 954 and lip member 952, and is configured to receive a portion of the clip member 904 or frame member 902 therein. As illustrated, the clip member 904 is removably connectable to both the frame member 902 and the tooth band assembly 950, and as such, fastens the frame member 902 to the tooth band assembly 950.

As illustrated in FIG. 16B, the clip member 904 extends from the frame member 902 in a generally upward direction. The clip member 904 includes a base portion 920 which is connected to the frame member 902 and a head portion 922 having a zigzag or sinusoidal wave-like configuration which may simultaneously engages the inner surface 962 of the lip member 952 and the outer surface 964 of the tooth band member 954 to provide a secure connection thereto.

As illustrated, multiple band assemblies 950 may be provided to engage multiple teeth and multiple locations in the mouth to provide multiple points of connections for the frame member. Further, as illustrated in previous embodiments, the clip members 904 may be removably connected to the frame members or integrally formed with the frame members. Band member assembly 950, frame member 902 and clip member 904 may all be manufactured via a variety of manufacturing techniques including but not limited to 3D printing.

Figure 17A:
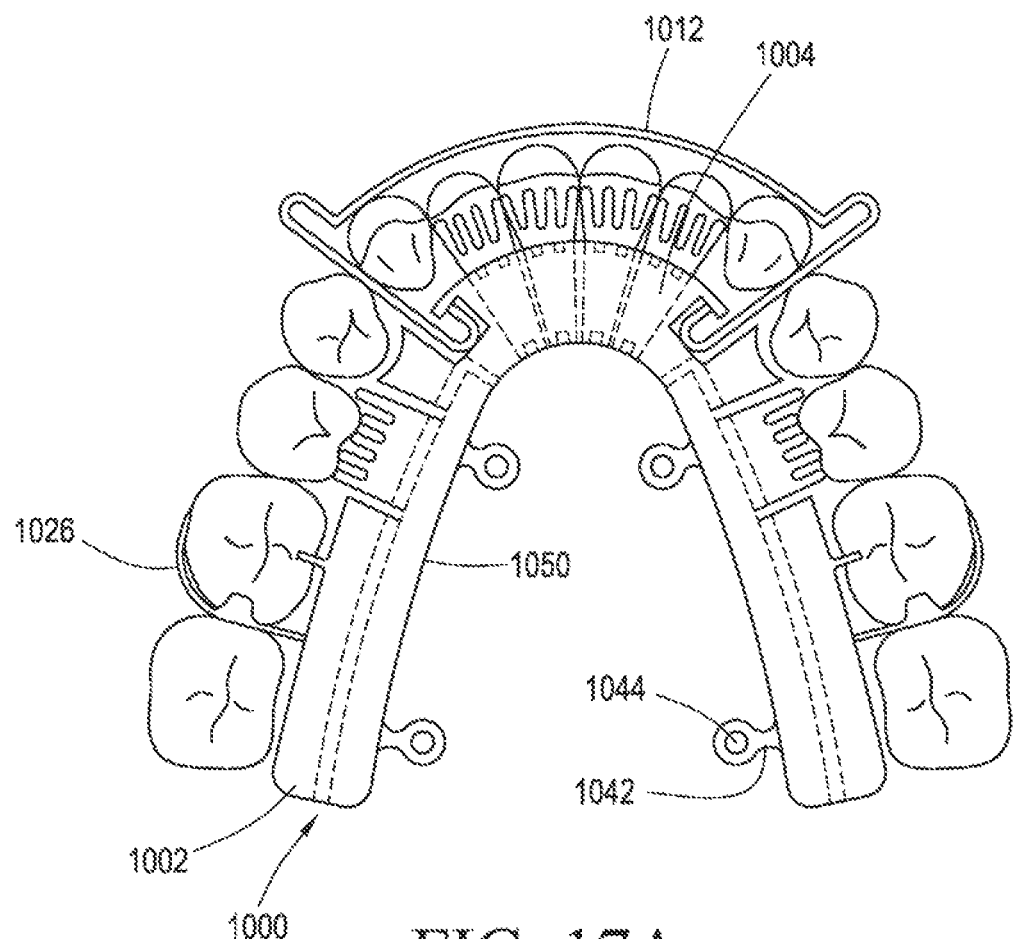
FIG. 17A is an occlusal view of another embodiment of an orthodontic assembly having a temporary anchorage device supported frame.
Figure 17B:
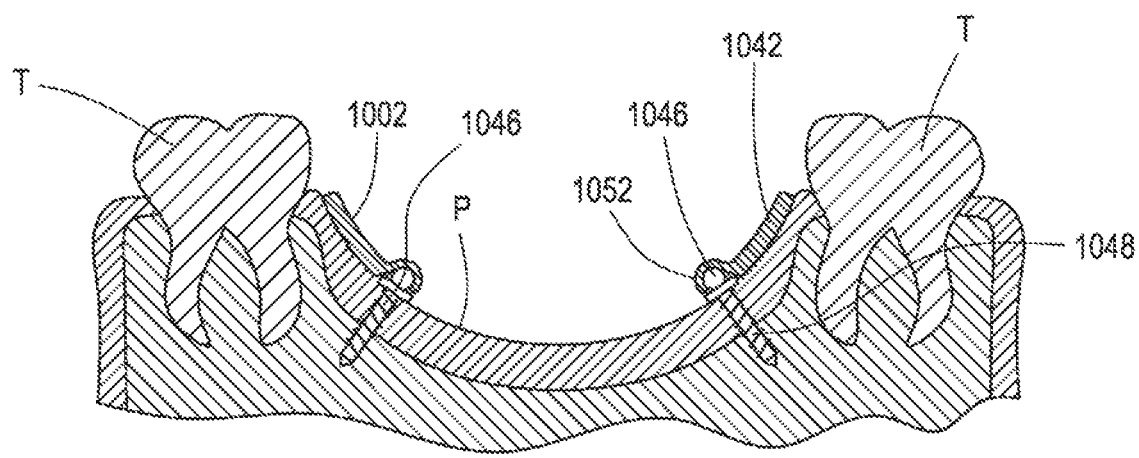
FIG. 17B is a cross-sectional view of a part of the frame member of FIG. 17A operatively connected to an inner portion of the user's mouth and temporary anchorage device.

In an embodiment illustrated in FIGS. 17A and 17B, the orthodontic assembly 1000 includes a temporary anchorage device ("TAD") frame assembly configured to be removably fastened to a palate portion P of the user's mouth using one or more fastening members 1046. Similar to the previously described frame member 202 illustrated in FIG. 1B, the frame assembly has a generally U-shaped arcuate configuration, which is adaptable via the 3D printing or any other manufacturing process be conformed to the interior lingual surface of the selected user's mouth.

The frame assembly includes intermediate flexible or semi flexible connector members. Also similar to the aforementioned embodiments, the orthodontic assembly may include a variety of interchangeable components, including but not limited to, one or more retainer members 1012, one or more clip members 1004 or more integrally formed active elements and one or more C-clasp members 1026.

The frame assembly member having a lower frame portion 1050 may include one or more tab members 1042. The tab members 1042 may be positioned along the inner edge of the lower frame portion 1050 of the frame assembly and as such, extends in a generally inward direction from the inner edge of the lower frame portion 1050. The tab member 1042 includes an opening 1044 configured to receive the fastening member 1046 there through such that the secure the assembly in the mouth.

As illustrated in FIG. 17B, each TAD (temporary anchorage device) fastening member 1046 generally includes a shaft portion 1048 secured in the palatal bone and head portion 1052 for securely fastening the member 1042 of the frame assembly to TAD. It is contemplated that the frame assembly may include a plurality of tab members 1042, thus permitting the orthodontic assembly to be securely fastened to the palate of the user's mouth at multiple locations.

Figure 18A:
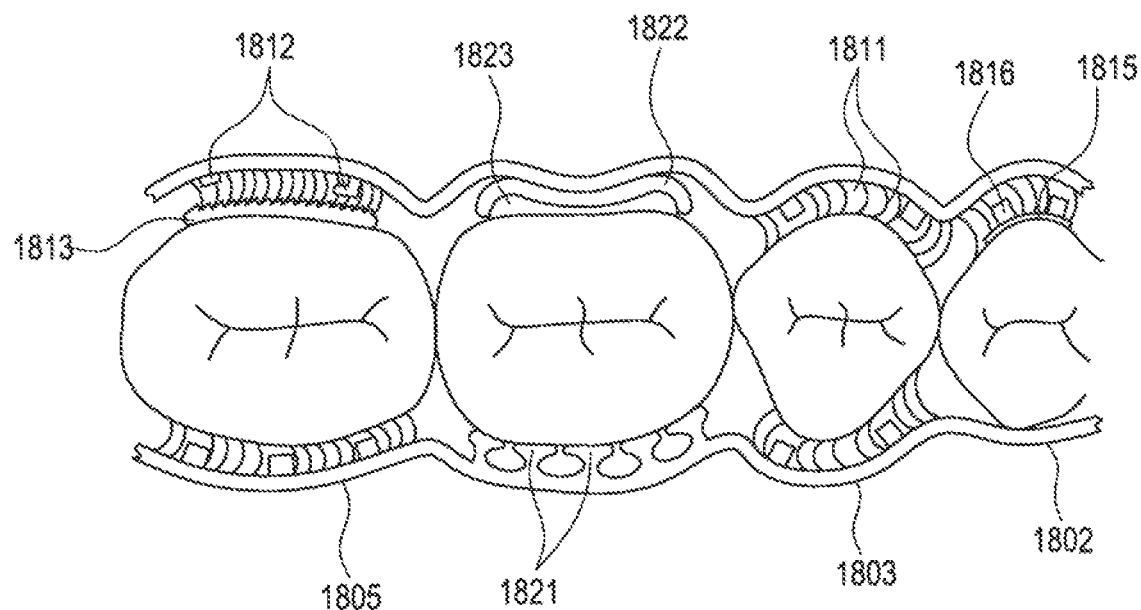
FIG. 18A is an occlusal view of an aligner with bristles, suction cups, bonded components, and support structures in operative engagement with multiple teeth.

Some of the structures described earlier with clip members may also be used with aligners. As illustrated in FIG. 18A, 3D printed aligners may include bristles 1811, support structures for the bristles 1812 and suction cups 1821 and 1822.

Bristles 1811 may be used on any surface area opposing a tooth, on the entire surface of a tooth, or on more than one surface of a tooth. The shape, number, and size of the bristles 1811 may be configured depending on the function of the bristles 1811. Further, the bristles 1811 may be oriented in multiple directions to provide a desired directions force on the tooth. Support structures 1812 may prevent excessive compression of the bristles 1811 and to create the ideal geometry for the bristle 1811 to function with vibrating devices.

Figure 7E:
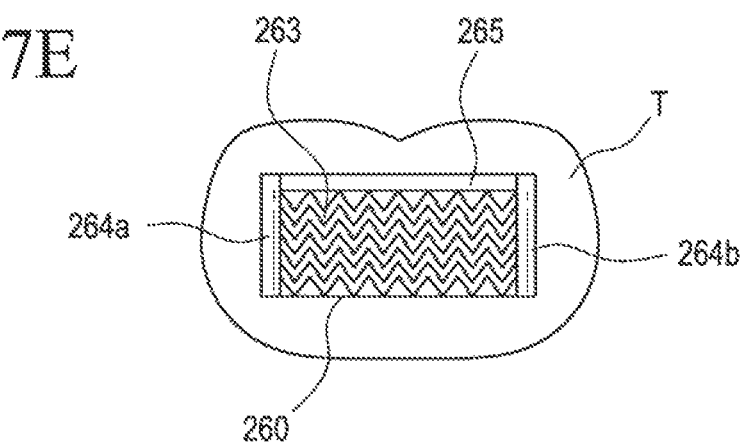
FIG. 7E is a lingual view of the bonded member of FIG. 7D.
Figure 7F:
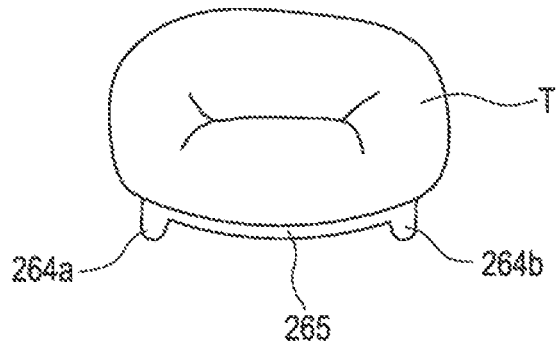
FIG. 7F is a top view of the bonded member of FIG. 7D.

The bristles 1811 may also be used with bonded components 1813 with a micro structure such as the saw tooth shaped bonded component mentioned earlier in FIGS. 7E-F.

The directions of the bristles 1811 may vary depending on the desired tooth movement especially when used with vibration devices such as the Acceledent vibrator. Curved bristles in the same direction as illustrated on 1805 part of the aligner may accelerate the movement of the tooth toward the back of the mouth. Curved bristles in opposing directions in opposing surfaces of the tooth may accelerate the rotation of tooth 1803.

Bristles may also be incorporated into bonded component 1815 opposing the inner surface of the aligner. Support structures 1816 may also be used on the bonded component 1815 to provide ideal contact of the bristles 1811 when in operative engagement with the aligner 18] Suction cups may also be used with the 3D printed aligner suction cups 1821 may be directly in operative engagement with the tooth structure. Suctions cup 1822 may be in contact with bonded component 1823 on the tooth structure. The use of suctions cups provides for a secure connection to the tooth allowing for a better transfer of forces from the aligner 18 the tooth.

Figure 18B:
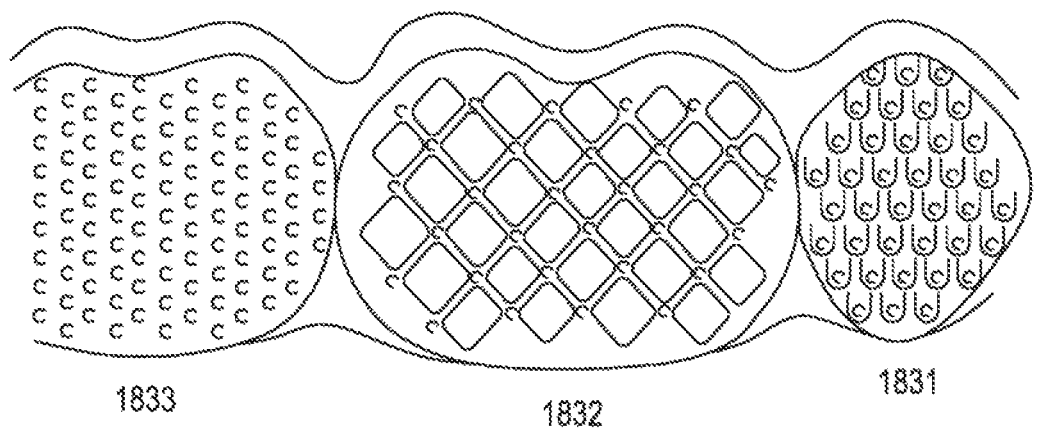
FIG. 18B is lingual side view of an aligner with mesh, U shape cuts and grid shape surface.

As illustrated in FIG. 18B bristles or suction cup structure may be configured in a grid 1833, mesh 1832 or U shape slit 1831 in the aligner. The topology and geometry of the aligner may defined by a CAD design to implement a U shape slit, mesh or grid structure or any structure that utilize the force of occlusion or when used with vibrating devices to facilitate tooth movement. The U shape slit, mesh or grid structure 1832 may be used to provide strength or flexibility, as needed, with the bristles or suction cups. This may be especially important when used with vibrating device. The U shape slit may have an overlapping scale shape structure or outward pad extensions on the outer surface of the aligner or assembly, opposing the bristles or inner structures of the aligner or assembly on one side, and in direct contact with the tissue and muscles of the mouth on the other side. The scale or outward pad extension maximize the surface contact with the tissue and muscles of the mouth and therefore the pressure and force transmitted to the bristles and inner structures of the aligner or assembly.

Figure 18C:
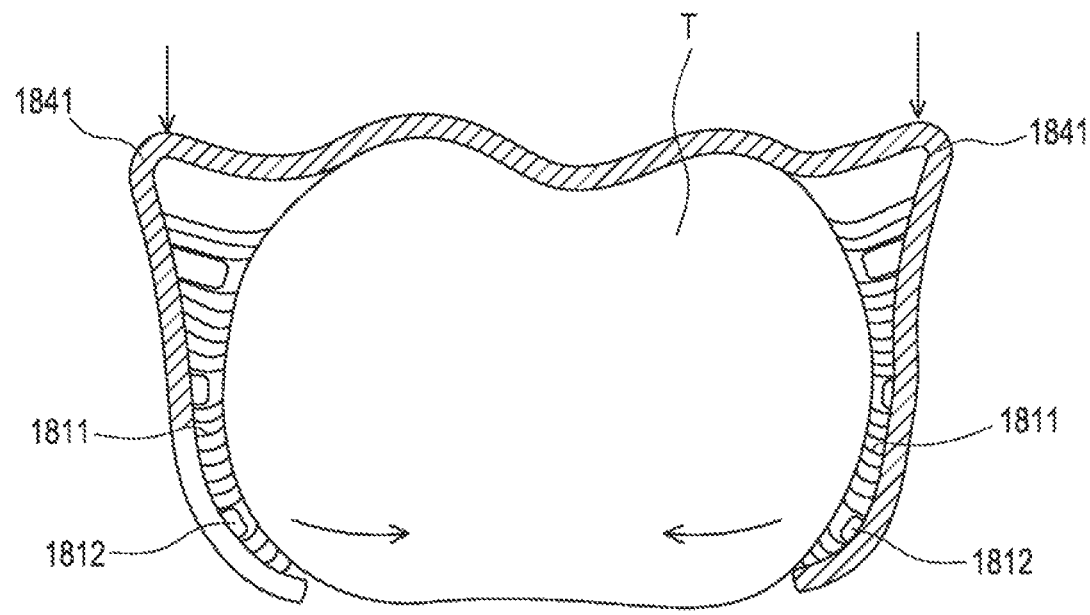
FIG. 18C is a side cross sectional view of an aligner with bristles, support structures, and a modified top part.

FIG. 18C illustrates a cross-sectional view of an aligner 18 the bristles 1811 and support structure 1812 in operative engagement with a tooth. The shape of the top occlusal part of the aligner may be designed to create extensions 1841 to allow the lower part of the aligner 18 be seated toward the tooth when the top of the aligner 18 in active contact with the opposing teeth for optimal distribution of force from the opposing teeth to the bristles 1811 of the aligners and to allow the force of occlusion to facilitate tooth movement.

3D printing allows for the design and manufacturing of the assembly or aligner to utilize vibrations, lateral side force from the muscle in the mouth, and the natural or forced intermittent contact of teeth or aligners in the mouth to move the teeth in predetermined directions. The 3D designs allow for specific structures, such as but not limited to the bristles, grid structures, and U shape slits, in the printed aligner or assembly to transfer vibration generated from a vibrating appliance, a vertical force generated from occlusion, or lateral side force from the muscles in the mouth into a vertical, horizontal or any combination forces the move teeth in predetermine directions. Such forces may include vibration generated from the vibrating appliance that may be redirected into vertical, horizontal, or a combination forces. Further, the vertical force generated from the occlusion may be redirected into vertical, horizontal, or a combination forces, or the lateral horizontal forces generated from the muscles surrounding the teeth may be redirected into vertical, horizontal, or a combination forces to move the teeth in predetermined directions. In addition to the bristles and suction cups mentioned earlier, other micro and nano structures such as hooks and loop fasteners, mushroom fasteners, and saw tooth shaped structures described earlier may be used within the aligner 18]

Figure 18D:
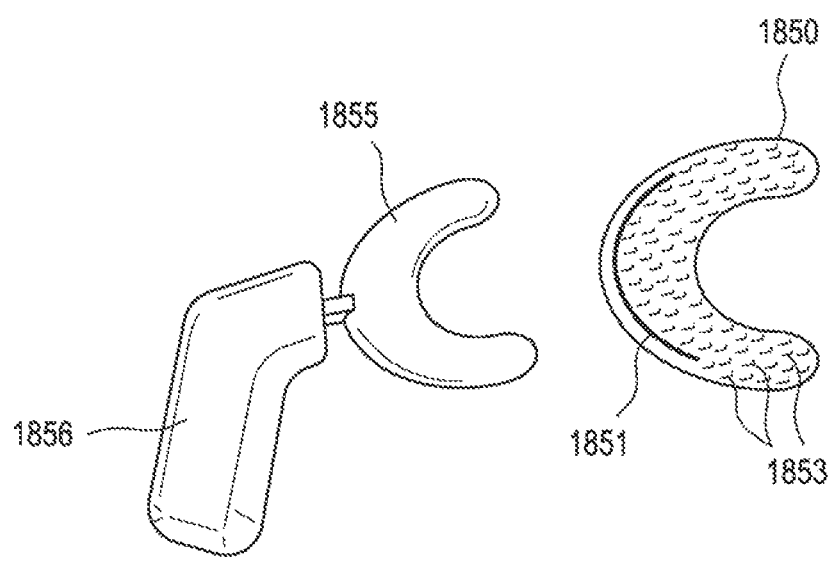
FIG. 18D illustrates a sleeve design with bristles for the intra oral part of a vibrating device and a vibrating device.

As illustrated in FIG. 18D, bristles 1853 may be used on a sleeve 1850. The sleeve 1850 may have an opening 1851 for the insertion into the intra oral part 1855 of a vibrating device 1856. Therefore when the sleeve 1850 and the intra oral part 1855 are placed in the mouth of the patient, the bristles 1853 may be in direct contact with the teeth when used with conventional braces. This may provide extra benefit in moving the teeth in a desired direction. The bristles 1853 may be formed to provide the desired forces on the various teeth to achieve a desired treatment for each tooth.

The bristles can be straight, curved, the same length, a different length, or any shape and size and any combination of these.

The bristles can be used on the clip, connected directly to the frame, used in a bonded attachment (bracket) on the teeth, or incorporated into clear aligners. The bristles may be used on the inner side of the clear aligner system opposing at least a portion of one surface of that tooth, and the aligner can be manufactured using 3D printing. Bristles may also be added to the aligner through a window in the aligner. An attachment with the bristles may be inserted in the window to be placed into contact with a tooth. Bristles may also be added to the aligner through a variety of manufacturing methods and combinations.

The bristles may be used with vibrating devices available in the market, such as those manufactured by Acceledent. The vibration from the vibrating device allow the bristles to vibrate and to place an intermittent pulsating forces on the tooth to facilitate tooth movement.

The shape and direction of the bristles may be configured according to the predetermined desired tooth movement of the teeth. Additionally, the bristles may be incorporated into the intra oral part of the vibrating device or into a U or Y shape sleeve device that slides to the U or Y shape intraoral part of the vibrating device. The bristles on the sleeve may be in contact with at least part of one surface of the tooth. The sleeves may be customized to each individual patient and may also be used with traditional braces The shape of the clear aligners may be changed when used with bristles to utilize the force of occlusion and the force of muscles surrounding the teeth that act to compress then release the bending bristle. The change in the design may include but not limited to extending the occlusal side of the aligners beyond the curvature of the tooth so that any pressure from the force of occlusion on that tooth will translate to pressure on the entire buccal or lingual surfaces of the tooth or utilizing a mesh opening or U shape slits to provide additional flexibility when used with vibration device.

Suction cups can be used in clips, the frame of the assembly, retainers, or clear aligners for retention or to facilitate tooth movement.

When suction cups are used in clips or the frame of a retainer or assembly, they may engage the tooth surface directly or a bonded attachment of the tooth. The bonded attachment may have a disc shape concave middle part and convex borders. The suction cup engages the corresponding curvature of the bonded attachment. Multiple suction cups may be used directly on the tooth surface or with the bonded attachment on the tooth.

When used with aligners, suction cups may be used one surface of a tooth, more than one surface of a tooth, multiples surfaces of the teeth, or in combination with other extension on the aligner such as bristles. The suction cups may be one or a plurality of suction cups covering small part of the tooth or the entire surface of the tooth. A mesh design in the aligner may be used with suction cups.

To increase the function and reduce the size of the active or retentive members of the assembly or aligners, micro and nano structures may be used including but not limited to micro and nano bristles, micro and nano suction cups, micro interlocking mushroom fasteners, micro or nano loops and hooks fasteners, and micro or nano saw tooth shaped structures.

Various methods are described above for attaching various components of the orthodontic assembly to one another. It is noted that examples of specific attachment structures for specific components, may be used for connecting any of the components of the orthodontic assembly to one another. For example the various structures and methods for attaching the clip members to the frame, may be used to attach the clip members to the labial bow or the frame to the labial bow. Other examples are readily recognizable.

The various components of the assembly may be labeled with various indicators. These indicators may include numbers, arrows, signs, letters, or combinations thereof. These indicators may be used for labelling purposes and facilitate the assembly of the components during the treatment. Such indicators may be applied during the manufacture of the components, for example, during 3D printing. The software used to map the users mouth, define the specific treatment, and produce the various components to carry out the treatment, may apply such labels to assist in the assembly of the orthodontic assembly.

3-D printing may be used to fabricate any of the various components described above. 3-D printing allows for vary specific shapes and designs to be manufactured based upon a patients specific needs. The components can be printed using various materials that are appropriate for the specific application. Further, 3-D printing allows for components having shapes and designs that would be difficult or very expensive to manufacture using other methods. Further, various combinations of traditionally used acrylic parts, 3D printed, milled or injection molding made parts in addition to 3D printed polymeric or metallic components may all be used in the orthodontic assembly.

Though the various embodiments have been described in detail with particular reference to certain aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A removable orthodontic assembly to be used in a user's mouth, comprising:
    a frame member configured to be removably positioned proximate to at least a lingual portion of the user's teeth;
    a labial bow member configured to be removably positioned proximate to at least a labial portion of the user's teeth;
    a removable first connector member configured to reversibly connect a first side of the frame member to a first side of the labial bow member and reversibly lock the first side of the frame member to the first side of the labial bow member, the removable first connector comprising a first portion positioned proximate to the lingual portion of the user's teeth and a second portion positioned proximate the labial portion of the user's teeth and an orthodontic locking-clip configured to reversibly clip to the frame member; and
    a second connector member configured to reversibly connect a second side of the frame member to a second side of the labial bow member and reversibly lock the second side of the frame member to the second side of the labial bow member, the second side of the frame member being opposite to the first side of the frame member and the second side of the labial bow member being opposite to the first side of the labial bow member, wherein the labial bow member may be unlocked from the first connector member and second connector member and removed from the assembly.

2. The orthodontic assembly of claim 1, wherein the locking clip of the first connector member is configured to reversibly lock to the first side of the frame member using a snap-fit locking connection.

3. The orthodontic assembly of claim 1, wherein the labial bow member further comprises a first extension configured to engage a tooth.

4. The orthodontic assembly of claim 1, wherein the first connector member comprises a second locking clip configured to reversibly clip to the labial bow member and the first connector member may be unlocked from the labial bow member and frame member and removed from the assembly.

5. The orthodontic assembly of claim 4, wherein the second locking clip of the first connector member is a C-shaped locking clip.

6. The orthodontic assembly of claim 5, wherein the C-shaped locking-clip of the first connector member is configured to reversibly lock to the first side of the labial bow member using a snap-fit locking connection.

\* \* \* \* \*